(12) United States Patent
Machida et al.

(10) Patent No.: US 10,434,495 B2
(45) Date of Patent: Oct. 8, 2019

(54) METHOD FOR PRODUCING WATER ABSORBENT POLYACRYLIC ACID (SALT) RESIN POWDER, AND WATER ABSORBENT POLYACRYLIC ACID (SALT) RESIN POWDER

(71) Applicant: NIPPON SHOKUBAI CO., LTD., Osaka-shi, Osaka (JP)

(72) Inventors: Sayaka Machida, Himeji (JP); Kazushi Torii, Himeji (JP); Yoko Shirai, Himeji (JP); Hiroyuki Ikeuchi, Himeji (JP); Shigeru Sakamoto, Himeji (JP); Koji Tachi, Himeji (JP); Reiko Nakatsuru, Himeji (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 305 days.

(21) Appl. No.: 15/219,964

(22) Filed: Jul. 26, 2016

(65) Prior Publication Data
US 2016/0332141 A1 Nov. 17, 2016

Related U.S. Application Data

(62) Division of application No. 13/639,082, filed as application No. PCT/JP2011/058829 on Apr. 7, 2011, now Pat. No. 9,447,203.

(30) Foreign Application Priority Data

Apr. 7, 2010 (JP) .................................. 2010-088993
Aug. 10, 2010 (JP) .................................. 2010-179515
Feb. 16, 2011 (JP) .................................. 2011-031287

(51) Int. Cl.
*B01J 20/26* (2006.01)
*B01J 20/30* (2006.01)
(Continued)

(52) U.S. Cl.
CPC ....... *B01J 20/267* (2013.01); *B01J 20/28004* (2013.01); *B01J 20/28016* (2013.01);
(Continued)

(58) Field of Classification Search
CPC ... B01J 20/267; B01J 20/3085; B01J 20/3021
See application file for complete search history.

(56) References Cited

U.S. PATENT DOCUMENTS 4,703,067 A 10/1987 Mikita et al.
4,783,510 A 11/1988 Saotome
(Continued)

FOREIGN PATENT DOCUMENTS

EP 0450922 10/1991
EP 0574248 5/1993
(Continued)

OTHER PUBLICATIONS

English translation of International Search Report dated May 17, 2011 for PCT/JP2011/058829.
(Continued)

*Primary Examiner* — Nicole M. Buie-Hatcher
*Assistant Examiner* — M. Reza Asdjodi
(74) *Attorney, Agent, or Firm* — Casimir Jones, SC; Robert A. Goetz

(57) ABSTRACT

An object of the present invention is to provide a method for producing water absorbent resin powder in which permeability potential (SFC) is improved while a water absorbing rate (FSR) is being kept. The method is a method for producing water absorbent polyacrylic acid (salt) resin powder including the steps of: (i) polymerizing an acrylic acid (salt) monomer aqueous solution; (ii) during or after the step of (i), performing gel grinding of a hydrogel crosslinked polymer obtained by the polymerization, wherein the hydrogel crosslinked polymer has resin solid content of 10 wt %
(Continued)

to 80 wt %, and the gel grinding is carried out with gel grinding energy (GGE) of 18 [J/g] to 60 [J/g]; (iii) drying a particulate hydrogel crosslinked polymer obtained by the gel grinding, wherein the drying is performed at 150° C. to 250° C.; and (iv) carrying out a surface treatment to the particulate hydrogel crosslinked polymer thus dried.

15 Claims, 1 Drawing Sheet

(51) Int. Cl.
| | |
|---|---|
| B01J 20/28 | (2006.01) |
| B29C 48/04 | (2019.01) |
| B29C 48/395 | (2019.01) |
| C08F 6/00 | (2006.01) |
| C08F 220/06 | (2006.01) |
| C08J 3/24 | (2006.01) |
| B29B 9/06 | (2006.01) |
| C08F 220/20 | (2006.01) |
| B29C 48/30 | (2019.01) |
| B29C 48/92 | (2019.01) |
| B29C 48/345 | (2019.01) |
| B29C 48/685 | (2019.01) |
| C08F 222/10 | (2006.01) |
| B29B 9/16 | (2006.01) |

(52) U.S. Cl.
CPC ....... B01J 20/3007 (2013.01); B01J 20/3021 (2013.01); B01J 20/3078 (2013.01); B01J 20/3085 (2013.01); B29B 9/06 (2013.01); B29C 48/04 (2019.02); B29C 48/397 (2019.02); C08F 6/008 (2013.01); C08F 220/06 (2013.01); C08F 220/20 (2013.01); C08J 3/245 (2013.01); B29B 2009/161 (2013.01); B29C 48/30 (2019.02); B29C 48/345 (2019.02); B29C 48/687 (2019.02); B29C 48/92 (2019.02); B29C 2948/9259 (2019.02); B29C 2948/92704 (2019.02); C08F 222/1006 (2013.01); C08J 2333/02 (2013.01); Y10T 428/2982 (2015.01)

(56) References Cited

U.S. PATENT DOCUMENTS

| | | | |
|---|---|---|---|
| 4,920,202 A | 4/1990 | Irie et al. | |
| 5,002,986 A | 3/1991 | Fujiura et al. | |
| 5,118,719 A | 6/1992 | Lind | |
| 5,124,188 A | 6/1992 | Roe et al. | |
| 5,145,713 A | 9/1992 | Venkatesan et al. | |
| 5,154,713 A | 10/1992 | Lind | |
| 5,275,773 A | 1/1994 | Irie et al. | |
| 5,314,420 A * | 5/1994 | Smith | A61F 13/15203 210/691 |
| 5,399,591 A | 3/1995 | Smith et al. | |
| 5,451,613 A | 9/1995 | Smith et al. | |
| 5,462,972 A | 10/1995 | Smith et al. | |
| 5,562,646 A | 10/1996 | Goldman | |
| 5,624,967 A | 4/1997 | Hitomi et al. | |
| 5,712,316 A | 1/1998 | Dahmen et al. | |
| 5,856,370 A | 1/1999 | Chmelir | |
| 5,985,944 A | 11/1999 | Ishizaki et al. | |
| 6,107,358 A | 8/2000 | Harada et al. | |
| 6,136,873 A | 10/2000 | Hahnle et al. | |
| 6,187,872 B1 * | 2/2001 | Yanase | A61L 15/60 525/330.2 |
| 6,291,636 B1 | 9/2001 | Miyake et al. | |
| 6,414,214 B1 | 7/2002 | Engelhardt et al. | |
| 6,441,266 B1 | 8/2002 | Dyer et al. | |
| 6,562,879 B1 | 5/2003 | Hatsuda et al. | |
| 6,565,768 B1 * | 5/2003 | Dentler | A61L 15/60 252/194 |
| 6,576,713 B2 | 6/2003 | Ishizaki et al. | |
| 6,602,950 B1 | 8/2003 | Dentler et al. | |
| 6,641,064 B1 | 11/2003 | Dentler et al. | |
| 6,750,262 B1 | 6/2004 | Hahnle et al. | |
| 6,817,557 B2 | 11/2004 | Kakita et al. | |
| 6,849,665 B2 | 2/2005 | Frenz et al. | |
| 6,939,914 B2 | 9/2005 | Qin et al. | |
| 7,169,843 B2 | 1/2007 | Smith et al. | |
| 7,173,086 B2 | 2/2007 | Smith et al. | |
| 2002/0128618 A1 | 9/2002 | Frenz et al. | |
| 2002/0165288 A1 | 11/2002 | Frenz et al. | |
| 2003/0144379 A1 | 7/2003 | Mitchell et al. | |
| 2004/0234607 A1 | 11/2004 | Irie et al. | |
| 2005/0046069 A1 | 3/2005 | Sasabe et al. | |
| 2005/0176834 A1 | 8/2005 | Hintz et al. | |
| 2005/0209352 A1 | 9/2005 | Dairoku et al. | |
| 2005/0245684 A1 | 11/2005 | Daniel | |
| 2005/0256469 A1 | 11/2005 | Qin et al. | |
| 2006/0204755 A1 | 9/2006 | Torii et al. | |
| 2006/0247351 A1 | 11/2006 | Torii et al. | |
| 2007/0015860 A1 | 1/2007 | Frank | |
| 2007/0078248 A1 | 4/2007 | Adachi | |
| 2007/0123658 A1 * | 5/2007 | Torii | A61L 15/60 525/329.7 |
| 2007/0207924 A1 | 9/2007 | Ikeuchi | |
| 2007/0225422 A1 * | 9/2007 | Sakamoto | C08F 2/44 524/458 |
| 2007/0293617 A1 | 12/2007 | Riegel | |
| 2008/0125533 A1 | 5/2008 | Riegel | |
| 2008/0202987 A1 | 8/2008 | Weismantel et al. | |
| 2008/0214749 A1 | 9/2008 | Weismantel et al. | |
| 2008/0287631 A1 | 11/2008 | Nitschke | |
| 2009/0208748 A1 * | 8/2009 | Torii | A61L 15/60 428/402 |
| 2009/0270538 A1 * | 10/2009 | Ikeuchi | C08F 2/44 524/115 |
| 2009/0305884 A1 * | 12/2009 | Sakamoto | B29B 17/00 502/402 |
| 2010/0041550 A1 | 2/2010 | Riegel et al. | |
| 2010/0234531 A1 | 9/2010 | Frank | |
| 2010/0240808 A1 * | 9/2010 | Wada | B01J 20/261 524/78 |
| 2010/0268181 A1 | 10/2010 | Ziemer et al. | |
| 2010/0270501 A1 * | 10/2010 | Torii | C08L 33/02 252/194 |
| 2010/0308263 A1 | 12/2010 | Torii et al. | |
| 2011/0011491 A1 | 1/2011 | Matsumoto et al. | |
| 2011/0042612 A1 | 2/2011 | Riegel et al. | |
| 2011/0114881 A1 * | 5/2011 | Torii | A61L 15/60 252/194 |
| 2011/0180755 A1 * | 7/2011 | Adachi | C08F 8/32 252/194 |
| 2011/0313113 A1 | 12/2011 | Sakamoto et al. | |
| 2012/0220745 A1 * | 8/2012 | Machida | C08J 3/122 526/317.1 |
| 2012/0258851 A1 * | 10/2012 | Nakatsuru | C08F 220/06 502/7 |
| 2013/0026412 A1 | 1/2013 | Machida et al. | |
| 2014/0193641 A1 * | 7/2014 | Torii | C08F 20/06 428/402 |

FOREIGN PATENT DOCUMENTS

| | | |
|---|---|---|
| EP | 0574248 | 12/1993 |
| EP | 0595803 | 2/2002 |
| EP | 1521601 | 5/2008 |
| JP | 64-026604 | 1/1989 |
| JP | 5-070597 | 3/1993 |
| JP | 5-339381 | 12/1993 |
| JP | 2700531 B2 | 1/1998 |
| JP | 10-168129 | 6/1998 |
| JP | 11-060630 | 3/1999 |
| JP | 11-349687 | 12/1999 |
| JP | 2000-063527 | 2/2000 |
| JP | 2000-143722 | 5/2000 |
| JP | 2002-527547 | 8/2002 |

(56) References Cited

FOREIGN PATENT DOCUMENTS

| | | | |
|---|---|---|---|
| JP | 2002-527548 | 8/2002 | |
| JP | 2004-522491 | 7/2004 | |
| JP | 2004-339502 | 12/2004 | |
| JP | 2005-096448 | 4/2005 | |
| JP | 2006-045357 | 2/2006 | |
| JP | 2007-529295 | 10/2007 | |
| JP | 2008-106077 | 5/2008 | |
| JP | 2010-505003 | 2/2010 | |
| JP | 2010-540206 | 12/2010 | |
| WO | 94/022502 | 10/1994 | |
| WO | 95/02002 | 1/1995 | |
| WO | 97/017397 | 5/1997 | |
| WO | 00/052087 | 9/2000 | |
| WO | 05/012406 | 2/2005 | |
| WO | 05/063313 | 7/2005 | |
| WO | 2005/075070 | 8/2005 | |
| WO | 2005097313 | 10/2005 | |
| WO | 06/074816 | 7/2006 | |
| WO | 06/082189 | 8/2006 | |
| WO | 06/082197 | 8/2006 | |
| WO | 08/025656 | 8/2007 | |
| WO | 08/025652 | 3/2008 | |
| WO | 08/025655 | 3/2008 | |
| WO | 08/025656 | 3/2008 | |
| WO | 08/092842 | 8/2008 | |
| WO | 08/092843 | 8/2008 | |
| WO | 09/062902 | 3/2009 | |
| WO | 2009/041727 | 4/2009 | |
| WO | 2009048145 | 4/2009 | |
| WO | 09/062902 | 5/2009 | |
| WO | 10/095427 | 8/2010 | |
| WO | 2011-078298 | 6/2011 | |
| WO | WO-2011078298 A1 * | 6/2011 | ............ C08F 220/06 |
| WO | WO-2011126079 A1 * | 10/2011 | .............. C08F 6/008 |

OTHER PUBLICATIONS

Modern Superabsorbent Polymer Technology (1998), pp. 197-199.
Office Action of Corresponding JP Patent Application No. 2012-509701 dated Apr. 15, 2014.
Extended European Search Report of Corresponding EP Patent Application No. 11765979.7 dated Jun. 12, 2014.
Notice of submission of publications for corresponding JP Application No. 2012-509701 dated Aug. 19, 2014 (and English translation).
Mailed Sep. 19, 2014—Third Party Submission of Observation of Corresponding EP Patent Application No. 20110765979 dated Oct. 9, 2014.
Office Action of Corresponding JP Patent Application No. 2012-509701 dated Dec. 2, 2014.
Official Communication corresponding to EP Patent Application No. 11765979.7, dated Feb. 19, 2015.
Office Action, CN Patent Application No. 201410366615.6, dated Nov. 4, 2015.
Requirement for Restriction/Election, U.S. Appl. No. 13/639,082, dated Feb. 3, 2014.
Non-Final Rejection, U.S. Appl. No. 13/639,082, dated Apr. 29, 2014.
Final Rejection, U.S. Appl. No. 13/639,082, dated Oct. 29, 2014.
Non-Final Rejection, U.S. Appl. No. 13/639,082, dated Mar. 2, 2015.
Non-Final Rejection, U.S. Appl. No. 13/639,082, dated Oct. 1, 2015.
Final Rejection, U.S. Appl. No. 13/639,082, dated Mar. 28, 2016.
Notice of Allowance, JP patent application No. JP2014-263651, dated Jan. 24, 2017.

* cited by examiner

300–500 μm     Fine Grinding     Not More Than 45 μm

METHOD FOR PRODUCING WATER ABSORBENT POLYACRYLIC ACID (SALT) RESIN POWDER, AND WATER ABSORBENT POLYACRYLIC ACID (SALT) RESIN POWDER

The present application is a divisional of U.S. patent application Ser. No. 13/639,082, filed Oct. 2, 2012, which is a Section 371 U.S. national stage entry of International Patent Application No. PCT/JP2011/058829, International Filing Date Apr. 7, 2011, which published on Oct. 13, 2011 as Publication No. WO 2011/126079, which claims the benefit of Japanese Patent Application No. 2010-088993, filed Apr. 7, 2010, Japanese Patent Application No. 2010-179515, filed Aug. 10, 2010, and Japanese Patent Application No. 2011-031287, filed Feb. 16, 2011, the contents of which are incorporated by reference in their entireties.

TECHNICAL FIELD

The present invention relates to a method for producing water absorbent polyacrylic acid (salt) resin powder, and the water absorbent polyacrylic acid (salt) resin powder. More specifically, the present invention relates to a method for producing water absorbent polyacrylic acid (salt) resin powder having excellent water absorbing ability (especially having high permeability potential and water absorbing rate), and the water absorbent polyacrylic acid (salt) resin powder, which water absorbent polyacrylic acid (salt) resin powder is water absorbent resin powder for use in sanitary goods such as disposable diaper, sanitary napkins, etc.

BACKGROUND ART

Water absorbent resin (SAP/Super Absorbent Polymer) is a polymer gelling agent which is swellable with water but insoluble with water. The water absorbent resin is widely used, mainly disposably, for absorbing products such as disposable diapers, sanitary napkins, etc., and further for an agriculture/horticulture water retaining agent, an industrial waterproofing agent, and the like. For such water absorbent resin, many monomers and hydrophilic polymers have been proposed as raw materials. Especially, water absorbent polyacrylic acid (salt) resin in which acrylic acid and/or its salt is used as its monomer is most popular in industries because of its high water absorbing ability (Non-Patent Literature 1).

The water absorbent resin is produced via a polymerizing step, a drying step, and if necessary, a non-dried matter removing step, a grinding step, a classifying step, a surface cross-linking step, and/or the like (Patent Literatures 1 to 5, and 50). Meanwhile, the water absorbent resin is required to have many functions (properties) in order to cope with functional sophistication of disposable diapers which are one major application of the water absorbent resin. More specifically, the water absorbent resin is required to satisfy many properties such as, not only a high water absorbing coefficient, but also gel strength, water soluble content, a water absorbing rate, an absorbency against pressure, permeability potential, particle size distribution, an anti-urine property, an anti microbial property, impact resistance (an anti-damage property), fluidity, a deodorant property, anti-coloring (degree of whiteness), low dustiness, etc. Therefore, many cross-linking techniques, additives, modifications in steps in the production, etc. have been proposed.

Among these properties, the permeability potential is considered as a more important factor in association with a recent increase (for example, 50 wt % or more) in an amount of the water absorbent resin in disposable diapers. Furthermore, methods and techniques for improving permeability potential against pressure and permeability potential without pressure, such as SFC (Saline Flow Conductivity, see Patent Literature 6) or GBP (Gel Bed Permeability, see Patent Literatures 7 to 9), have been proposed.

Various combinations of a plurality of parameters (including the permeability potential) of the properties have been also proposed. There have been known a technique for defining impact resistance (FI) (Patent Literature 10), a technique for defining, for example, a water absorbing rate (FSR/Vortex) (Patent Literature 11), and a technique for defining the product of liquid diffusivity (SFC) and core absorption quantity after 60 minutes (DA60) (Patent Literature 12).

As the method for improving the permeability potential such as SFC and GBP, there have been known a technique for adding plaster before or during polymerization (Patent Literature 13), a technique for adding spacers (Patent Literature 14), a technique for using a nitrogen-containing polymer having 5 through 17 [mol/kg] of nitrogen atoms which can be protonated (Patent Literature 15), a technique for using polyamine, and polyvalent metal ions or polyvalent anions (Patent Literature 16), a technique for covering, with polyamine, water absorbent resin having a pH of less than 6 (Patent Literature 17), and a technique for using polyammonium carbonate (Patent Literature 18). In addition, there have been known a technique for using polyamine having water soluble content of not less than 3%, and a technique for defining a suction index (WI) and gel strength (Patent Literatures 19 through 21). There have been also known techniques for using polyvalent metal salt while controlling, during polymerization, methoxyphenol that is a polymerization inhibitor, in order to improve coloring and the permeability potential (Patent Literatures 22 and 23). Moreover, there has been known a technique for polishing particles so as to attain a high bulk specific gravity (Patent Literature 24).

Moreover, in addition to the permeability potential, the water absorbing rate is also a basic property for the water absorbent resin. As one method for improving the water absorbing rate, a technique to increase a specific surface area in order to attain a greater water absorbing rate is known. More specifically, a technique for controlling to attain fine particle diameters (Patent Literature 25), techniques for granulating fine particles with a large surface area (Patent Literatures 26 to 28), a technique for freeze-drying a hydrogel to cause the hydrogel to be porous (Patent Literature 29), techniques for performing granulation and surface cross-linking of particles simultaneously (Patent Literatures 30 to 32), techniques for foaming polymerization (Patent Literatures 33 to 48), a technique for post-polymerization foaming and cross-linking (Patent Literature 49), etc. have been proposed.

More specifically, as to the foaming polymerization, the following techniques have been known regarding a foaming agent for treating a monomer(s): techniques for using a carbonate (Patent Literatures 33 to 40), techniques for using an organic solvent (Patent Literatures 41 and 42), techniques for using an inert gas (Patent Literatures 43 to 45), techniques for using an azo compound (Patent Literatures 46 and 47), a technique for using insoluble inorganic powder (Patent Literature 48), etc.

CITATION LIST

Patent Literatures

Patent Literature 1
U.S. Pat. No. 6,576,713 B, Specification
Patent Literature 2
U.S. Pat. No. 6,817,557 B, Specification
Patent Literature 3
U.S. Pat. No. 6,291,636 B, Specification
Patent Literature 4
U.S. Pat. No. 6,641,064 B, Specification
Patent Literature 5
US Patent Application Publication, No. 2008/0287631 A, Specification
Patent Literature 6
U.S. Pat. No. 5,562,646 B, Specification
Patent Literature 7
US Patent Application Publication No. 2005/0256469 A, Specification
Patent Literature 8
U.S. Pat. No. 7,169,843 B, Specification
Patent Literature 9
U.S. Pat. No. 7,173,086 B, Specification
Patent Literature 10
U.S. Pat. No. 6,414,214 B, Specification
Patent Literature 11
U.S. Pat. No. 6,849,665 B, Specification
Patent Literature 12
US Patent Application Publication No. 2008/125533 A, Specification
Patent Literature 13
US Patent Application Publication No. 2007/293617 A, Specification
Patent Literature 14
US Patent Application Publication No. 2002/0128618 A, Specification
Patent Literature 15
US Patent Application Publication No. 2005/0245684 A, Specification
Patent Literature 16
PCT International Publication No. 2006/082197 A, Pamphlet
Patent Literature 17
PCT International Publication No. 2006/074816 A, Pamphlet
Patent Literature 18
PCT International Publication No. 2006/082189 A, Pamphlet
Patent Literature 19
PCT International Publication No. 2008/025652 A, Pamphlet
Patent Literature 20
PCT International Publication No. 2008/025656 A, Pamphlet
Patent Literature 21
PCT International Publication No. 2008/025655 A, Pamphlet
Patent Literature 22
PCT International Publication No. 2008/092843 A, Pamphlet
Patent Literature 23
PCT International Publication No. 2008/092842 A, Pamphlet
Patent Literature 24
U.S. Pat. No. 6,562,879 B, Specification
Patent Literature 25
US Patent Application Publication No. 2007/015860 A, Specification
Patent Literature 26
U.S. Pat. No. 5,624,967 B, Specification
Patent Literature 27
PCT International Publication No. 2005/012406 A, Pamphlet
Patent Literature 28
U.S. Pat. No. 5,002,986 B, Specification
Patent Literature 29
U.S. Pat. No. 6,939,914 B, Specification
Patent Literature 30
U.S. Pat. No. 5,124,188 B, Specification
Patent Literature 31
EP Patent No. 0595803 B, Specification
Patent Literature 32
EP Patent No. 0450922 B, Specification
Patent Literature 33
U.S. Pat. No. 5,118,719 B, Specification
Patent Literature 34
U.S. Pat. No. 5,154,713 B, Specification
Patent Literature 35
U.S. Pat. No. 5,314,420 B, Specification
Patent Literature 36
U.S. Pat. No. 5,399,591 B, Specification
Patent Literature 37
U.S. Pat. No. 5,451,613 B, Specification
Patent Literature 38
U.S. Pat. No. 5,462,972 B, Specification
Patent Literature 39
PCT International Publication No. 95/02002 A, Pamphlet
Patent Literature 40
PCT International Publication No. 2005/063313 A, Pamphlet
Patent Literature 41
PCT International Publication No. 94/022502 A, Pamphlet
Patent Literature 42
U.S. Pat. No. 4,703,067 B, Specification
Patent Literature 43
PCT International Publication No. 97/017397 A, Pamphlet
Patent Literature 44
PCT International Publication No. 00/052087 A, Pamphlet
Patent Literature 45
U.S. Pat. No. 6,107,358 B, Specification
Patent Literature 46
U.S. Pat. No. 5,856,370 B, Specification
Patent Literature 47
U.S. Pat. No. 5,985,944 B, Specification
Patent Literature 48
PCT International Publication No. 2009/062902 A, Pamphlet
Patent Literature 49
EP Patent No. 1521601 B, Specification
Patent Literature 50
Japanese Patent Application Publication, Tokukaihei, No. 11-349687 A Non-Patent Literatures
Non-Patent Literature 1
Modern Superabsorbent Polymer Technology (1998), (especially, p. 197 to 199)

SUMMARY OF INVENTION

Technical Problem

In order to improve properties of water absorbent resin, many cross-linking techniques, additives, modifications in steps in the production, etc. have been thus proposed. Among these properties, permeability potential and a water absorbing rate are significant as basic properties of the water absorbent resin, and therefore many techniques for improving the permeability potential and the water absorbing rate have been proposed so far.

Meanwhile, the permeability potential is inversely proportional to the water absorbing rate. That is, increase in one of the permeability potential and the water absorbing rate causes decrease in the other of the permeability potential and the water absorbing rate. Conventional techniques improve just one of the permeability potential and the water absorbing rate. Therefore, there has been required a technique for improving the one without decreasing the other, or a technique for improving both of them.

In order to satisfy such requirement, an object of the present invention is to provide (i) a method for producing water absorbent resin powder in which permeability potential (SFC) and a water absorbing rate (FSR) are attained (particularly, the permeability potential is improved while the water absorbent rate is being kept), and (ii) the water absorbent resin powder.

Solution to Problem

In order to attain the object, it was found that it is possible to attain both the permeability potential (SFC) and the water absorbing rate (FSR) (particularly, to improve the permeability potential while keeping the water absorbent rate) by changing a shape of water absorbent resin, the shape of the water absorbent resin being changed by drying a particulate hydrogel crosslinked polymer that are obtained by grinding a hydrogel crosslinked polymer by appropriate shearing stress and compressive force (grinding with gel grinding energy (GGE) of 18 [J/g] through 60 [J/g] or gel grinding energy (2) (GGE (2)) of 9 [J/g] through 40 [J/g], or increasing weight average molecular weight of water soluble content of the hydrogel crosslinked polymer by 10,000 [Da] through 500,000 [Da] in comparison with pre-gel grinding). Based on the finding, the present invention was accomplished.

A method for producing water absorbent resin powder of the present invention (first producing method) is a method for producing water absorbent polyacrylic acid (salt) resin powder, including the steps of: (i) polymerizing an acrylic acid (salt) monomer aqueous solution; (ii) during or after the step of (i), performing gel grinding of a hydrogel crosslinked polymer obtained by the polymerization, wherein the hydrogel crosslinked polymer has resin solid content of 10 wt % to 80 wt %, and the gel grinding is carried out with gel grinding energy (GGE) of 18 [J/g] to 60 [J/g]; (iii) drying a particulate hydrogel crosslinked polymer obtained by the gel grinding, wherein the drying is performed at 150° C. to 250° C.; and (iv) carrying out a surface treatment to the particulate hydrogel crosslinked polymer thus dried.

A method for producing water absorbent resin powder of the present invention (second producing method) is a method for producing water absorbent polyacrylic acid (salt) resin powder, including the steps of: (i) polymerizing an acrylic acid (salt) monomer aqueous solution; (ii) during or after the step of (i), performing gel grinding of a hydrogel crosslinked polymer obtained by the polymerization, wherein the hydrogel crosslinked polymer has resin solid content of 10 wt % to 80 wt %, and the gel grinding is carried out with gel grinding energy (2) (GGE (2)) of 9 [J/g] to 40 [J/g]; (iii) drying a particulate hydrogel crosslinked polymer obtained by the gel grinding, wherein the drying is performed at 150° C. to 250° C.; and (iv) carrying out a surface treatment to the particulate hydrogel crosslinked polymer thus dried.

A method for producing water absorbent resin powder of the present invention (third producing method) is a method for producing water absorbent polyacrylic acid (salt) resin powder, including the steps of: (i) polymerizing an acrylic acid (salt) monomer aqueous solution; (ii) during or after the step of (i), performing gel grinding of a hydrogel crosslinked polymer obtained by the polymerization, wherein the hydrogel crosslinked polymer has resin solid content of 10 wt % to 80 wt %, so that weight average molecular weight of water soluble content of the hydrogel crosslinked polymer is increased by 10,000 [Da] to 500,000 [Da]; (iii) drying a particulate hydrogel crosslinked polymer obtained by the gel grinding, wherein the drying is performed at 150° C. to 250° C.; and (iv) carrying out a surface treatment to the particulate hydrogel crosslinked polymer thus dried.

Further, in order to attain the object, it was found that it is possible to attain both the permeability potential (SFC) and the water absorbing rate (FSR) of the water absorbent resin powder (particularly, to improve the permeability potential while keeping the water absorbent rate) by (i) drying, under a specific condition, a particulate hydrogel crosslinked polymer having all properties of specific weight average particle diameter, specific logarithmic standard deviation of particle size distribution, and specific resin solid content, and then (ii) performing a surface treatment to the particulate hydrogel crosslinked polymer. Based on the finding, the present invention was accomplished.

A method for producing water absorbent resin powder of the present invention (fourth producing method) is a method for producing water absorbent polyacrylic acid (salt) resin powder, including the steps of: (i) polymerizing an acrylic acid (salt) monomer aqueous solution; (ii) during or after the step of (i), performing gel grinding of a hydrogel crosslinked polymer obtained by the polymerization so as to obtain a particulate hydrogel crosslinked polymer having a weight average particle diameter (D50) of 350 µm to 2000 µm and logarithmic standard deviation ($\sigma\zeta$) of particle size distribution of 0.2 to 1.0; (iii) drying the particulate hydrogel crosslinked polymer by hot air of 150° C. to 250° C. at a velocity of 0.8 [m/s] to 2.5 [m/s] in a direction vertical (up-and-down direction) to the particulate hydrogel crosslinked polymer by use of a through-flow belt drier, the particulate hydrogel crosslinked polymer to be supplied into the through-flow belt drier having resin solid content of 10 wt % to 80 wt %; and (iv) carrying out a surface treatment to the particulate hydrogel crosslinked polymer thus dried.

In other words, a method for producing water absorbent resin powder of the present invention (first to fourth producing methods) is a method for producing water absorbent polyacrylic acid (salt) resin powder, including the steps of: (i) polymerizing an acrylic acid (salt) monomer aqueous solution; (ii) during or after the step of (i), performing gel grinding of a hydrogel crosslinked polymer obtained by the polymerization, wherein the hydrogel crosslinked polymer has resin solid content of 10 wt % to 80 wt %; (iii) drying a particulate hydrogel crosslinked polymer obtained by the gel grinding, wherein the drying is performed at 150° C. to 250° C.; and (iv) carrying out a surface treatment to the particulate hydrogel crosslinked polymer thus dried, the step of (ii) being carried out such that at least one of (1) to (4) is met, where (1) the gel grinding is carried out with gel grinding energy (GGE) of 18 [J/g] to 60 [J/g]; (2) the gel grinding is carried out with gel grinding energy (2) (GGE (2)) of 9 [J/g] to 40 [J/g]; (3) weight average molecular weight of water soluble content of the hydrogel crosslinked polymer is increased by 10,000 [Da] to 500,000 [Da]; and (4) the particulate hydrogel crosslinked polymer obtained by the step of (ii) has a weight average particle diameter (D50) of 350 µm to 2000 µm, and logarithmic standard deviation (σζ) of particle size distribution of 0.2 to 1.0.

In a case where the hydrogel crosslinked polymer is subjected to the gel grinding so that (4) is met, the particulate hydrogel crosslinked polymer to be supplied into a through-flow belt drier has resin solid content of 10 wt % to 80 wt %, and the through-flow belt drier sends hot air of 150° C. to 250° C. at a velocity of 0.8 [m/s] to 2.5 [m/s] in a direction vertical (up-and-down direction) to the particulate hydrogel crosslinked polymer.

The gel grinding of the present invention essentially meets at least one of (1) through (4), preferably two or more, further preferably three or more, and especially preferably all of them. Further, it is preferable that not only the particulate hydrogel crosslinked polymer obtained by the gel grinding of (4) but also the particulate hydrogel crosslinked polymer obtained by the gel grinding of (1) to (3) be dried by the through-flow belt drier under the drying condition (such as the hot air velocity). Moreover, it is further preferable that surface crosslinking be performed especially by combination use of a covalent bonding surface crosslinking agent and an ionic bonding surface crosslinking agent which (later described).

In order to attain the object of the present invention (to attain both the permeability potential (SFC) and the water absorbing rate (FSR) of the water absorbent resin powder (particularly, to improve the permeability potential while keeping the water absorbent rate)), the water absorbent polyacrylic acid (salt) resin of the present invention is water absorbent polyacrylic acid (salt) resin having: 95 wt % or more of particles whose diameter is not less than 150 µm and less than 850 µm; logarithmic standard deviation (σζ) of particle size distribution of 0.25 to 0.50; absorption against pressure (AAP) of 20 [g/g] or more; a water absorbing rate (FSR) of 0.30 [g/g/s] or more; and an internal cell ratio of 0.1% to 2.5%, which is calculated by the following expression.

(Internal cell ratio)[%]={(real density)−(apparent density)}/(real density)×100

Advantageous Effects of Invention

According to the present invention, it is possible to produce water absorbent resin having high permeability potential (SFC, etc.) and a high water absorbing rate (FSR, etc.) by (i) applying appropriate shearing stress and compressive force to a hydrogel crosslinked polymer by at least one gel grinding of the above-described (1) through (4), (ii) drying the hydrogel crosslinked polymer, and (iii) further subjecting dried hydrogel crosslinked polymer to a surface treatment.

Further, it is possible to produce water absorbent resin powder having permeability potential (SFC) and a water absorbing rate (FSR) higher than those of water absorbent resin produced by a conventional production method, by (i) drying, under a specific condition, a particulate hydrogel crosslinked polymer having specific weight average particle diameter, specific logarithmic standard deviation of particle size distribution, and specific resin solid content, the particulate hydrogel crosslinked polymer being obtained by applying appropriate shearing stress and compressive force to a hydrogel crosslinked polymer by gel grinding of (4), etc., and then (ii) subjecting a dried particulate hydrogel crosslinked polymer to a surface treatment.

DESCRIPTION OF EMBODIMENTS

Figure 1:
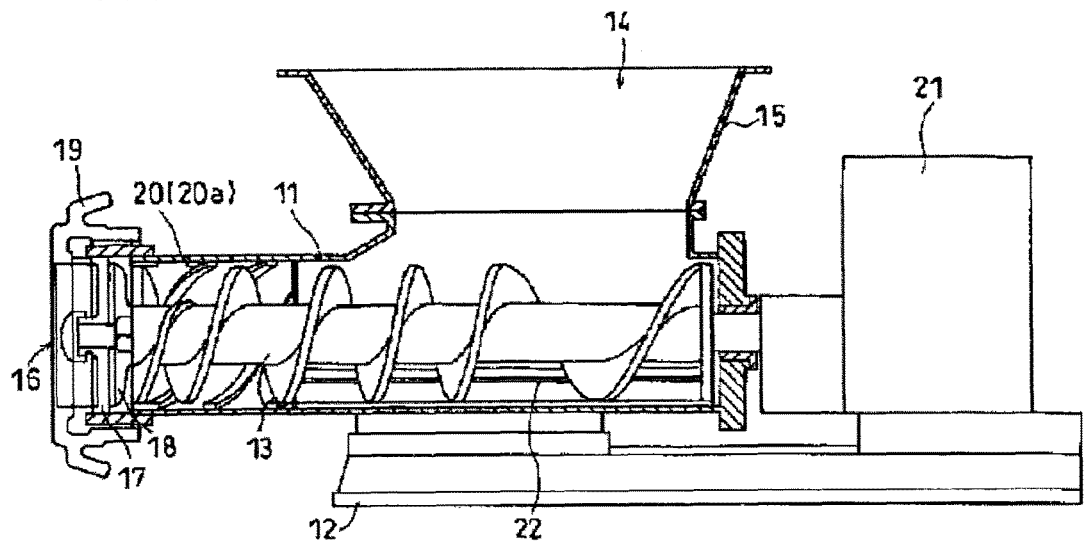
FIG. 1 is a diagram schematically illustrating a configuration of a screw extruder to be used in a step of grinding a hydrogel crosslinked polymer.

In the following, a method for producing water absorbent polyacrylic acid (salt) resin powder and the water absorbent polyacrylic acid (salt) resin powder according to the present invention are described in detail. It should be noted that the scope of the present invention is not limited to the description and the present invention can be embodied with modifications other than the following exemplary embodiments but not departing from the gist of the present invention. More specifically, the present invention shall not be construed as being limited to the following embodiments, and may be modified in many ways within the scope of the following claims. The technical scope of the present invention can encompass any modifications obtainable by appropriately combining technical means disclosed in different embodiments.

[1] Definition of Terms (1-1) "Water Absorbent Resin"

What is meant by the wording "water absorbent resin" in the present invention is a water-swellable water-insoluble polymer gelling agent. Note that being "water swellable" is to have CRC (absorbency without pressure, defined in ERT 442.2-02) of 5 [g/g] or more, and being "water insoluble" is to have Ext (water soluble content, defined in ERT 470.2-02) of 0 to 50 wt %.

The water absorbent resin can be designed as suitable for its purposes, and is not limited to a particular structure. It is, however, preferable that the water absorbent resin be a hydrophilic crosslinked polymer in which an unsaturated monomer(s) having a carboxyl group is crosslinkingly polymerized. Further, the water absorbent resin is not limited to an embodiment in which the water absorbent resin is totally a polymer (100 wt %). As long as the above properties are ensured, the water absorbent resin can be subjected to surface cross-linking or may contain an additive or the like.

In the present invention, water absorbent resin obtained by grinding the hydrophilic crosslinked polymer into powder, which water absorbent resin has not been subjected to a surface treatment or surface cross-linking, is, for convenience, referred to as "water absorbent resin particles", whereas water absorbent resin obtained by grinding the hydrophilic crosslinked polymer into powder, which water absorbent resin has been subjected to a surface treatment or surface cross-linking, is referred to as "water absorbent resin powder". Further, water absorbent resin having different shapes (such as shapes of sheet, fiber, film and gel) in steps, and a water absorbent resin composition including, for example, an additive are referred to as "water absorbent resin".

(1-2) "Polyacrylic Acid (Salt)"

In the present invention, the wording "polyacrylic acid (salt)" means a polymer, which may contain a graft component as appropriate, and whose main component is acrylic acid and/or its salt (hereinafter, can be referred to as acrylic acid (salt)) as its repeating unit. More specifically, what is meant by the "polyacrylic acid (salt)" is a polymer in which acrylic acid (salt) essentially accounts for 50 mol % to 100 mol % in the total monomer content (except an internal crosslinking agent) to be polymerized, preferably a polymer in which acrylic acid (salt) accounts for 70 mol % to 100 mol % in the total monomer content, more preferably a polymer in which acrylic acid (salt) accounts for 90 mol % to 100 mol % in the total monomer content, and especially preferably a polymer in which acrylic acid (salt) accounts for substantially 100 mol % in the total monomer content. Moreover, in a case where polyacrylic acid salt is used as a polymer, the polyacrylic acid salt essentially contains water-soluble salt, and a main component of neutralization salt is preferably monovalent salt, more preferably alkali metal salt or ammonium salt, further more preferably alkali metal salt, and especially preferably sodium salt.

(1-3) "EDANA" and "ERT"

"EDANA" is abbreviation of European Disposables and Nonwovens Associations. "ERT" is abbreviation of EDANA Recommended Test Methods, which is a water-absorbable resin measuring method adopted as the European standard (substantially global standard). In the present invention, unless otherwise specified, measurement is carried out according to the ERT master copy (Known Literature: 2002 revised version).

(a) "CRC" (ERT 441. 2-02)

"CRC" stands for Centrifuge Retention Capacity, and means absorbency without pressure (hereinafter, may be refereed to as "absorbency"). More specifically, CRC is absorbency (unit; g/g) measured by allowing 0.200 g of water absorbent resin wrapped in unwoven cloth to freely swell with a 0.9 wt % sodium chloride aqueous solution in a largely excess amount for 30 minutes and then draining the water absorbent resin by using a centrifugal device. Note that CRC of a hydrogel crosslinked polymer (hereinafter referred to as "gel CRC") was also measured under a condition where a sample and a free swelling time were changed to 0.4 g and 24 hours, respectively.

(b) "AAP" (ERT 442.2-02)

"AAP" stands for Absorption Against Pressure, and means absorbency measured under load. More specifically, AAP is absorbency (unit; g/g) measured by allowing 0.900 g of water absorbent resin to swell with a 0.9 wt % sodium chloride aqueous solution for 1 hour under load of 2.06 kPa (0.3 psi, 21 [g/cm$^2$]). Note that AAP is referred to as Absorption Under Pressure in ERT 442.2-02. AAP and AUP are substantially identical with each other. In the present invention and Example, AAP was measured with load of 4.83 kPa (0.7 psi, 49 [g/cm$^2$]).

(c) "Ext" (ERT 470.2-02)

"Ext" stands for Extractables, and means water soluble content (water soluble component amount). More specifically, Ext is water soluble content (unit; wt %) measured by adding 1.000 g of water absorbent resin into 200 ml of 0.9 wt % sodium chloride aqueous solution, stirring for 16 hours, and measuring, by pH titration, an amount of water soluble content dissolved in a polymer. Note that water soluble content of a hydrogel crosslinked polymer (herein- after referred to as "gel Ext") was also measured under a condition where a sample and a stirring time were changed to 5.0 g and 24 hours, respectively.

(d) "PSD" (ERT 420.2-02)

"PSD" stands for Particle Size Distribution, and means particle size distribution measured by classification by sieving. Here, a weight average particle diameter (D50) and a particle size distribution range are measured by the same method as one described in "(1) Average Particle Diameter and Distribution of Particle Diameter" in page 7, lines 25 through 43 in the specification of EP Patent No. 0349240. Note that a method for measuring PSD of a hydrogel crosslinked polymer will be described later. A standard sieve (mesh size) to be used for particle size measurement can be changed as appropriate in accordance with a particle size of a target to be measured. For example, standard sieves having respective mesh sizes of, for example, 710 μm and 600 μm can be employed. EP Patent No. 1594556 can be referred as appropriate for measurement conditions, etc. which are not disclosed in EP Patent No. 0349240.

(e) "Residual Monomers" (ERT410.2-02)

"Residual monomers" mean quantity of monomers left in water absorbent resin (hereinafter referred to as "residual monomers"). Specifically, residual monomers are quantity (unit; ppm) of monomers dissolved by stirring, at 500 rpm for 1 hour by use of a 35 mm stirrer chip, 200 ml of 0.9 wt % sodium chloride aqueous solution to which 1.0 g of water absorbent resin has been added. The quantity of residual monomers is measured by HPLC (high performance liquid chromatography). Note that residual monomers of a hydrogel crosslinked polymer were also measured under a condition where a sample and a stirring time were changed to 2 g and 3 hours, respectively. An obtained measurement value is converted into weight (unit; ppm) per resin solid content of the hydrogel crosslinked polymer.

(f) "Moisture Content" (ERT430.2-02)

"Moisture content" means moisture content of water absorbent resin. Specifically, the moisture content (unit; wt %) is calculated from drying loss obtained by drying 1 g of water absorbent resin at 105° C. for three hours. Note that in the present invention, drying temperature was changed to 180° C., measurement was carried out 5 times for each sample, and an average value calculated from the five measurements was employed. Moisture content of a hydrogel crosslinked polymer was also measured under a condition where a sample, drying temperature, and drying time were changed to 2 g, 180° C., and 16 hours, respectively. Note also that a value calculated by (100−moisture content (wt %)) is "resin solid content" in the present invention, and the resin solid content can be applied to the water absorbent resin and the hydrogel crosslinked polymer.

(g) "Density" (ERT460.2-02)

"Density" means bulk specific gravity of water absorbent resin. Specifically, the density is weight (unit; [g/ml]) of water absorbent resin filling a 100 mL container into which 100 g of water absorbent resin which has been supplied into a device satisfying EDANA standards is freely dropped.

(h) "Flow Rate" (ERT450.2-02)

"Flow rate" means a flow rate of water absorbent resin. Specifically, the flow rate is a period of time (unit; sec) required for discharging, from an opening in an undermost part of a device satisfying EDANA standards, 100 g of water absorbent resin which has been supplied into the device.

(1-4) "Permeability Potential"

"Permeability potential" of the present invention regards flowing of a liquid between particles of swollen gel under load or without load. The "permeability potential" is measured typically as SFC (Saline Flow Conductivity) or GBP (Gel Bed Permeability).

"SFC" is permeability potential of water absorbent resin for 0.69 wt % sodium chloride aqueous solution under load of 2.07 kPa, and measured according to the SFC test method described in U.S. Pat. No. 5,669,894. Moreover, "GBP" is permeability potential of water absorbent resin for 0.69 wt % sodium chloride aqueous solution wherein the water absorbent resin is under load or allowed to freely swell. GBP is measured according to the GBP test method described in PCT International Publication No. 2005/016393.

(1-5) "FSR"

"FSR" of the present inventions is abbreviation of Free Swell Rate, and means a water absorbing rate (free swell rate). Specifically, FSR is a rate (unit; [g/g/s]) at which 1 g of water absorbent resin absorbs 20 g of 0.9 wt % sodium chloride aqueous solution.

(1-6) "Gel Grinding"

"Gel Grinding" of the present invention means reducing, by shearing stress and compressive force, the size of a hydrogel crosslinked polymer obtained in a polymerization process (preferably aqueous polymerization or unstirred aqueous polymerization (static aqueous polymerization), especially preferably belt polymerization) so as to increase a surface area of the hydrogel crosslinked polymer, so that the hydrogel crosslinked polymer is easily dried. Specifically, the gel grinding means subjecting, to gel grinding, the hydrogel crosslinked polymer obtained in the polymerization step so as to have (i) a weight average particle diameter (D50) in a range of 300 μm to 3000 μm, and more preferably in a range of 350 μm to 2000 μm, and (ii) logarithmic standard deviation (σζ) of particle size distribution in a range of 0.2 to 1.0.

Note that the hydrogel crosslinked polymer can have different shapes depending on types of a polymerizer. In, for example, kneader polymerization, polymerization and gel grinding are continuously carried out in an identical device, while in unstirred aqueous polymerization (static aqueous polymerization, particularly belt polymerization), gel grinding is carried out after polymerization. The gel grinding can be carried out during or after polymerization provided that a particulate hydrogel crosslinked polymer to be dried have the following range of weight average particle diameter (D50).

(1-7) "Weight Average Molecular Weight of Water Soluble Content"

"Weight average molecular weight of water soluble content" of the present invention is weight average molecular weight (unit; daltons, hereinafter simply referred to as [Da]) of a component (water soluble content) of water absorbent resin, which component is dissolved in an aqueous medium. The weight average molecular weight is measured by GPC (gel permeation chromatography). That is, the weight average molecular weight is obtained by measuring, by GPC, a solution measured by the method described in '(1-3) (c) "Ext"'. Note that weight average molecular weight of water soluble content of a hydrogel crosslinked polymer was also measured under a condition where (i) a sample having a particle diameter of not more than 5 mm, further 1 mm through 3 mm and (ii) a stirring time were changed to 5.0 g and 24 hours, respectively.

(1-8) "Gel Grinding Energy" (GGE and GGE (2))

"Gel grinding energy" of the present invention means mechanical energy per unit weight (unit weight of a hydrogel crosslinked polymer), which mechanical energy is necessary for a gel grinding device to grind the hydrogel crosslinked polymer. The gel grinding energy does not include energy for heating or cooling a jacket and energy of water and steam to be supplied. Note that "Gel Grinding Energy" is abbreviated as "GGE". GGE is calculated by the following expression (1) in a case where the gel grinding device is driven by a three-phase alternating current power supply.

[Mathematical Expression 1]

$$\text{GEE } [J/g] = \{\sqrt{3} \times \text{voltage} \times \text{current} \times \text{power factor} \times \text{motor efficiency}\} / \{\text{weight of hydrogel crosslinked polymer to be supplied into gel grinding device for one second}\} \quad \text{Expression (1)}$$

The "power factor" and the "motor efficiency" are respective characteristic values for the gel grinding device in a range of 0 to 1, which values change depending on an operation condition etc. of the gel grinding device. It is possible to know the characteristic values by inquiring them from a manufacturer etc. of the gel grinding device. In a case where the gel grinding device is driven by a single-phase alternating current power supply, GGE can be calculated by replacing "$\sqrt{3}$" with "1" in the above Expression (1). Note that voltage unit is [V], current unit is [A], and unit of weight of a hydrogel crosslinked polymer is [g/s].

It is preferable in the present invention that the gel grinding energy be calculated without a current value of the gel grinding device during idling. This is because the mechanical energy to be applied to the hydrogel crosslinked polymer is important. Especially in a case where a plurality of gel grinding devices are employed, a total current value of the plurality of gel grinding devices during idling becomes great. It is therefore suitable to calculate GGE without the total current value. The gel grinding energy is calculated by the following Expression (2). Note that GGE calculated by Expression (2) is described as GGE (2) so as to be separated from GGE calculated by Expression (1).

[Mathematical Expression 2]

$$\text{GGE (2)}[J/g] = \{\sqrt{3} \times \text{voltage} \times (\text{current during gel grinding} - \text{current during idling}) \times \text{power factor} \times \text{motor efficiency}\} / \{\text{weight of hydrogel crosslinked polymer to be supplied into gel grinding device for one second}\} \quad \text{Expression (2)}$$

The "power factor" and the "motor efficiency" in GGE (2) are values during gel grinding. Note that values of the power factor and the motor efficiency during idling are approximately defined as in Expression (2) because a current value during idling is small. The "weight of hydrogel crosslinked polymer to be supplied into gel grinding device for one second [g/s]" in Expressions (1) and (2) is a conversion value of [t/hr] into [g/s] in a case where an amount of the hydrogel crosslinked polymer to be continuously supplied by a quantitative feeder is [t/hr].

(1-9) Others

In this specification, the expression "X to Y" for expressing a range means "not less than X and not more than Y". The weight unit "t (ton)" means "Metric ton". Further, unless otherwise specified, "ppm" means "ppm by weight". Moreover, "weight" and "mass", "wt %" and "mass %", and "parts by weight" and "parts by mass" are synonymous with each other correspondingly herein. Further, the wording " . . . acid (salt)" means " . . . acid and/or salt thereof". The wording "(meth)acrylic" means "acrylic and/or methacrylic".

[2] Method for Producing Water Absorbent Polyacrylic Acid (Salt) Resin Powder (2-1) Polymerization Step The polymerization step is a step for polymerizing an aqueous solution whose main component is acrylic acid (salt) so as to obtain a hydrogel crosslinked polymer (hereinafter may be referred to as "hydrogel").

(Monomer)

Water absorbent resin powder to be produced in the present invention is made from a material (monomers) whose main component is acrylic acid (salt). The water absorbent resin powder is normally polymerized in a state of an aqueous solution. Monomer concentration in a monomer aqueous solution is preferably in a range of 10 wt % to 80 wt %, more preferably in a range of 20 wt % to 80 wt %, further more preferably in a range of 30 wt % to 70 wt %, and especially preferably in a range of 40 wt % to 60 wt %.

It is preferable in terms of absorbency and residual monomers that the hydrogel obtained by the polymerization of the monomer aqueous solution have a polymer structure having acid groups, at least some of which are neutralized. Such partial neutralization salt is not limited to a specific one but is, in terms of absorbency, preferably monovalent salt selected from a group consisting of alkali metal salt, ammonium salt, and amine salt, more preferably alkali metal salt, further more preferably alkali metal salt selected from a group consisting of sodium salt, lithium salt, and potassium salt, and especially preferably sodium salt. Therefore, a basic substance to be used for such neutralization is not limited to a specific one but is preferably a monovalent basic substance such as (i) a hydroxide of alkali metal including sodium hydroxide, potassium hydroxide, and lithium hydroxide or (ii) carbonate (hydrogen carbonate) including sodium carbonate (hydrogen carbonate) and potassium carbonate (hydrogen carbonate), and especially preferably sodium hydroxide.

The neutralization can be carried out in various ways and under various conditions before, during, and after the polymerization. For example, hydrogel obtained by polymerizing unneutralized or low-neutralized (for example, 0 through 30 mol % neutralized) acrylic acid can be neutralized, particularly neutralized while being ground. It is, however, preferable in terms of improvement in productivity, property, etc. that unpolymerized acrylic acid be neutralized. That is, it is preferable that neutralized acrylic acid (partial neutralization salt of acrylic acid) be used as a monomer.

A rate of the neutralization is not limited to a specific one but is, as a product of water absorbent resin, preferably in a range of 10 mol % to 100 mol %, more preferably in a range of 30 mol % to 95 mol %, further more preferably in a range of 45 mol % to 90 mol %, and especially preferably in a range of 60 mol % to 80 mol %. Temperature of the neutralization is neither limited to a specific one but is preferably in a range of 10° C. to 100° C., and more preferably in a range of 30° C. to 90° C. As to other neutralization process conditions, the condition disclosed in EP Patent No. 574260 is preferably applied to the present invention. Note that it is preferable that the hydrogel having the rate of the neutralization in the above range be ground in the following gel grinding step.

In order to improve properties of the water absorbent resin powder to be produced in the present invention, it is possible to add an arbitrary component such as (i) aqueous resin or water absorbent resin including starch, cellulose, polyvinyl alcohol (PVA), polyacrylic acid (salt), and polyethyleneimine, (ii) a forming agent including carbonate, an azo compound, and air bubble, (iii) an interfacial active agent, or (iv) an additive, to the monomer aqueous solution, the hydrogel, a dried polymer, the water absorbent resin, etc. in a step of a production process of the present invention. In a case where the aqueous resin or the water absorbent resin is added, an amount of the aqueous resin or the water absorbent resin to add is preferably in a range of 0 to 50 wt % with respect to monomer, more preferably in a range of 0 to 20 wt %, further more preferably in a range of 0 to 10 wt %, and especially preferably in a range of 0 to 3 wt %. In a case where the foaming agent, the interfacial active agent, or the additive is added, an amount of the foaming agent, the interfacial active agent, or the additive to add is preferably in a range of 0 to 5 wt %, and more preferably in a range of 0 to 1 wt %. Note that a graft polymer or a water absorbent resin composition can be obtained by addition of the aqueous resin or the water absorbent resin. A polymer of starch and acrylic acid, a polymer of PVA and acrylic acid, and like polymer are also regarded as water absorbent polyacrylic acid (salt) resin in the present invention.

Further, a chelating agent, an α-hydroxycarboxylic compound, or an inorganic reducing agent can be used in order to improve (i) color tone stability of the water absorbent resin powder to be produced in the present invention (color tone stability of the water absorbent resin powder which is stored for a long period of time under high temperature and high humidity) and (ii) urine resistance (prevention of gel deterioration) of the water absorbent resin powder. Among these, the chelating agent is especially preferably used. An amount of the chelating agent, the α-hydroxycarboxylic compound, or the inorganic reducing to use is preferably in a range of 10 ppm through 5000 ppm with respect to the water absorbent resin, more preferably in a range of 10 ppm through 1000 ppm, further more preferably in a range of 50 ppm through 1000 ppm, and especially preferably in a range of 100 ppm through 1000 ppm. Note that the compounds disclosed in U.S. Pat. No. 6,599,989 or PCT International Publication No. 2008/090961 are employed as the chelating agent of the present invention. Among the compounds, an aminocarboxylate metal chelating agent, and a polyvalent phosphate compound are preferably employed.

In the present invention, in a case where acrylic acid (salt) is employed as a main component, a hydrophilic or hydrophobic unsaturated monomer(s) (hereinafter referred to as "other monomer(s)") other than the acrylic acid (salt) may be used in combination with the acrylic acid (salt). Such other monomer(s) is not limited to a specific one. Examples of the other monomer(s) encompass methacrylic acid, (anhydrous) maleic acid, 2-(meth)acrylamide-2-methyl propanesulfonic acid, (meth)acryloxyalkanesulfonic acid, N-vinyl-2-pyrolidone, N-vinylacetamide, (meth)acrylamide, N-isopropyl(meth)acrylamide, N,N-dimethyl(meth)acrylamide, 2-hydroxyethyl(meth)acylate, methoxypolyethyleneglycol(meth)acrylate, polyethyleneglycol(meth)acrylate, stearylacrylate, and salts thereof. An amount of the other monomer(s) to use is determined as appropriate so as not to impair absorbency of the water absorbent resin powder, and is preferably, but not limited to, in a range of 0 to 50 mol % with respect to the total monomer weight, more preferably in a range of 0 to 30 mol %, and further more preferably in a range of 0 to 10 mol %.

(Internal Crosslinking Agent)

It is preferable in terms of the absorbency of the water absorbent resin powder to be produced in the present invention that a crosslinking agent (hereinafter may be referred to as an "internal crosslinking agent") be used. The internal crosslinking agent is not limited to a specific one. Examples of the internal crosslinking agent encompass a polymerizable crosslinking agent which is polymerizable with acrylic acid, a reactive crosslinking agent which is reactive with a carboxyl group, and a crosslinking agent which is polymerizable with acrylic acid and reactive with a carboxyl group.

Examples of the polymerizable crosslinking agent encompass compounds each having at least two polymerizable double bonds in a molecule, such as N,N'-methylene bisacrylamide, (poly)ethylene glycol di(meth)acrylate, (polyoxyethylene)trimethylolpropane tri(meth)acrylate, and poly(meth)allyloxy alkanes. Examples of the reactive crosslinking agent encompass (i) covalent bonding crosslinking agents such as polyglycidyl ether (e.g., ethyleneglycoldiglycidyl ether) and, polyvalent alcohol (e.g., propanediol, glycerine, and sorbitol), and (ii) an ionic bonding crosslinking agent such as a polyvalent metal compound (e.g., aluminum salt). Among these, in terms of the absorbency, the internal crosslinking agent is more preferably the polymerizable crosslinking agent which is polymerizable with acrylic acid, and especially preferably an acrylate, allyl or acrylamide polymerizable crosslinking agent. One or more types of the internal crosslinking agents can be employed. Note that in a case where the polymerizable crosslinking agent and the reactive crosslinking agent are used in combination, a combination ratio thereof is preferably 10:1 through 1:10.

An amount of the internal crosslinking agent to use is, in terms of the properties, preferably in a range of 0.001 mol % to 5 mol % with respect to the total monomer weight excluding a crosslinking agent, more preferably in a range of 0.002 mol % to 2 mol %, further more preferably in a range of 0.04 mol % to 1 mol %, especially preferably in a range of 0.06 mol % to 0.5 mol %, and most preferably in a range of 0.07 mol % to 0.2 mol %. Moreover, in an especially preferable embodiment of the present invention, an amount of the polymerizable crosslinking agent to use is preferably in a range of 0.01 mol % to 1 mol %, more preferably in a range of 0.04 mol % to 0.5 mol %, and further more preferably in a range of 0.07 mol % to 0.1 mol %.

(Polymerization Initiator)

The polymerization initiator for use in the present invention is selected as appropriate, considering how the polymerization is carried out. Any polymerization initiator is applicable. For example, a photolytic polymerization initiator, a pyrolysis polymerization initiator, a redox polymerization initiator, and the like can be exemplified.

Examples of the photolysis polymerization initiator encompass benzoin derivative, benzyl derivative, acetophenone derivative, benzophenone derivative, and azo compound. Moreover, examples of the pyrolysis polymerization initiator encompass (i) persulfates such as sodium persulfate, potassium persulfate, and ammonium persulfate, (ii) peroxides such as hydrogen peroxide, t-butyl peroxide, and methyl-ethyl-ketone peroxide, and (iii) azo compounds such as 2,2'-azobis(2-amidino propane) dihydrochloride, and 2,2'-azobis [2-(2-imidazoline 2-yl) propane] dihydrochloride. Furthermore, examples of the redox polymerization initiator encompass mixtures having persulfate or peroxide together with a reducible compound, such as L-ascorbic acid or sodium hydrogensulfite in combination. Moreover, it is one preferable embodiment to use the above-mentioned photolytic polymerization initiator and pyrolysis polymerization initiator in combination.

An amount of the polymerization initiator to use is preferably in a range of 0.0001 mol % to 1 mol %, and more preferably in a range of 0.0005 mol % to 0.5 mol %, with respect to the total monomer weight. In a case where the amount of the polymerization initiator exceeds 1 mol %, the polymerization initiator would adversely affect a color tone of the water absorbent resin. Moreover, it is not preferable that the amount of the polymerization initiator is less than 0.0001 mol %, because, if so, this would result in increase in residual monomers.

(Polymerization Method)

Particulate hydrogel can be polymerized by spraying droplet polymerization or reverse-phase suspension polymerization in the method for producing the water absorbent resin powder of the present invention. Meanwhile, in view of the permeability potential (SFC) and the water absorbing rate (FSR) of the water absorbent resin powder, and in order to easily control the polymerization, aqueous polymerization is carried out. The aqueous polymerization can be tank-type (silo-type) unstirring polymerization but preferably kneader polymerization or belt polymerization, more preferably continuous aqueous polymerization, further more preferably high-concentration continuous aqueous polymerization, and especially preferably high-concentration high-temperature starting continuous aqueous polymerization. Note here that what is meant by stirring polymerization is polymerizing carried out under stirring of the hydrogel, especially under stirring and grinding of the hydrogel (wherein the hydrogel is particularly hydrogel having a polymerization ratio of not less than 10 mol %, further particularly hydrogel having a polymerization ratio of not less than 50 mol %). The stirring of the monomer aqueous solution (having a polymerization ratio of less than 0 to 10 mol %) may be carried out as appropriate before and/or after the unstirring polymerization.

Examples of the continuous aqueous polymerization encompass continuous kneader polymerization (disclosed in U.S. Pat. Nos. 6,987,171 and 6,710,141, etc.), and continuous belt polymerization (disclosed in U.S. Pat. Nos. 4,893,999 and 6,241,928, US Patent Application Publication No. 2005/215734, etc.). These aqueous polymerizations can produce the water absorbent resin powder with high productivity.

In the high-concentration continuous aqueous polymerization, monomer concentration (solid content) is preferably not less than 35 wt %, more preferably not less than 40 wt %, and further more preferably not less than 45 wt % (but not more than saturated concentration). In high-temperature starting continuous aqueous polymerization, polymerization starting temperature is preferably not less than 30° C., more preferably not less than 35° C., further more preferably not less than 40° C., and especially preferably not less than 50° C. (but not more than boiling temperature). The high-concentration high-temperature starting continuous aqueous polymerization is a combination of the high-concentration continuous aqueous polymerization and the high-temperature starting continuous aqueous polymerization.

The high-concentration high-temperature starting continuous aqueous polymerization (disclosed in U.S. Pat. Nos. 6,906,159 and 7,091,253, etc.) is preferable because it can produce the water absorbent resin powder with a high degree of whiteness, and can be easily applied to industrial-scale production.

Therefore, the polymerization method in the production method of the present invention is suitably applicable to a large-scale production device having a great production volume per a production line. Note here that the production volume is preferably not less than 0.5 [t/hr], more preferably not less than 1 [t/hr], further more preferably 5 [t/hr], and especially preferably 10 [t/hr].

The polymerization may be carried out under air atmosphere. It is, however, preferable in terms of coloring prevention that the polymerization be carried out under inert gas atmosphere such as water vapor, nitrogen, or argon (with, for example, an oxygen concentration of not more than 1 volume %). It is further preferable that the polymerization be carried out after oxygen dissolved in a monomer(s) or in a solution containing a monomer(s) is substituted for (deaerated with) inert gas (by, for example, less than 1 [mg/L] of oxygen). By carrying out such deaeration, it is possible to provide the water absorbent resin powder with a further excellent property and a high degree of whiteness, in which water absorbent resin powder the monomer(s) has an excellent stability, and gelling is not caused before polymerization.

(2-2) Gel Grinding Step

The gel grinding step is a step for grinding the hydrogel crosslinked polymer during or after polymerization to obtain a particulate hydrogel crosslinked polymer (hereinafter can be referred to as "particulate hydrogel"). Note that the gel grinding step is called "gel grinding" so as to be separated from "grinding" in "(2-4) Grinding Step and Classifying Step".

(Property of Hydrogel Before Gel Grinding)

According to the method for producing the water absorbent resin powder of the present invention (first producing method), the gel grinding energy (GGE) is controlled in a specific range. In the first producing method, it is preferable to subject, to gel grinding, a hydrogel crosslinked polymer (polyacrylic acid (salt) crosslinked polymer), at least one of which gel temperature, resin solid content, gel CRC, gel Ext, and weight average molecular weight of water soluble content is controlled in the following range.

That is, the method for producing the water absorbent resin powder of the present invention (first producing method) is, for example, a method for producing water absorbent polyacrylic acid (salt) resin powder, including the steps of: (i) polymerizing an acrylic acid (salt) monomer aqueous solution; (ii) during or after the step of (i), performing gel grinding of a hydrogel crosslinked polymer obtained by the polymerization, wherein the hydrogel crosslinked polymer has resin solid content of 10 wt % to 80 wt %, and the gel grinding is carried out with gel grinding energy (GGE) of 18 [J/g] to 60 [J/g]; (iii) drying a particulate hydrogel crosslinked polymer obtained by the gel grinding, wherein the drying is performed at 150° C. to 250° C.; and (iv) carrying out a surface treatment to the particulate hydrogel crosslinked polymer thus dried.

According to the method for producing the water absorbent resin powder of the present invention (second producing method), the gel grinding energy (2) (GGE (2)) is controlled in a specific range. In the second producing method, it is preferable to subject, to gel grinding, a hydrogel crosslinked polymer (polyacrylic acid (salt) crosslinked polymer), at least one of which gel temperature, resin solid content, gel CRC, gel Ext, and weight average molecular weight of water soluble content is controlled in the following range.

The method for producing the water absorbent resin powder of the present invention (second producing method) is a method for producing water absorbent polyacrylic acid (salt) resin powder, including the steps of: (i) polymerizing an acrylic acid (salt) monomer aqueous solution; (ii) during or after the step of (i), performing gel grinding of a hydrogel crosslinked polymer obtained by the polymerization, wherein the hydrogel crosslinked polymer has resin solid content of 10 wt % to 80 wt %, and the gel grinding is carried out with gel grinding energy (2) (GGE (2)) of 9 [J/g] to 40 [J/g]; (iii) drying a particulate hydrogel crosslinked polymer obtained by the gel grinding, wherein the drying is performed at 150° C. to 250° C.; and (iv) carrying out a surface treatment to the particulate hydrogel crosslinked polymer thus dried.

Note that conventional gel grinding techniques are mainly techniques of applying shearing stress as less as possible (see U.S. Pat. Nos. 7,694,900, 6,565,768 and 6,140,395, etc.). In contrast, a gel grinding technique of the present invention is characteristic in applying shearing stress greater than conventional shearing stress so as to increase the weight average molecular weight of the water soluble content.

(a) Gel Temperature

For the sake of particle diameter control and properties, temperature (gel temperature) of hydrogel before gel grinding is preferably in a range of 40° C. to 120° C., more preferably in a range of 60° C. to 120° C., further more preferably in a range of 60° C. to 110° C., and especially preferably in a range of 65° C. to 110° C. A gel temperature lower than 40° C. results in a greater hardness of the resultant hydrogel, thereby making it difficult to control a particle shape and particle size distribution in grinding. Moreover, a gel temperature higher than 120° C. results in a greater softness of the resultant hydrogel on the contrary, thereby making it difficult to control the particle shape and the particle size distribution. The gel temperature can be controlled appropriately by the polymerization temperature, post-polymerization heating, heat-retaining or cooling, etc.

(b) Resin Solid Content

Resin solid content of hydrogel before gel grinding is, in terms of properties, in a range of 10 wt % to 80 wt %, preferably in a range of 30 wt % to 80 wt %, more preferably in a range of 40 wt % to 80 wt %, further more preferably in a range of 45 wt % to 60 wt %, and especially preferably in a range of 50 wt % to 60 wt %. Resin solid content less than 10 wt % is not preferable because it results in a greater softness of the resultant hydrogel, thereby making it difficult to control the particle shape and the particle size distribution. Moreover, resin solid content greater than 80 wt % is neither preferable because it results in a greater hardness of the resultant hydrogel on the contrary, thereby making it difficult to control the particle shape and the particle size distribution. The resin solid content of the hydrogel can be appropriately controlled by polymerization concentration, moisture vaporization during polymerization, addition of water absorbent resin fine powder (fine powder recycling step) in a polymerization step, or if necessary, moisturization or partial drying after polymerization.

Note that the resin solid content of the hydrogel before the gel grinding is calculated from the drying loss described in (f) of (1-3) after the hydrogel is cut or fragmented by use of scissors, a cutter, or the like so as to have a side of not more than 5 mm, preferably a side of 1 mm through 3 mm. Gel grinding energy during the cutting by use of the scissors, the cutter, or the like is substantially zero.

(c) Gel CRC

CRC (gel CRC) of hydrogel before gel grinding is preferably in a range of 10 [g/g] to 35 [g/g], more preferably in a range of 10 [g/g] to 32 [g/g], and further more preferably in a range of 10 [g/g] to 30 [g/g], and especially preferably in a range of 15 [g/g] to 30 [g/g]. Gel CRC less than 10 [g/g] or more than 35 [g/g] is not preferable because it makes it difficult to control the particle shape and the particle size distribution during the gel grinding. The gel CRC of the hydrogel before the gel grinding can be appropriately controlled by an amount of crosslinking agent to add during polymerization, polymerization concentration, or the like. Note that it is conventionally well-known that it is preferable that water absorbent resin have a high CRC. It was, however, found in the present invention that the gel CRC more than 35 [g/g] makes it difficult to control the particle shape and the particle size distribution.

Note that the gel CRC of the hydrogel before the gel grinding is calculated by a measurement method that will be described in (a) of [Examples] after the hydrogel is cut or fragmented by use of scissors, a cutter, or the like so as to have a side of not more than 5 mm, preferably a side of 1 mm through 3 mm.

(d) Gel Ext

Water soluble content (gel Ext) of hydrogel before gel grinding is preferably in a range of 0.1 wt % to 10 wt %, more preferably in a range of 0.5 wt % to 8 wt %, and further more preferably in a range of 1 wt % to 5 wt %. Gel Ext more than wt % results in excessive increase in weight average molecular weight of water soluble content due to shearing stress during the gel grinding, thereby failing to attain a desired permeability potential. The gel Ext of the hydrogel before the gel grinding is preferably small. However, a lower limit of the gel Ext should be in the above range in terms of balance with the above (c) Gel CRC, a manufacturing cost necessary for reduction in the gel Ext, decline in productivity, etc.

Note that the gel Ext of the hydrogel before the gel grinding is calculated by a measurement method that will be described in (b) of [Examples] after the hydrogel is cut or fragmented by use of scissors, a cutter, or the like so as to have a side of not more than 5 mm, preferably a side of 1 mm through 3 mm.

(e) Weight Average Molecular Weight of Water Soluble Content

Weight average molecular weight of water soluble content of hydrogel before gel grinding is preferably in a range of 50,000 [Da] to 450,000 [Da], more preferably in a range of 100,000 [Da] to 430,000 [Da], and further more preferably in a range of 150,000 [Da] to 400,000 [Da].

Weight average molecular weight of water soluble content of less than 50,000 [Da] results in reduction in particle diameter of particulate hydrogel obtained after the gel grinding, thereby making it impossible to produce the water absorbent resin powder having a desired property. Moreover, hydrogel having weight average molecular weight of water soluble content of more than 450,000 [Da] has less crosslinking points, and is damaged by shearing stress more than necessary. This possibly deteriorates properties such as increase in the water soluble content after the gel grinding. The weight average molecular weight of the water soluble content of the hydrogel before the gel grinding can be appropriately controlled by, for example, an amount of crosslinking agent to add during polymerization, polymerization concentration, or if necessary, a chain transfer agent.

Note that the weight average molecular weight of the water soluble content of the hydrogel before the gel grinding is calculated by a measurement method that will be described in (c) of [Examples] after the hydrogel is cut or fragmented by use of scissors, a cutter, or the like so as to have a side of not more than 5 mm, preferably a side of 1 mm through 3 mm.

(Gel Grinding Device)

Any kinds of gel grinding devices are applicable to the gel grinding step, for example, a gel grinder having a plurality of rotational stirring blades such as a batch-type or continuous double-armed kneader, a single- or twin-screw extruder, a meat chopper, particularly a screw extruder, etc. can be adopted.

Among these devices, the screw extruder having a porous die at an end of a casing is preferable. For example, a screw extruder disclosed in Japanese Patent Application Publication, Tokukai, No. 2000-63527 A can be adopted. The following describes a screw extruder with reference to FIG. 1.

The screw extruder illustrated in FIG. 1 includes a casing 11, a base 12, a screw 13, a feed opening 14, a hopper 15, an extrusion opening 16, a porous die 17, a rotational blade 18, a ring 19, a backflow preventing member 20, a motor 21, and a linear projection 22. The casing 11 has a cylindrical shape. The screw 13 is provided in the casing 11. The extrusion opening 16 where ground hydrogel is extruded out is formed at an edge of the casing 11. The porous die 17 is provided immediately before the extrusion opening 16 in an extrusion direction in the casing 11. The motor 21 for rotating the screw 13, a driving system, etc. are provided at the other edge of the casing 11. The base 12 is under the casing 11 so as to stably install the screw extruder. The feed opening 14 for feeding hydrogel is provided above the casing 11. The hopper 15 is provided so as to easily feed hydrogel. A shape and a size of the casing 11 are not particularly limited provided that the casing 11 has a cylindrical inner surface that fits a shape of the screw 13. The number of revolutions of the screw 13 is not particularly limited because it varies depending on the shape of the screw extruder. It is, however, preferable to change the number of revolutions of the screw 13 as described later. The screw extruder illustrated in FIG. 1 can thus include the backflow preventing member 20 in the vicinity of the extrusion opening 16, and the linear projection 22 provided with the screw 13. Configurations, materials, and sizes of the members, materials for the backflow preventing member 20 and various rotational blades of the screw 13, and all other configurations associated with the screw extruder, can be selected on the basis of a method disclosed in Japanese Patent Application Publication, Tokukai No. 2000-63527 A.

A configuration of the backflow preventing member 20 is not particularly limited provided that the backflow preventing member 20 is configured to prevent backflow of hydrogel in the vicinity of the extrusion opening 16. Examples of the backflow preventing member 20 encompass (i) a spiral or concentric strip projection provided on an inner wall of the casing 11 and (ii) a strip, granular, spherical, or angular projection provided in parallel to the screw 13. Pressure is increased in the vicinity of the extrusion opening 16 as gel grinding proceeds. This causes hydrogel to flow back in a direction to the feed opening 14. However, by providing the backflow preventing member 20, it is possible to subject the hydrogel to the gel grinding while preventing the backflow of the hydrogel.

(Porous Die)

A thickness, a porous diameter, and a hole area rate of the porous die provided at an outlet of a cylindrical body (casing) of the gel grinding device are not particularly limited, and can be appropriately selected in accordance with, for example, how much the gel grinding device processes hydrogel per unit time, properties of the hydrogel. However, the thickness of the porous die is preferably in a range of 3.5 mm to 40 mm, and more preferably in a range of 6 mm to 20 mm. The porous diameter of the porous die is preferably in a range of 3.2 mm to 24 mm, and more preferably in a range of 7.5 mm to 24 mm. The hole area rate of the porous die is preferably in a range of 20% to 80%, and more preferably in a range of 30% to 55%. Note that in a case where a plurality of porous dies different in porous diameter (mm) are employed, a simple average value of porous diameters of the respective plurality of porous dies is regarded as the porous diameter of the porous die of the gel grinding device. Holes of the porous die each preferably have a circular shape. However, the hole can have a shape other than the circular shape (for example, a rectangular, elliptic, or slit shape). In a case where the hole has the shape other than the circular shape, a porous diameter (mm) of the hole having the shape other than the circular shape is calculated by converting a hole area of the hole having the shape other than the circular shape into a circle.

It is not preferable that the porous die have at least one of (i) a thickness of less than 3.5 mm, (ii) a porous diameter of more than 24 mm and (iii) a hole area rate of more than 80%. This is because such a porous die cannot sufficiently apply shearing stress and compressive force to the hydrogel. It is neither preferable that the porous die have at least one of (i) a thickness of more than 40 mm, (ii) a porous diameter of less than 3.2 mm and (iii) a hole area rate of less than 20%. This is because such a porous die, in contrast, applies excessive shearing stress and compressive force to the hydrogel, whereby the properties of the hydrogel may be deteriorated.

(Gel Grinding Energy (GGE)/Gel Grinding Energy (2) (GGE 2))

According to the method for producing the water absorbent resin powder of the present invention, the gel grinding is carried out with the gel grinding energy (GGE) controlled in a specific range. Note here that the GGE is controlled by, for example, the above-described method, and the gel grinding is preferably carried out with respect to the hydrogel (polyacrylic acid (salt) crosslinked polymer) at least one of which properties before the gel grinding, particularly the gel temperature, the gel CRC, the gel Ext, and the weight average molecular weight of the water soluble content in addition to the resin solid content of 10 wt % to 80 wt % (further, the above (b)) is controlled in the above range. It is possible to obtain particulate hydrogel having the following particle diameter by such gel grinding, that is, by a fourth producing method of the present invention, in addition to (i) the first producing method (the gel grinding with the GGE), (ii) the second producing method (the gel grinding with the GGE (2)), and (iii) a third producing method of the present invention (the gel grinding with the increase in the weight average molecular weight of the water soluble content), which fourth producing method is carried out concurrently or non-concurrently with the first through third producing methods.

In the present invention, an upper limit of the gel grinding energy (GGE) for grinding the hydrogel is preferably 60 [J/g] or less, more preferably 50 [J/g] or less, and further more preferably 40 [J/g] or less. A lower limit of the GGE is preferably 18 [J/g] or more, more preferably 20 [J/g] or more, and further more preferably 25 [J/g] or more. Therefore, in the present invention, the gel grinding energy (GGE) for grinding the hydrogel is, for example, in a range of 18 [J/g] to 60 [J/g], preferably in a range of 20 [J/g] to 50 [J/g], and more preferably in a range of 25 [J/g] to 40 [J/g]. Controlling the GGE in the above range makes it possible to grind the hydrogel while applying appropriate shearing stress and compressive force to the hydrogel. Note that the gel grinding energy (GGE) which includes energy during idling of the gel grinding device is defined.

According to the second producing method of the present invention, the gel grinding energy (2) that excludes the energy during idling of the gel grinding device can be defined. That is, in the present invention, an upper limit of the gel grinding energy (2) (GGE (2)) for grinding the hydrogel is preferably 40 [J/g] or less, more preferably 32 [J/g] or less, and further more preferably 25 [J/g] or less. A lower limit of the GGE (2) is preferably 9 [J/g] or more, more preferably 12 [J/g] or more, and further more preferably 15 [J/g] or more. Therefore, in the present invention, the gel grinding energy (2) (GGE (2)) for grinding the hydrogel is, for example, in a range of 9 [J/g] to 40 [J/g], preferably in a range of 12 [J/g] to 32 [J/g], and more preferably in a range of 15 [J/g] to 25 [J/g]. Controlling the GGE (2) in the above range makes it possible to grind the hydrogel while applying appropriate shearing stress and compressive force to the hydrogel.

By drying, under a specific condition, the particulate hydrogel obtained in the gel grinding step, it is possible to improve the shape of the water absorbent resin, and attain both high permeability and a water absorbing rate. Note that in a case where the hydrogel is ground by a plurality of devices such as by a screw extruder after kneader polymerization or by a plurality of screw extruders, the total of energy consumed by the plurality of devices is the gel grinding energy (GGE) or the gel grinding energy (2) (GGE (2)) of the present invention.

(Gel Grinding Region)

In the present invention, the gel grinding is carried out during or after polymerization but more preferably carried out with respect to the hydrogel after polymerization. Note that in a case where the gel grinding is carried out during polymerization such as kneader polymerization, a monomer aqueous solution which "is sufficiently gelling" is to be ground in the gel grinding step.

For example, in a case where kneader polymerization is carried out, a monomer aqueous solution changes to hydrogel as polymerization time elapses. That is, the following regions sequentially appear: (i) a region where the monomer aqueous solution is stirred at the start of polymerization, (ii) a region where low-polymerized hydrogel having a constant viscosity is stirred during the polymerization, (iii) a region where a part of the hydrogel is started to be ground as the polymerization proceeds, and (iv) a gel grinding region in the second half of or at the last stage of the polymerization. Therefore, in order to clearly separate "stirring of the monomer aqueous solution" at the start of the polymerization from the "gel grinding" at the last stage of the polymerization, the monomer aqueous solution that is "sufficiently gelling" is determined to be ground in the gel grinding step.

What is meant by "sufficiently gelling" is a state in which the hydrogel can be ground by shearing stress after a maximum polymerization temperature (polymerization peak temperature). Alternatively, "sufficiently gelling" means a state in which the hydrogel can be ground by shearing stress after a polymerization ratio of monomers in the monomer aqueous solution (the polymerization ratio is also known as conversion ratio, and calculated from (i) polymer quantity calculated by pH titration of the hydrogel and (ii) residual monomer quantity) becomes preferably not less than 90 mol %, more preferably not less than 93 mol %, further more preferably not less than 95 mol %, and especially preferably not less than 97 mol %. That is, the hydrogel, in which the polymerization ratio of the monomers is in the above range, is ground in the gel grinding step of the present invention. Note that in a case of polymerization reaction that does not have the polymerization peak temperature (such as a case where polymerization always proceeds at a constant temperature, or a case where polymerization temperature keeps rising), whether or not the monomer aqueous solution is "sufficiently gelling" is determined on the basis of the polymerization ratio of the monomers.

Therefore, in a case where batch-type kneader polymerization is carried out, the GGE during the batch-type kneader polymerization is measured after the polymerization peak temperature or the conversion ratio. In a case where continuous kneader polymerization is carried out, the GGE is calculated by multiplying, by total GGE in the whole polymerization step, a ratio of polymerization time after the polymerization peak temperature or the conversion ratio to a total polymerization time (see Expression (3)).

[Mathematical Expression 3]

$$GGE\ [J/g] = (\text{total GGE}) \times (\text{polymerization time after polymerization peak temperature or conversion ratio})/(\text{total polymerization time}) \quad \text{Expression(3)}$$

Note that even in a case where a batch-type or continuous kneader polymerization device is employed, gel grinding can be separately carried out after the kneader polymerization. In the case, the total of (i) energy consumed by a device for performing the gel grinding and (ii) the GGE or the GGE (2) during the kneader polymerization is regarded as the GGE or the GGE (2) of the present invention.

In a case where belt polymerization is carried out in the polymerization step, hydrogel during or after the belt polymerization, preferably after the belt polymerization, can be cut or ground to have a size of several tens of centimeters before the gel grinding. Such cut or ground hydrogel is easily supplied into the gel grinding device. This makes it possible to smoothly carry out the gel grinding step. Note that the hydrogel is preferably cut or ground without being kneaded, and therefore cut or ground by, for example, a guillotine cutter. A size and a shape of the cut or ground hydrogel are not particularly limited provided that it can be supplied into the gel grinding device. Further, in a case where weight of a piece of the ground hydrogel is one tenth or less of "weight of a hydrogel crosslinked polymer to be supplied into a gel grinding device per minute", energy during grinding of the hydrogel is included in the GGE during the gel grinding.

(Operation Condition of Gel Grinding Device)

In a case where the gel grinding device used in the gel grinding step of the present invention is a screw extruder, the number of revolutions of a screw axis of the screw extruder cannot be simply defined. This is because a rate of a periphery of a rotational blade varies depending on an internal diameter of a cylindrical body (casing) of the screw extruder. However, the number of revolutions is preferably in a range of 90 rpm to 500 rpm, more preferably in a range of 100 rpm to 400 rpm, and further more preferably in a range of 120 rpm to 200 rpm. The number of revolutions of less than 90 rpm is not preferable because the rotational blade having such number of revolutions fails to apply shearing stress and compressive force required for the gel grinding. The number of revolutions of more than 500 rpm is neither preferable because the rotational blade having such number of revolutions, in contrast, applies too much shearing stress and compressive force to the hydrogel. This deteriorates the properties of the hydrogel, or increases load on the gel grinding device thereby damaging the gel grinding device. The rate of the periphery of the rotational blade is preferably in a range of 0.5 [m/s] to 5 [m/s], and more preferably in a range of 0.5 [m/s] to 4 [m/s]. Further, the gel grinding device of the present inventions is heated or kept to have a temperature preferably in a range of 40° C. to 120° C., and more preferably in a range of 60° C. to 100° C., so as to prevent the hydrogel from adhering thereto.

(Use of Water)

In the gel grinding step of the present invention, the hydrogel to which water has been added can be ground. Note that in the present invention, the "water" can be in the form of a solid, liquid or gas.

How and when water is added are not particularly limited provided that the water is supplied to the gel grinding device in which the hydrogel is present. Alternatively, hydrogel to which water has been already added can be supplied to the gel grinding device. Further, it is possible to add not only the water but also another additive (such as an interfacial active agent, a base for neutralization, a crosslinking agent, or inorganic salt) or a solvent other than the water. Note that in a case where an additive or the solvent other than water is further added, water content is preferably in a range of 90 wt % to 100 wt %, more preferably in a range of 99 wt % to 100 wt %, and further more preferably approximately 100 wt %.

In the present invention, the water can be in the form of a solid, liquid or gas. It is, however, preferable in terms of easy handling that the water be in the form of liquid and/or gas. An amount of the water to add is preferably in a range of 0 to 4 parts by weight with respect to 100 parts by weight of hydrogel, and more preferably in a range of 0 to 2 parts by weight. If the amount of water to add exceeded 4 parts by weight, then it would possibly cause a defect such as failure of drying resulting in undried hydrogel.

In a case where the water is in the form of liquid, temperature of the water to add is preferably in a range of 10° C. to 100° C., and more preferably in a range of 40° C. to 100° C. In a case where the water is in the form of gas, temperature of the water to add is preferably in a range of 100° C. to 220° C., more preferably in a range of 100° C. to 160° C., and further more preferably in a range of 100° C. to 130° C. Note that how to prepare the water in the form of gas is not particularly limited. The water in the form of gas can be, for example, water vapor generated by heating of a boiler or gaseous water generated from a surface of water by vibrating the water by ultrasonic waves. Further, the water in the form of gas is preferably water vapor having a pressure higher than atmospheric pressure, and more preferably water vapor generated by a boiler.

(Use of Additive)

It is thus preferable to grind the hydrogel to which water has been added. Further, not only water but also an additive, a neutralizing agent, or the like can be added to and mixed with the hydrogel before the gel grinding. The resultant water absorbent resin can be modified. Specifically, an aqueous solution containing the basic substance described in the above (2-1) (for example, a 10 wt % to 50 wt % sodium hydroxide aqueous solution) can be added so as to neutralize (particularly in the above-described range of the neutralization rate) the hydrogel during the gel grinding. Alternatively, water absorbent resin fine powder (0.1 wt % to 30 wt % of water absorbent resin fine powder with respect to resin solid content) can be added so that fine powder recycling is carried out. Further, 0.001 wt % to 3 wt % of a polymerization initiator, a reducing agent or a chelating agent (with respect to resin solid content) can be added to and mixed with the hydrogel during the gel grinding so as to reduce residual monomers, improve coloring, and attain endurance.

(Property of Particulate Hydrogel after Gel Grinding)

According to the method for producing the water absorbent resin powder of the present invention (third producing method), the weight average molecular weight of the water soluble content of the hydrogel is increased to 10,000 [Da] to 500,000 [Da] by means of a production method in which the gel grinding energy (GGE) is in a range of 18 [J/g] to 60 [J/g] during the gel grinding of the hydrogel.

That is, in order to attain the object of the present invention, the method for producing the water absorbent resin powder of the present invention (third producing method) is a method for producing water absorbent polyacrylic acid (salt) resin powder, including the steps of: (i) polymerizing an acrylic acid (salt) monomer aqueous solution; (ii) during or after the step of (i), performing gel grinding of a hydrogel crosslinked polymer obtained by the polymerization, wherein the hydrogel crosslinked polymer has resin solid content of 10 wt % to 80 wt %, so that weight average molecular weight of water soluble content of the hydrogel crosslinked polymer is increased by 10,000 [Da] to 500,000 [Da]; (iii) drying a particulate hydrogel crosslinked polymer obtained by the gel grinding, wherein the drying is performed at 150° C. to 250° C.; and (iv) carrying out a surface treatment to the particulate hydrogel crosslinked polymer thus dried.

The method for producing the water absorbent resin powder of the present invention (fourth producing method) is carried out such that the particulate hydrogel crosslinked polymer thus obtained by the gel grinding has a weight average particle diameter (D50) of 350 µm to 2000 µm, logarithmic standard deviation ($\sigma\zeta$) of particle size distribution of 0.2 to 1.0, and resin solid content of 10 wt % to 80 wt %.

That is, in order to attain the object of the present invention, the method for producing water absorbent resin powder of the present invention (fourth producing method) is a method for producing water absorbent polyacrylic acid (salt) resin powder, including the steps of: (i) polymerizing an acrylic acid (salt) monomer aqueous solution; (ii) during or after the step of (i), performing gel grinding of a hydrogel crosslinked polymer obtained by the polymerization so as to obtain a particulate hydrogel crosslinked polymer having a weight average particle diameter (D50) of 350 µm to 2000 µm and logarithmic standard deviation ($\sigma\zeta$) of particle size distribution of 0.2 to 1.0; (iii) drying the particulate hydrogel crosslinked polymer by hot air of 150° C. to 250° C. at a velocity of 0.8 [m/s] to 2.5 [m/s] in a direction vertical (up-and-down direction) to the particulate hydrogel crosslinked polymer by use of a through-flow belt drier, the particulate hydrogel crosslinked polymer to be supplied into the through-flow belt drier having resin solid content of 10 wt % to 80 wt %; and (iv) carrying out a surface treatment to the particulate hydrogel crosslinked polymer thus dried.

(a) Particle Diameter

The hydrogel crosslinked polymer (hydrogel) obtained in the polymerization step is ground into particles by the gel grinding device (such as a kneader, a meat chopper, or a screw extruder) for performing the gel grinding of the present invention. Note that the diameter of the particles can be controlled by classification, blending, or the like. It is, however, preferable that the diameter be controlled by the gel grinding of the present invention.

The weight average particle diameter (D50) (defined by classification by sieving) of the particulate hydrogel after the gel grinding is in the range of 350 µm to 2000 µm, more preferably in a range of 400 µm to 1500 µm, and further more preferably in a range of 500 µm to 1000 µm. The logarithmic standard deviation ($\sigma\zeta$) of the particle size distribution is in the range of 0.2 to 1.0, more preferably in a range of 0.2 to 0.8, and further more preferably in a range of 0.2 to 0.7.

In a case where the weight average particle diameter is more than 2000 µm, the hydrogel may have been ground by uneven or insufficient shearing stress and compressive force. Further, in the case, an inner part of the hydrogel is different from a surface of the hydrogel in degree of drying. This causes particles with an inhomogeneous property to be generated by grinding after drying the hydrogel, thereby deteriorating the whole property of the hydrogel. Moreover, in a case where the weight average particle diameter is less than 350 µm, the hydrogel has had an increased surface area, and is therefore remarkably easily dried. This makes it insufficient to reduce residual monomers in the drying step, thereby increasing the residual monomers (later described in (3-5)). Further, this not only causes a large amount of fine powder to be generated during the gel grinding after the drying, and makes it difficult to control the particle diameter described in (2-4) (later described) but also deteriorates the properties of the hydrogel such as permeability potential (SFC). Further, it is difficult to grind the hydrogel to a weight average particle diameter of less than 350 µm just by means of a normal gel grinding operation, and it is necessary to separately carry out a special operation such as (i) classification of gel after the gel grinding (see Japanese Patent Application Publication, Tokukaihei No. 6-107800 A etc.) or (ii) particle diameter control during the polymerization before the gel grinding (see, for example, EP Patent No. 0349240 disclosing a method for producing gel particles having a sharp particle size distribution during reverse-phase suspension polymerization). The special operation thus carried out in addition to the gel grinding newly causes problems that (i) a large amount of interfacial active agent or organic solvent is required for the polymerization or the classification and (ii) productivity is decreased (rise in cost) or the properties of the hydrogel are deteriorated (increase in residual monomers or fine power), and like problems. It is therefore not only difficult but also unpreferable that the particulate hydrogel has the weight average particle diameter of less than 350 µm.

It is preferable in terms of uniform drying that the logarithmic standard deviation ($\sigma\zeta$) be as small as possible. However, for logarithmic standard deviation ($\sigma\zeta$) of less than 0.2, it is necessary to carry out the special operation such as the classification of the gel after the gel grinding or the particle diameter control during the polymerization before the gel grinding, as with the weight average particle diameter. It is therefore neither preferable nor attainable in consideration of productivity and cost that the particulate hydrogel has the logarithmic standard deviation ($\sigma\zeta$) of less than 0.2. The particle diameter can be controlled by the gel grinding of the present invention. The hydrogel is ground by particularly the screw extruder so as to have the particle diameter.

(b) Gel CRC After Gel Grinding

In the present invention, gel CRC of the particulate hydrogel after the gel grinding is preferably in a range of 10 [g/g] to 35 [g/g], more preferably in a range of 10 [g/g] to 32 [g/g], and further more preferably in a range of 15 [g/g] to 30 [g/g]. Further, the gel CRC after the gel grinding is increased by preferably −1 [g/g] to +3 [g/g] than gel CRC before the gel grinding, more preferably 0.1 [g/g] to 2 [g/g], and further more preferably 0.3 [g/g] to 1.5 [g/g]. Note that the gel CRC after the gel grinding can be decreased during the gel grinding by use of a crosslinking agent, or the like. It is, however, preferable that the gel CRC after the gel grinding be increased in the above range.

(c) Gel Ext After Gel Grinding

In the present invention, gel Ext of the particulate hydrogel after the gel grinding is preferably in a range of 0.1 wt % to 20 wt %, more preferably in a range of 0.1 wt % to 10 wt %, further more preferably in a range of 0.1 wt % to 8 wt %, and especially preferably in a range of 0.1 wt % to 5 wt %. Further, how much the gel Ext of the particulate hydrogel is increased by the gel grinding (i.e. an increase in the amount of the gel Ext with respect to gel Ext before the gel grinding) is preferably not more than 5 wt %, more preferably not more than 4 wt %, further more preferably not more than 3 wt %, especially preferably not more than 2 wt %, and most preferably not more than 1 wt %. The increase in the amount of the gel Ext of the particulate hydrogel by the gel grinding also can have a minus lower limit (for example, −3.0 wt %, further −1.0 wt %). Normally, however, the increase in the amount of the gel Ext of the particulate hydrogel by the gel grinding is not less than 0 wt %, preferably not less than 0.1 wt %, more preferably not less than 0.2 wt %, and further more preferably not less than 0.3 wt %. Specifically, the hydrogel is ground so that the gel Ext is increased in an arbitrary range of the upper limits and the lower limits such as preferably in a range of 0 to 5.0 wt %, and more preferably in a range of 0.1 wt % to 3.0 wt %. Note that the gel Ext can be decreased during the gel grinding by use of a crosslinking agent, or the like. It is, however, preferable that the gel Ext be increased in the above range. Note here that an effective digit of the amount of the gel Ext to increase is the first decimal place, and for example, 5 wt % is regarded as a synonym for 5.0 wt %.

(d) Weight Average Molecular Weight of Water Soluble Content after Gel Grinding

In the present invention, an amount of weight average molecular weight of water soluble content of the hydrogel to be increased by the gel grinding has (i) a lower limit of preferably not less than 10,000 [Da], more preferably not less than 20,000 [Da], and further more preferably not less than 30,000 [Da], and (ii) an upper limit of preferably not more than 500,000 [Da], more preferably not more than 400,000 [Da], further more preferably not more than 250,000 [Da], and especially preferably not more than 100,000 [Da]. Therefore, in the present invention, an increase in weight average molecular weight of water soluble content of the particulate hydrogel after the gel grinding with respect to the hydrogel before the gel grinding is, for example, in a range of 10,000 [Da] to 500,000 [Da], preferably in a range of 20,000 [Da] to 400,000 [Da], more preferably in a range of 30,000 [Da] to 250,000 [Da], and further more preferably not more than 100,000 [Da].

In conventional well-known gel grinding, an increase in weight average molecular weight of water soluble content is frequently less than 10,000 [Da]. Meanwhile, the present invention is characterized in that a main chain part of a polymer of the hydrogel is cut by a greater gel grinding energy (GGE), that is, greater shearing stress and compressive force so that the weight average molecular weight of the water soluble content is increased. Note, however, that it is not preferable that the amount of the weight average molecular weight of the water soluble content to be increased by the gel grinding be greater than 500,000 [Da] because, if so, a crosslinked polymer chain of the hydrogel is cut by excessive mechanical external force so that the water soluble content is excessively increased, whereby the properties of the hydrogel are deteriorated.

(e) Resin Solid Content after Gel Grinding

In the present invention, resin solid content of the particulate hydrogel after the gel grinding is, in terms of its property, preferably in a range of 10 wt % to 80 wt %, more preferably in a range of 30 wt % to 80 wt %, further more preferably in a range of 50 wt % to 80 wt %, 45 wt % to 85 wt %, or 45 wt % to 70 wt %, and especially preferably in a range of 50 wt % to 60 wt % or 45 wt % to 60 wt %. It is preferable that the resin solid content of the particulate hydrogel after the gel grinding have the above range because in the range, increase in the CRC due to drying is easily controllable, and damage caused by drying is decreased (for example, the water soluble content is less increased). Note that the resin solid content after the gel grinding can be appropriately controlled by, for example, resin solid content before the gel grinding, if necessary, water to be added, or water vaporization by heating during the gel grinding.

(Pieces to be Measured)

The properties of the hydrogel before the gel grinding, or the properties of the particulate hydrogel after the gel grinding, are estimated by sampling and measuring, at a necessary frequency, a necessary amount of the hydrogel or the particulate hydrogel that is in a production device. In the present invention, the estimation is carried out on the basis of the weight average molecular weight of the water soluble content of the hydrogel before the gel grinding. A value of the weight average molecular weight of the water soluble content of the hydrogel before the gel grinding should be a numeric value that is sufficiently averaged. In order to calculate the numeric value, for example, the following sampling and measurement are carried out. In a case where the water absorbent resin powder is produced by 1 [t/hr] to 20 [t/hr], or 1 [t/hr] to 10 [t/hr] by use of a continuous gel grinding device such as a continuous kneader or a meat chopper, two or more pieces per 100 kg of the hydrogel, ten or more pieces in total are sampled and measured. In a case of batch-type gel grinding (such as a batch-type kneader), ten or more pieces are sampled from a batch sample, and measured. The properties of the particulate hydrogel are estimated on the basis of the sampling and the measurement.

(2-3) Drying Step (First Through Fourth Producing Methods of the Present Invention)

The drying step is a step for drying the particulate hydrogel obtained in the gel grinding step to obtain a dried polymer. The following describes a drying method suitably applicable to the present invention. The drying method is applicable to the first through fourth producing methods of the present invention. Among these producing methods, the fourth producing method employs specific dry temperature and hot wind velocity. Such specific dry temperature and hot wind velocity are suitably applicable to the first through third producing methods, and contribute to improvement of the water absorbing rate.

Examples of the drying method in the drying step of the present invention encompass thermal drying, hot air drying, drying under reduced pressure, infrared drying, microwave drying, drying by use of a drum drier, drying by azeotropic dehydration with a hydrophobic organic solvent, and high humidity drying with use of high temperature water vapor. Among the drying methods, the hot air drying, particularly with a dew point of 40° C. to 100° C., more preferably a dew point of 50° C. to 90° C., is preferably adopted.

In a further preferred embodiment, a belt drier is employed as a drier to be used in the drying step. If necessary, one or more types of a heat transfer drier, a radiation heating drier, a hot air drier, a dielectric heating drier, and like driers can be used in combination with the belt drier. Among the driers, the hot air drier is preferably used in terms of a drying rate. Examples of the hot air drier encompass a through-flow belt (band) hot air drier, a through-flow circuit hot air drier, a vertical through-flow hot air drier, a parallel through-flow belt (band) hot air drier, a through-flow tunnel hot air drier, a through-flow groove stirring hot air drier, a fluidized-bed hot air drier, a flash hot air drier, and a spray hot air drier. Among the hot air driers, the through-flow belt hot air drier is preferably used in terms of property control in the present invention.

In the present invention, the particulate hydrogel can be dried by the above-described various driers. Among the driers, the through-flow belt drier, especially the through-flow belt hot air drier is preferably used in the first through fourth producing methods of the present invention. In a case where the through-flow belt hot air drier is used, the through-flow belt hot air drier should send hot air to a hydrogel layer disposed on a through-flow belt from a direction vertical to the hydrogel layer (for example, from both above and blow the hydrogel layer, from below the hydrogel layer, or from above the hydrogel layer). In a case where the through-flow belt hot air drier is not used or in a case where hot air is not sent from the direction vertical to the hydrogel layer, it is impossible to uniformly dry the hydrogel layer. This possibly deteriorates the properties such as the permeability potential of the particulate hydrogel. That is, neither hot air from a lateral direction nor other driers (such as a fluidized-bed drier or a stirring drier) can attain the object of the present invention. Note that what is meant by the "direction vertical to the hydrogel layer" is a state in which hot air flows through a gel layer (a layer of particulate hydrogel having a thickness in a range of 10 mm to 300 mm on a punching metal or a woven metallic wire) in an up-and-down direction to the gel layer (from above the gel layer to below the gel layer, or from below the gel layer to above the gel layer). The direction vertical to the gel layer is not limited to a completely vertical direction as long as hot air flows through the gel layer in the direction vertical to the gel layer. Therefore, hot air can be sent from an oblique direction, for example, hot air is sent from a direction within 30° from the vertical direction, preferably within 20°, more preferably within 10°, further preferably within 5°, and especially preferably from the completely vertical direction.

The following describes drying conditions etc. of the drying step of the present invention. By drying the particulate hydrogel under the drying conditions, it is possible to improve permeability potential and a water absorbing rate of water absorbent resin powder in which a dried polymer attained by drying the particulate hydrogel under the drying conditions is subjected to a surface treatment.

(Drying Temperature)

Drying temperature in the drying step (preferably in the through-flow belt drier) of the present invention is in a range of 100° C. to 300° C., preferably in a range of 150° C. to 250° C., more preferably in a range of 160° C. to 220° C., and further preferably in a range of 170° C. to 200° C. A drying temperature in the range of 100° C. to 300° C. makes it possible to reduce drying time and coloring of the dried polymer. Further, such a drying temperature brought an effect of improving the permeability potential and the water absorbing rate of the water absorbent resin powder. Meanwhile, a drying temperature of more than 300° C. causes a polymer chain to be damaged, thereby deteriorating the properties of the water absorbent resin powder. Moreover, a drying temperature of less than 100° C. does not bring the effect of improving the water absorbing rate, and causes (i) failure of drying resulting in undried particulate hydrogel, and (ii) clogging during a subsequent grinding step.

(Drying Time)

Drying time in the drying step (preferably of the through-flow belt drier) of the present invention depends on a surface area of the particulate hydrogel, types of a drier, and the like, and may be appropriately determined so that an objective water content is attained. However, the drying time is preferably in a range of 1 minute to 10 hours, more preferably in a range of 5 minutes to 2 hours, further preferably in a range of 10 minutes to 120 minutes, and especially preferably in a range of 20 minutes to 60 minutes.

A period of time that elapses before the particulate hydrogel discharged from the gel grinding step of (2-2) proceeds to the drying step, that is, a period of time of moving of the particulate hydrogel from an outlet of the gel grinding device to an inlet of the drier is preferably shorter in terms of coloring of the dried polymer. Specifically, the period of time is preferably within 2 hours, more preferably within 1 hour, further preferably within 30 minutes, especially preferably with 10 minutes, and most preferably within 2 minutes.

(Wind Velocity)

In order to attain the object of the present invention, the through-flow drier, especially the belt drier sends hot air in the vertical direction (up-and-down direction) at a wind velocity of 0.8 [m/s] to 2.5 [m/s], preferably 1.0 [m/s] to 2.0 [m/s]. The wind velocity in the above range makes it possible not only to control water content of the dried polymer to be in a desired range but also to improve the water absorbing rate. It was found that a wind velocity of less than 0.8 [m/s] results in extension of the drying time, thereby deteriorating the permeability potential and the water absorbing rate of the water absorbent resin powder. It was also found that a wind velocity of more than 2.5 [m/s] causes the particulate hydrogel to be blown up during drying, thereby making it difficult to stably dry the particulate hydrogel.

Note that the wind velocity is controlled so as not to impair the effect of the present invention, and therefore the wind velocity may be controlled as above, for example, during 70% or more of the drying time, preferably 90% or more, and further preferably 95% or more. Note also that in a case of the through-flow belt drier, the wind velocity represents an average flow rate of hot air passing through in a direction vertical to a surface of the through-flow belt that horizontally moves. Therefore, the average flow rate of hot air is calculated by dividing, by a surface area of the through-flow belt, quantity of hot air sent by the through-flow belt drier.

It was found that it is possible to improve the permeability potential and the water absorbing rate of the water absorbent resin powder by drying, by use of the through-flow belt hot air drier for drying at specific temperature and wind velocity, the particulate hydrogel, with a specific particle diameter, which has been obtained in the gel grinding step. That is, the wind velocity in the above range makes it possible to improve the water absorbing rate of the dried polymer.

Note that as to a gel particle diameter and drying of water absorbent resin, Patent Literature 50 discloses a technique of drying a particulate (angular) hydrogel polymer which is subjected to gel grinding to have an average particle diameter in a range of 0.8 mm to 5 mm, preferably in a range of 1 mm to 3 mm, and logarithmic standard deviation ($\sigma\zeta$) of particle size distribution of 1.5 or less, preferably 0.8 or less, in terms of reduction in water content, a drying efficiency, etc.

However, the technique disclosed in Patent Literature is a technique of controlling polyhedral (angular) hydrogel having flat surfaces by use of a vertical cutter. This is different from the gel grinding of the present invention. Patent Literature 50 neither discloses nor suggests a water absorbing rate (FSR) and permeability potential (SFC) of the water absorbent resin, the specific wind velocity (0.8 [m/s] to 2.5 [m/s]) during drying, and a specific surface crosslinking (particularly, combination use of an ionic bonding crosslinking agent) (later described). That is, it was found in the present invention that the specific wind velocity during drying and the specific surface crosslinking which are not disclosed in Patent Literature 50, and further the gel grinding energy (GGE or GGE (2)), and the increase [Da] in the weight average molecular weight of the gel Ext greatly affect the water absorbing rate (FSR) and the permeability potential (SFC) of the water absorbent resin.

(Dew Point of Hot Air)

The hot air sent by the through-flow belt drier in the drying step of the present invention contains at least water vapor, and has a dew point of preferably 30° C. to 100° C., and more preferably 30° C. to 80° C. Controlling the dew point in the above range, and further preferably the gel particle diameter in the above range make it possible to reduce residual monomers, and further prevent reduction in bulk specific gravity of the dried polymer. Note that the dew point is a value where the particulate hydrogel has water content of 10 wt % or more, preferably 20 wt % or more.

Further, it is preferable that a dew point in the vicinity of the inlet of the drier (or in the early period of drying, for example, within 50% of the drying time) be higher than that in the vicinity of an outlet of the drier (or in the last period of the drying, for example, over 50% of the drying time) in terms of residual monomers, absorbency, coloring, etc. Specifically, it is preferable to expose the particulate hydrogel to hot air having a dew point higher by preferably 10° C. to 50° C., more preferably 15° C. to 40° C. Controlling the dew point in the above range makes it possible to prevent the reduction in the bulk specific gravity of the dried polymer.

In the drying step of the present invention, the particulate hydrogel is continuously supplied so as to form a layer on the belt of the through-flow belt drier, and then dried by hot air. A width of the belt of the through-flow belt drier is not limited to a specific one but is preferably 0.5 m or more, and more preferably 1 m or more. The width of the belt also has an upper limit of preferably 10 m or less, and more preferably 5 m or less. Further, a length of the belt is preferably 20 m or more, and more preferably 40 m or more. The length of the belt also has an upper limit of preferably 100 m or less, and more preferably 50 m or less.

In order to attain the object of the present invention, a layer length (a thickness of a gel layer) of the particulate hydrogel on the belt is preferably in a range of 10 mm to 300 mm, more preferably in a range of 50 mm to 200 mm, further preferably in a range of 80 mm to 150 mm, and especially preferably in a range of 90 mm to 110 mm.

A moving rate of the particulate hydrogel on the belt may be appropriately determined on the basis of the width of the belt, the length of the belt, production quantity, the drying time, etc. In terms of load on a belt driving device, endurance of the belt driving device, etc., however, the moving rate is preferably in a range of 0.3 [m/min] to 5 [m/min], more preferably in a range of 0.5 [m/min] to 2.5 [m/min], further preferably in a range of 0.5 [m/min] to 2 [m/min], and especially preferably in a range of 0.7 [m/min] to 1.5 [m/min].

The method for producing the water absorbent polyacrylic acid (salt) resin powder of the present invention is suitable for continuous production, and brings a great effect of improving productivity, the properties of the water absorbent resin powder, etc. by setting conditions to the respective ranges in the drying step.

The through-flow belt drier used in the drying step of the present invention preferably has the following specified structure and configuration. Examples of the through-flow belt encompass a woven metallic wire (for example, having a mesh size of 45 μm to 1000 μm), and a punching metal. Among these, the punching metal is preferably employed. A shape of holes of the punching metal is not particularly limited. Examples of the shape of holes encompass a circular hole, an elliptic hole, an angular hole, a hexagonal hole, an oblong hole, a rectangular hole, a rhombic hole, a cross-shaped hole, and combination of the plurality of shapes of holes. Further, the holes can be arranged in a staggered manner or in a juxtaposition manner. The holes each can be a three-dimensional hole such as a louver (a bow window). It is, however, preferable that the hole be a flat hole. Moreover, a pitch direction of the holes can be a direction longitudinal, lateral, or oblique to a direction in which the belt extends, or a combination of the directions.

In order to attain the present invention, it is preferable to variously change the drying temperature, the dew point of hot air, and the air quantity. It is therefore preferable that the through-flow belt drier include preferably five or more rooms, more preferably six or more rooms, and further preferably eight or more rooms. An upper limit of the number of rooms is appropriately determined depending on production quantity, the size of the through-flow belt drier, etc. Normally, however, the upper limit is approximately 20.

(Resin Solid Content)

The particulate hydrogel obtained in the gel grinding step is dried in the drying step to be the dried polymer. Resin solid content calculated from drying loss of the dried polymer (heating 1 g of powder or particles at 180° C. for three hours) is preferably more than 80 wt %, more preferably in a range of 85 wt % to 99 wt %, further preferably in a range of 90 wt % to 98 wt %, and especially preferably in a range of 92 wt % to 97 wt %.

(Surface Temperature of Particulate Hydrogel)

The particulate hydrogel obtained in the gel grinding step has a surface temperature preferably in a range of 40° C. to 110° C., more preferably in a range of 60° C. to 110° C., further preferably in a range of 60° C. to 100° C., and especially preferably in a range of 70° C. to 100° C., immediately before being supplied into the through-flow belt drier. A surface temperature of less than 40° C. will generate a balloon-like dried polymer during drying, and plenty of fine powder during grinding, thereby deteriorating the properties of the dried polymer. Moreover, a surface temperature of more than 110° C. will cause property deterioration (such as increase in water soluble content) and coloring of the water absorbent resin after drying.

(2-4) Grinding Step and Classifying Step

The grinding step and the classifying step are a step for grinding and classifying the dried polymer obtained in the drying step to obtain water absorbent resin particles. Note that the grinding step is different from (2-2) Gel Grinding Step in resin solid content during grinding (grinding), especially in that a target to be ground in the grinding step has been dried (preferably the resin solid content has been dried). The water absorbent resin particles obtained after the grinding step may be called a ground dried polymer.

The dried polymer obtained in the drying step can be used as it is as water absorbent resin powder. It is, however, preferable to control the dried polymer to have a specific particle diameter so as to improve the properties in a surface treatment step, particularly in a surface crosslinking step (later described). The particle diameter of the dried polymer can be appropriately controlled not only in the grinding step or the classifying step but also in the polymerization step, a fine powder collecting step, a granulation step, or like step. The particle diameter is defined by a standard sieve (JIS Z8801-1 (2000)).

Any grinders can be used in the grinding step. Examples of the grinders encompass a vibration mill, a roll granulator, a knuckel grinder, a roll mill, a high-speed grinder (such as a pin mill, a hammer mill, and a screw mill), and a cylindrical mixer. Among the grinders, it is preferable to use a multiple-stage roll mill or roll granulator in terms of particle diameter control.

The classifying step is carried out so that the water absorbent resin particles have the following particle diameter. In a case where surface crosslinking is carried out, it is preferable to carry out the classifying step before the surface crosslinking step (first classifying step). The classifying step may be further carried out after the surface crosslinking step (second classifying step). Note that how to carry out the classifying step is not particularly limited. For example, the classifying step is carried out by use of a sieve as below. In a case where particle size distribution of the water absorbent resin particles is set to 150 µm to 850 µm, first, the ground dried polymer is sieved by use of a sieve having a mesh size of 850 µm, and then a ground dried polymer that has passed through the sieve is further sieved by use of a sieve having a mesh size of 150 µm or a sieve having a mesh size of more than 150 µm (for example, 200 µm). A ground dried polymer left on the sieve having the mesh size of 150 µm is the water absorbent resin particles having a desired particle size distribution. The classifying step can be carried out not only by classification by sieving but also by various classifiers such as classification by air.

The water absorbent resin particles have, after the classifying step, a weight average particle diameter (D50) preferably in a range of 250 µm to 500 µm, more preferably in a range of 300 µm to 500 µm, and further preferably in a range of 350 µm to 450 µm, in terms of improvement of the properties of the water absorbent resin powder to be produced in the present invention. Further, it is preferable that an amount of fine particles passing through the sieve having the mesh size of 150 µm (JIS standard sieve) be smaller. Specifically, fine particles that pass through the sieve are normally preferably in a range of 0 to 5 wt % with respect to the whole water absorbent resin particles, more preferably in a range of 0 to 3 wt %, and further preferably in a range of 0 to 1 wt %. It is also preferable that as less as possible of large particles pass through a sieve having a mesh size of 850 µm or more (or 710 µm or more) (JIS standard sieve). Specifically, large particles that pass through the sieve are normally preferably in a range of 0 to 5 wt % with respect to the whole water absorbent resin particles, more preferably in a range of 0 to 3 wt %, and further preferably in a range of 0 to 1 wt %. In the present invention, a ratio of particles whose particle diameter is not less than 150 µm and less than 850 µm to the whole water absorbent resin particles, further a ratio of particles whose particle diameter is not less than 150 µm and less than 710 µm to the whole water absorbent resin particles is adjusted to preferably 95 wt % or more, and more preferably 98 wt % or more (an upper limit is 100 wt %). Logarithmic standard deviation ($\sigma\zeta$) of the particle size distribution is preferably in a range of 0.20 to 0.50, more preferably in a range of 0.25 to 0.50, further preferably in a range of 0.25 to 0.45, and especially preferably in a range of 0.30 to 0.40. The particle diameter is measured by a method similar to the method described in "(1) Average Particle Diameter and Distribution of Particle Diameter" (see page 7, lines 25 to 43 in the specification of EP Patent No. 0349240). An additional standard sieve (mesh size) may be appropriately used for particle diameter measurement depending on a particle diameter of a target to be measured. For example, a standard sieve having a mesh size of, for example, 710 µm or 600 µm is additionally used. The particle diameter before the surface crosslinking is applied to preferably after the surface crosslinking, and further an end product.

(Internal Cell Ratio)

The water absorbent resin powder attained by the gel grinding of the present invention, and further preferably by drying at the specific temperature and wind velocity can have a specific internal cell ratio. The internal cell ratio of the water absorbent resin powder, and a preferred range of the internal cell ratio will be described in [3], and are applied to the water absorbent resin particles obtained in the grinding step and the classifying step. That is, the water absorbent resin particles before the surface crosslinking preferably have (i) not less than 95 wt % of particles whose particle diameter is not less than 150 µm and less than 850 µm, (ii) the logarithmic standard deviation ($\sigma\zeta$) of the particle size distribution in the range of 0.25 to 0.50, and (iii) the internal cell ratio (defined by the following expression) preferably in a range of 0.1% to 2.5%, more preferably in a range of 0.2% to 2.0%, further preferably in a range of 0.3% to 1.7%, and especially preferably in a range of 0.5% to 1.5%. It is possible to provide the water absorbent resin powder whose water absorbing rate (FSR) and permeability potential (SFC) are both attained, by subjecting the water absorbent resin particles having the internal cell ratio and the particle size distribution to surface crosslinking particularly so as to have absorption against pressure (AAP) of not less than 20 [g/g]. Thus, the object of the present invention is further attained.

(Internal cell ratio)[%]={(real density)−(apparent density)}/(real density)×100

Note that the water absorbent resin before the surface crosslinking is not limited to having the internal cell ratio and the particle size distribution. The following describes the surface crosslinking of the present invention.

(2-5) Surface Treatment Step

The method for producing the water absorbent polyacrylic acid (salt) resin powder of the present invention preferably further includes a surface treatment step in order to improve the absorbency (absorbency against pressure, permeability potential, water absorbing rate, etc.). The surface treatment step includes a surface crosslinking step performed by use of a conventional surface crosslinking agent by a conventional surface crosslinking method, and if necessary, further includes an addition step.

(Covalent Bonding Surface Crosslinking Agent)

Various organic or inorganic crosslinking agents can be exemplified as the surface crosslinking agent for use in the present invention, but it is preferable that the surface crosslinking agent be an organic surface crosslinking agent. For the sake of the properties, it is preferable to use a dehydrative crosslinking agent such as (i) a polyvalent alcohol compound, (ii) an epoxy compound, (iii) a condensed product with a polyvalent amine compound or a halo epoxy compound, (iv) an oxazoline compound, (v) a (mono, di, or poly)oxazolidinone compound, and (vi) an alkylene carbonate compound. Especially, a dehydrative crosslinking agent such as a polyvalent alcohol compound, an alkylene carbonate compound, or an oxazolidinone compound, which needs high-temperature reaction can be used. In a case where a dehydrative crosslinking agent is not used, more specifically, the compounds described in U.S. Pat. Nos. 6,228,930, 6,071,976, 6,254,990, etc. can be exemplified. For example, polyvalent alcohols, such as mono-, di-, tri-, tetra-propylene glycol, 1,3-propanediol, glycerin, 1,4-butanediol, 1,3-butanediol, 1,5-pentanediol, 1,6-hexanediol, and sorbitol; epoxy compounds, such as ethylene glycol diglycidyl ether, and glycidol; alkylene carbonate compounds such as ethylene carbonate; oxetane compounds; cyclic urea compounds, such as 2-imidazolidinone are exemplified.

(Solvent, etc.)

An amount of the surface crosslinking agent to use is determined as appropriate, preferably in a range of 0.001 parts by weight to 10 parts by weight, and more preferably in a range of 0.01 parts by weight to 5 parts by weight with respect to 100 parts by weight of the water absorbent resin particles. In addition to the surface crosslinking agent, water is used in combination preferably. An amount of the water used herein is preferably in a range of 0.5 parts by weight to 20 parts by weight, and more preferably in a range of 0.5 parts by weight to 10 parts by weight with respect to 100 parts by weight of the water absorbent resin particles. In case where an inorganic surface crosslinking agent and an organic surface crosslinking agent are used in combination, the surface crosslinking agents are respectively used in an amount preferably in a range of 0.001 parts by weight to 10 parts by weight, and more preferably in a range of 0.01 parts by weight to 5 parts by weight with respect to 100 parts by weight of the water absorbent resin particles.

In this case, a hydrophilic organic solvent may be used in an amount preferably in a range of 0 to 10 parts by weight, more preferably in a range of 0 to 5 parts by weight, with respect to 100 parts by weight of the water absorbent resin particles. In adding a surface crosslinking agent solution to the water absorbent resin particles, water insoluble fine particle powder or an interfacial active agent may be added as well in an amount not adversely affecting the effect of the present invention, for example, in a range of 0 to 10 parts by weight, preferably in a range of 0 to 5 parts by weight, and more preferably in a range of 0 to 1 part by weight. Examples of usable interfacial active agents and an amount of the interfacial active agent to use are exemplified in U.S. Pat. No. 7,473,739 B.

(Mixing)

In a case where the surface crosslinking agent solution is mixed with the water absorbent resin particles, the water absorbent resin particles swell with, for example, water of the surface crosslinking agent solution. Swollen water absorbent resin particles are dried by heat at a preferred temperature of 80° C. to 220° C. for a preferred time of 10 minutes to 120 minutes.

The mixing of the surface crosslinking agent with the water absorbent resin particles is carried out preferably by using a vertical or horizontal high-speed rotation stirring mixer. The number of revolutions of the mixer is preferably in a range of 100 rpm to 10000 rpm, and more preferably in a range of 300 rpm to 2000 rpm. Further, a period of time for which the surface crosslinking agent and the water absorbent resin particles are retained in the mixing by the mixer is preferably within 180 seconds, more preferably in a range of 0.1 to 60 seconds, and further more preferably in a range of 1 to 30 seconds.

(Other Surface Crosslinking Method)

A surface crosslinking method employing a radical polymerization initiator (see U.S. Pat. No. 4,783,510, and PCT International Publication No. 2006/062258), and a surface crosslinking method in which a monomer(s) is polymerized on a surface of water absorbent resin (see US Patent Application Publications Nos. 2005/048221 and 2009/0239966, and PCT International Publication No. 2009/048160) can be substituted for a surface crosslinking method of the present invention employing the surface crosslinking agent.

In the surface crosslinking method of the present invention, a preferred example of the radical polymerization initiator to use is persulfate, a preferred example of the monomer(s) to be arbitrarily used is acrylic acid (salt) or the above-described crosslinking agents, and a preferred example of a solvent to use is water. The materials are added onto the surface of the water absorbent resin, and then by an active energy line (particularly ultraviolet ray) or heat, crosslinking polymerization is performed on the surface of the water absorbent resin, or crosslinking reaction is caused by use of the radical polymerization initiator. Thus, the surface crosslinking is attained.

(Ionic Bonding Surface Crosslinking Agent)

The method for producing the water absorbent polyacrylic acid (salt) resin powder of the present invention further includes an addition step for adding at least one of a polyvalent metal salt, a cationic polymer, and inorganic fine particles. The addition step is carried out concurrently or non-concurrently with the surface crosslinking step. That is, the permeability potential, the water absorbing rate, etc. may be improved by solely using the inorganic surface crosslinking agent or by using the inorganic surface crosslinking agent together with the organic surface crosslinking agent in combination. The inorganic surface crosslinking agent and the organic surface crosslinking agent may be added concurrently or separately. Examples of the inorganic surface crosslinking agent to use encompass divalent or greater, preferably trivalent or tetravalent metal salt (organic salt or inorganic salt), and hydroxide. Usable polyvalent metals include aluminum and zirconium. Aluminum lactate and aluminum sulfate are also exemplified. An aqueous solution containing aluminum sulfate is preferably employed. The inorganic surface crosslinking agent is used concurrently or non-concurrently with the organic surface crosslinking agent. The surface crosslinking with the use of the polyvalent metals is disclosed in PCT International Publications Nos. 2007/121037, 2008/09843, and 2008/09842, U.S. Pat. Nos. 7,157,141, 6,605,673, and 6,620,889, and US Patent Application Publications Nos. 2005/0288182, 2005/0070671, 2007/0106013, and 2006/0073969.

Moreover, the permeability potential etc. may be improved by a simultaneous or separate use of a cationic polymer particularly having weight average molecular weight of approximately 5,000 to 1,000,000. A preferred example of the cationic polymer to use is a vinyl amine polymer (see U.S. Pat. No. 7,098,284, PCT International Publications Nos. 2006/082188, 2006/082189, 2006/082197, 2006/111402, 2006/111403, and 2006/111404, etc.).

Further, the inorganic fine particles may be used. A preferred example of the inorganic fine particles is silicon dioxide (see U.S. Pat. No. 7,638,570 etc.).

A preferred production method in the present invention is the method for producing the water absorbent resin including the addition step for adding at least one of the polyvalent metal salt, the cationic polymer, and the inorganic fine particles. Such additives are preferably added concurrently or separately with the covalent bonding surface crosslinking agent. This makes it possible to further attain the object (the permeability potential and the water absorbing rate) of the present invention.

(Property After Surface Crosslinking)

The water absorbent resin powder obtainable by the gel grinding of the present invention, and further preferably by drying at the specific temperature and wind velocity can have the specific internal cell ratio. The present invention is not limited to the water absorbent resin powder. It is, however, preferable in the present invention that the surface crosslinking is performed with reaction temperature, reaction time, etc. appropriately adjusted so that the absorption against pressure (AAP) becomes not less than 20 [g/g], further a range described in (3-1) (later described) after the surface crosslinking, and the absorbency without pressure (CRC) becomes a range described in (3-3) (later described) after the surface crosslinking.

It is possible to provide the water absorbent resin powder in which the water absorbing rate (FSR) and the permeability potential (SFC) are both attained, by the gel grindings (the first to fourth producing methods) of the present invention, and further preferably by the particle diameter control of the dried polymer and the surface crosslinking. Thus, the object of the present invention is further attained. Note that novel water absorbent resin powder of the present invention will be described in detail in [3], the novel water absorbent resin powder being produced by, for example, the above-described production method.

Note also that in the production method of the present invention, the water absorbent resin before the surface crosslinking is not limited to having the internal cell ratio and the particulate diameter distribution.

(2-6) Other Steps (Fine Powder Recycling Step etc.)

Besides those steps described above, an evaporated monomer recycling step, a granulation step, a fine powder removing step, a fine powder recycling step, or like step may be provided, if necessary. Further, if necessary, the following additive may be added to some or all of the steps, in order to attain color stability over time or prevent gel property deterioration, etc. That is, a water-soluble or water-insoluble polymer, a lubricant, a chelating agent, deodorant, an anti-microbial agent, water, an interfacial active agent, water-insoluble fine particles, anti-oxidant, a reducing agent, or the like can be mixed with the water absorbent resin in an amount of preferably 0 wt % to 30 wt %, and more preferably 0.01 wt % to 10 wt %. Such additives can be used as a surface treatment agent.

The production method of the present invention can include the fine powder recycling step. What is meant by the fine powder recycling step is a step for separating fine powder (particularly fine powder containing not less than 70 wt % of fine particles each having a particle diameter of not more than 150 μm) generated in the drying step, and further in the grinding step and in the classifying step (if the grinding step and the classifying step are performed), and then recycling, in the polymerization step or in the drying step, the fine powder as it is or after being hydrated. The methods disclosed in US Patent Application Publication No. 2006/247351, U.S. Pat. No. 6,228,930, etc. can be applied to the fine powder recycling step of the present invention.

Furthermore, if required by the purpose thereof, the water absorbent resin may contain an oxidant, an anti-oxidant, water, a polyvalent metal compound, water-insoluble inorganic or organic powder such as silica or metal soap, deodorant, an antimicrobial agent, polymer polyamine, or pulps, thermoplastic fiber, in an amount of 0 wt % to 3 wt %, preferably 0 wt % to 1 wt %.

(2-7) Summary

In other words, a method for producing water absorbent resin powder of the present invention (first to fourth producing methods) is a method for producing water absorbent polyacrylic acid (salt) resin powder, including the steps of: (i) polymerizing an acrylic acid (salt) monomer aqueous solution; (ii) during or after the step of (i), performing gel grinding of a hydrogel crosslinked polymer obtained by the polymerization, wherein the hydrogel crosslinked polymer has resin solid content of 10 wt % to 80 wt %; (iii) drying a particulate hydrogel crosslinked polymer obtained by the gel grinding, wherein the drying is performed at 150° C. to 250° C.; and (iv) carrying out a surface treatment to the particulate hydrogel crosslinked polymer thus dried, the step of (ii) being carried out such that at least one of (1) to (4) is met, where (1) the gel grinding is carried out with gel grinding energy (GGE) of 18 [J/g] to 60 [J/g]; (2) the gel grinding is carried out with gel grinding energy (2) (GGE (2)) of 9 [J/g] to 40 [J/g]; (3) weight average molecular weight of water soluble content of the hydrogel crosslinked polymer is increased by 10,000 [Da] to 500,000 [Da]; and (4) the particulate hydrogel crosslinked polymer obtained by the step of (ii) has a weight average particle diameter (D50) of 350 μm to 2000 μm, and logarithmic standard deviation (σζ) of particle size distribution of 0.2 to 1.0.

In a case where the hydrogel crosslinked polymer is subjected to the gel grinding so that (4) is met, the particulate hydrogel crosslinked polymer is dried by a through-flow (belt) drier, the particulate hydrogel crosslinked polymer to be supplied into the through-flow (belt) drier has resin solid content of 10 wt % to 80 wt %, and the through-flow belt drier sends hot air of 150° C. to 250° C. at a velocity of 0.8 [m/s] to 2.5 [m/s] in a direction vertical (up-and-down direction) to the particulate hydrogel crosslinked polymer.

The gel grinding of the present invention essentially meets at least one of the gel grindings (1) to (4), preferably two or more, further preferably three or more, and especially preferably all of them. Further, it is preferable that not only the particulate hydrogel crosslinked polymer obtained by the gel grinding of (4) but also the particulate hydrogel crosslinked polymer obtained by the gel grinding of (1) to (3) be dried by the through-flow belt drier under the drying condition (such as the hot air velocity). Moreover, it is further preferable that surface crosslinking be performed especially by combination use of a covalent bonding surface crosslinking agent and an ionic bonding surface crosslinking agent.

Permeability potential (SFC) and a water absorbing rate (FSR) of water absorbent resin greatly depend on a surface area of the water absorbent resin, and are inversely proportional to each other. That is, the SFC is higher as the surface area is smaller, and in contrast, the FSR is higher as the surface area is larger. Therefore, conventional techniques have difficulty in attaining both the SFC and the FSR.

Meanwhile, according to the production method of the present invention, it is possible to attain the following ranges of the FSR and the SFC, especially (i) FSR of not less than 0.30 [g/g/sec], further a high water absorbing rate which will be described in (3-6), and (ii) SFC of not less than [× $10^{-7} \cdot cm^3 \cdot s \cdot g^{-1}$], further a high permeability potential which will be described in (3-2). The production method of the present invention is suitably applicable to a method for producing water absorbent resin having such high FSR and SFC. Note that preferred properties will be described in [3].

Patent Literatures 1 through 50, etc. are conventionally known as techniques for improving the water absorbing rate, the permeability potential, etc of the water absorbent resin. Meanwhile, it was found in the present invention that it is possible to improve and attain the water absorbing rate (such as the FSR) and the permeability potential (such as the SFC) by at least one of the specific gel grindings (1) to (4).

[3] Property of Water Absorbent Polyacrylic Acid (Salt) Resin (Novel Water Absorbent Resin)

The water absorbent polyacrylic acid (salt) resin produced by the production method of the present invention (the first to fourth producing methods) that is a preferred production method, has (i) not less than 95 wt % of the particles having the particle diameter of not less than 150 μm and less than 850 μm, (ii) the logarithmic standard deviation (σζ) of the particle size distribution in the range of 0.25 to 0.50, (iii) the absorption against pressure (AAP) of not less than 20 [g/g], (iv) the water absorbing rate (FSR) of not less than 0.30 [g/g/s], and (v) the internal cell ratio (defined by the following expression) in the range of 0.1% to 2.5%.

(Internal cell ratio) [%]={(real density)−(apparent density)}/(real density)×100

What is meant by "real density" in the present invention is density (unit; [g/cm$^3$]) which is fixedly determined from chemical composition (repeating unit of a polymer, minute raw materials such as the crosslinking agent, graft component used arbitrarily, etc.) of water absorbent polyacrylic acid (salt) resin which is sufficiently dried (water content of preferably less than 1 wt %, more preferably less than 0.5 wt %, and especially preferably less than 0.1 wt %). Therefore, the real density of the water absorbent polyacrylic acid (salt) resin is substantially constant, even though it may vary slightly due to its neutralization rate, the type of salt of the neutralization (for example, sodium polyacrylate having a neutralization rate of 75 mol %), or the minute raw materials.

Figure 2:
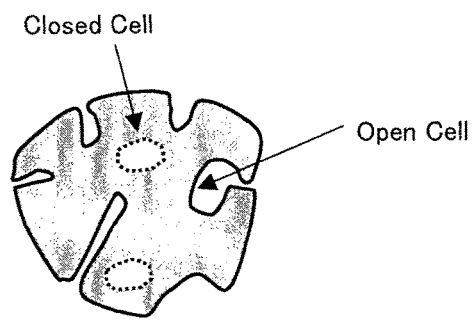
FIG. 2 is a cross-sectional view schematically illustrating closed cells and open cells in water absorbent resin powder.

What is meant by "apparent density" in the present invention is density (unit; [g/cm$^3$]) determined in consideration of pores (in other words, internal cells or closed cells) inside the particles of the water absorbent polyacrylic acid (salt) resin. For example, water absorbent resin obtained by foaming polymerization or water absorbent resin having been subjected to the granulation step has a space (void; internal cell, closed cell; closed pore) inside, which space is not communicated with its outside, as illustrated in FIG. 2. Thus, when the density of the water absorbent resin is measured by dry density measurement, the apparent density is obtained from the volume including the closed pore (closed cells) because introduced gas cannot enter the closed pore. Regarding the apparent density of water absorbent resin, Non-Patent Literature 1, pages 197 to 199, discloses that water absorbent resin having been subjected to 40 to 60 mesh-cut is measured by wet measurement in which volume of the water absorbent resin is measured by use of methanol. The apparent density of the present invention is characterized in being measured by the dry measurement for all particle diameters. It was found that the internal cell ratio defined by such apparent density is important for improvement of the properties of the water absorbent resin.

The density (real density and apparent density) of the water absorbent resin can be accurately measured by the dry density measurement in which a certain gas is used. The dry density measurement for solid is based on such measurement principle that has been well known in an isovolumetric swelling method in which volume of the solid is measured by use of a certain gas. More specifically, assuming that the volume of cells of a sample, $V_{cell}$, and the volume of the cells expanded, $V_{exp}$, are known, the volume of the sample, $V_{samp}$, can be obtained by measuring pressures (gage pressures) $P_{1g}$ and $P_{2g}$, and the density of the sample can be obtained by dividing the volume of the sample by mass of the sample, which is separately measured (see the homepage of Shimazu Corporation, http://www.shimadzu.co.jp/powder/lecture/middle/m04.html).

The real density is fixedly determined from the chemical composition (mainly, the repeating unit of the polymer). Thus, a known value may be used as the real density. If there is no known value for the real density of the water absorbent resin because the real density is varied slightly due to the minute raw materials of the water absorbent resin, the real density may be determined by a later-described method. The water absorbent resin has substantially no closed cell by being subjected to eliminating by which the closed cells in the water absorbent resin are broken or converted into open cells. Therefore, the density of the water absorbent resin thus subjected to eliminating can be regarded as the real density. Here, the "open cells" are cells communicating with outside, and are not measured into the volume of the water absorbent resin in the dry density measurement. Thus, the closed cells and the open cells can be easily distinguished from each other by the dry density measurement.

An unpublished prior application PCT/JP2010/073254 (International Application Date: Dec. 24, 2010) describes producing water absorbent resin, into which fine cells (closed cells) are introduced, by adding an interfacial active agent into a monomer aqueous solution, and then polymerizing the monomer aqueous solution. The international application describes employing an internal cell ratio for calculating how much the closed cells account for in the water absorbent resin, and also describes that the internal cell ratio is preferably in a range of 2.8% to 6.6%. Further, the internal application describes that the range of the internal cell ratio makes it possible to improve a water absorbing rate (FSR) and permeability potential (SFC) of the water absorbent resin which are inversely proportional to each other.

The international application, however, discloses neither the production method of the present invention (the gel grinding, the drying, and the surface treatment under the specific conditions) nor the water absorbent resin powder of the present invention to be produced by, for example, the production method of the present invention. That is, conventional knowledge such as the international application does not disclose the water absorbent resin powder having (i) the internal cell ratio in the range of 0.1% to 2.5%, (ii) the water absorbing rate (FSR) of not less than 0.30 [g/g/s], and (iii) the absorption against pressure of not less than 20 [g/g].

The water absorbent resin powder of the present invention thus has (i) the internal cell ratio in the range of 0.1% to 2.5%, (ii) the absorption against pressure (AAP) of not less than 20 [g/g], and (iii) the water absorbing rate (FSR) of not less than 0.30 [g/g/s]. The water absorbent resin powder having such properties yields a new effect of greatly improving the permeability potential (SFC) while keeping the water absorbing rate (FSR).

The water absorbent resin powder of the present invention has the range of the internal cell ratio smaller than that defined in the international application (earlier application). As the internal cell ratio approaches 0%, a difference between the real density and the apparent density becomes small. This means that the water absorbent resin includes less closed cells accordingly. In other words, the surface area of the water absorbent resin is to be reduced. It is therefore supposed that the water absorbing rate (FSR) that depends on the surface area is decreased. However, the water absorbing rate (FSR) of the water absorbent resin powder of the present invention is not decreased on the contrary.

As the reason why the water absorbing rate (FSR) of the water absorbent resin powder of the present invention is not decreased, it is considered that the surface area is increased by a factor other than the closed cells. Examples of the factor encompass an uneven surface of the water absorbent resin, and holes in a part of the water absorbent resin. The water absorbent resin having such a surface, and further having a high AAP, that is, a sufficient gel strength under pressure makes it possible to increase a space in the water absorbent resin powder after being swollen, thereby improving the permeability potential (SFC) under pressure.

The internal cell ratio of the water absorbent resin of the present invention is in a range of 0.1% to 2.5%, preferably in a range of 0.2% to 2.0%, more preferably in a range of 0.3% to 1.7%, and further preferably in a range of 0.5% to 1.5%. Controlling the internal cell ratio in the above range makes it possible to obtain the water absorbent resin having the water absorbing rate and the permeability potential which are defined in the present invention. The internal cell ratio can be controlled by the gel grinding energy, increase in water soluble content, etc. in the production method of the present invention. Alternatively, the internal cell ratio may be controlled by means (combination use) of foaming polymerization, foaming during drying, or the like.

(Other Properties)

The water absorbent resin obtainable by the production method of the present invention is preferably configured to satisfy the following properties. When the water absorbent resin whose main component is water absorbent polyacrylic acid (salt) resin is to be used in sanitary goods, especially, disposable diapers, it is controlled by the polymerization method or the surface crosslinking method so as to satisfy preferably (i) at least one of (3-1) to (3-8), more preferably (ii) AAP and at least one other of (3-1) to (3-8), or especially preferably (iii) AAP and at least two others of (3-1) to (3-8). If the following properties were not satisfied, the water absorbent resin would not be able to sufficiently perform in a high-concentration disposable diaper having water absorbent resin concentration of not less than 40 wt %.

(3-1) AAP (Absorption Against Pressure)

In order to prevent leakage in disposable diapers, the water absorbent resin obtainable by the present invention under load of 4.8 kPa has absorption against pressure (AAP) of preferably 20 [g/g] or more, more preferably 22 [g/g] or more, and further preferably 24 [g/g] or more, for example by the polymerization. An upper limit of the AAP is not particularly limited. However, considering a balance with the other properties, the upper limit is preferably 35 [g/g] or less, more preferably 30 [g/g] or less, and further preferably 28 [g/g] or less. Note that the AAP can be improved by the surface crosslinking after the particle diameter control, and it is possible to obtain the novel water absorbent resin of the present invention, and improve the permeability potential (SFC) while keeping the water absorbing rate (FSR), by performing the surface crosslinking so that the AAP becomes in the above range.

(3-2) SFC (Saline Flow Conductivity)

In order to prevent the leakage in disposable diapers, saline flow conductivity (SFC) of the water absorbent resin obtainable by the present invention can be improved by the production method of the present invention, particularly by the surface crosslinking after the gel grinding, preferably after the particle diameter control of the present invention. The SFC (permeability potential of a liquid against pressure) for a 0.69 wt % sodium chloride aqueous solution is controlled to be preferably 1 $[\times 10^{-7} \cdot cm^3 \cdot sec \cdot g^{-1}]$ or more, more preferably 20 $[\times 10^{-7} \cdot cm^3 \cdot sec \cdot g^{-1}]$ or more, further preferably 50 $[\times 10^{-7} \cdot cm^3 \cdot sec \cdot g^{-1}]$ or more, especially preferably 70 $[\times 10^{-7} \cdot cm^3 \cdot sec \cdot g^{-1}]$ or more, and most preferably 100 $[\times 10^{-7} \cdot cm^3 \cdot sec \cdot g^{-1}]$ or more, for example by the surface crosslinking so that the AAP becomes in the above range. The SFC is a well-known measuring method, and can be defined by, for example, the method described in U.S. Pat. No. 5,562,646. The present invention is suitably applicable to the production of the water absorbent resin with a high permeability potential, because the present invention is remarkably effective to attain permeability potential improvement, especially SFC improvement, especially to attain SFC within the above range, or specifically SFC of 20 $[\times 10^{-7} \cdot cm^3 \cdot sec \cdot g^{-1}]$ or more.

(3-3) CRC (Absorbency Without Pressure)

CRC (absorbency without pressure) of the water absorbent resin obtainable by the present invention is preferably 10 [g/g] or more, more preferably 20 [g/g] or more, further preferably 25 [g/g] or more, and especially preferably 30 [g/g] or more. An upper limit of the CRC is not limited. However, considering the balance with the other properties, the upper limit is preferably 50 [g/g] or less, more preferably 45 [g/g] or less, and further preferably 40 [g/g] or less. The CRC can be appropriately controlled by crosslinking agent content during the polymerization, and the surface crosslinking (secondary crosslinking) after the polymerization.

(3-4) Ext (Water Soluble Content)

In order to prevent disposable diapers from growing sticky etc. in use due to leakage of liquid, Ext (water soluble content) of the water absorbent resin obtainable by the present invention is preferably 35 wt % or less, more preferably 25 wt % or less, further preferably 15 wt % or less, and especially preferably 10 wt % or less. The Ext can be appropriately controlled by the crosslinking agent content during the polymerization, and increase in water soluble content due to the gel grinding after the polymerization.

(3-5) Residual Monomers

Residual monomers of the water absorbent resin obtainable by the present invention are controlled to be normally 500 ppm or less, preferably in a range of 0 to 400 ppm, more preferably in a range of 0 to 300 ppm, and especially preferably in a range of 0 to 200 ppm, for example by the polymerization, in terms of safety. The residual monomers can be appropriately controlled by a polymerization initiator during the polymerization, drying conditions after the polymerization, etc.

(3-6) FSR (Water Absorbing Rate)

In order to prevent the leakage in disposable diapers, the water absorbent resin obtainable by the present invention has a water absorbing rate (FSR) of normally 0.2 [g/g/s] or more, preferably 0.25 [g/g/s] or more, more preferably 0.30 [g/g/s] or more, further preferably 0.35 [g/g/s] or more, especially preferably 0.40 [g/g/s] or more, and most preferably 0.45 [g/g/s] or more, for example by the polymerization. An upper limit of the FSR is 1.00 [g/g/s] or less. The measuring method of the FSR is defined by PCT International Publication No. 2009/016055. The FSR can be controlled by the first to fourth producing methods of the present invention, and the particle diameter control after drying.

The present invention is suitably applicable to the production of the water absorbent resin with a high water absorbing rate, because the present invention is remarkably effective to attain water absorbing rate improvement, especially FSR improvement, especially to attain FSR within the above range, specifically FSR of 0.30 [g/g/s] or more.

(3-7) Amount of Fine Powder to Increase Before and After Damage

An amount of fine powder to increase before and after damage in the water absorbent resin obtainable by the present invention, which amount is defined by the measurement method of Examples (an amount of particles passing through a sieve of 150 μm to increase) is preferably in a range of 0 to 3 wt %, and more preferably in a range of 0 to 1.5 wt %. The water absorbent resin including the fine powder in such a range does not have a problem of decrease in the properties in being actually used such as being used in disposable diapers. The amount of fine powder to increase is lowered by the first to fourth producing methods (gel grinding) of the present invention.

(3-8) Bulk Specific Gravity

Bulk specific gravity (defined by ERT460.2-02) of the water absorbent resin obtainable by the present invention is preferably in a range of 0.50 [g/cm$^3$] to 0.80 [g/cm$^3$], and further preferably in a range of 0.60 [g/cm$^3$] to 0.70 [g/cm$^3$]. Water absorbent resin having no bulk specific gravity in the range may deteriorate its properties or may be powdered. The bulk specific gravity can be lowered by the first to fourth producing methods (gel grinding) of the present invention.

(3-9) Surface Crosslinking

In order to attain the object of the present invention, the water absorbent resin is preferably subjected to surface crosslinking, particularly crosslinked by combination use of the ionic bonding surface crosslinking agent (such as polyvalent metal) and the covalent bonding surface crosslinking agent. Note that in the present invention, the water absorbent resin that is subjected to the surface crosslinking may be referred to as water absorbent resin powder.

[4] Application of Water Absorbent Polyacrylic Acid (Salt) Resin Powder

The water absorbent resin powder obtainable by the production method of the present invention is not limited to particular applications, but is preferably applicable to absorbing products such as disposable diaper, sanitary napkins, and incontinence pad. The water absorbent resin powder shows an excellent property in a case where it is used in a high concentration diaper (a disposable diaper in which a lot of water absorbent resin is used) having problems such as odor derived from a material, and coloring, particularly in a case where it is used in an upper layer part of an absorber of the high concentration disposable diaper.

The absorbing products, which may arbitrary contain other absorbing material(s) (such as pulp or fibers), have water absorbent resin content (core concentration) preferably in a range of 30 wt % to 100 wt %, more preferably in a range of 40 wt % to 100 wt %, further preferably in a range of 50 wt % to 100 wt %, further more preferably in a range of 60 wt % to 100 wt %, especially preferably in a range of 70 wt % to 100 wt %, and most preferably in a range of 75 wt % to 95 wt %. For Example, in a case where the water absorbent resin powder obtainable by the production method of the present invention is used with the above core concentration particularly in the upper part of the absorber, liquid is efficiently distributed in the absorber, and an amount of the liquid to be absorbed by the entire absorbing product is improved because the absorber has an excellent diffusivity of absorbed liquid such as urine thanks to a high permeability potential of the absorber. It is further possible to provide the absorbing product in which the absorber keeps white color giving an impression of cleanness.

That is, the present application includes the following invention.

[1] A method for producing water absorbent polyacrylic acid (salt) resin powder, including the steps of: (i) polymerizing an acrylic acid (salt) monomer aqueous solution; (ii) during or after the step of (i), performing gel grinding of a hydrogel crosslinked polymer obtained by the polymerization, wherein the hydrogel crosslinked polymer has resin solid content of 10 wt % to 80 wt %; (iii) drying a particulate hydrogel crosslinked polymer obtained by the gel grinding, wherein the drying is performed at 150° C. to 250° C. by use of a drier; and (iv) carrying out a surface treatment to the particulate hydrogel crosslinked polymer thus dried, the step of (ii) being carried out such that at least one of (1) to (4) is met, where (1) the gel grinding is carried out with gel grinding energy (GGE) of 18 [J/g] to 60 [J/g]; (2) the gel grinding is carried out with gel grinding energy (2) (GGE (2)) of 9 [J/g] to 40 [J/g]; (3) weight average molecular weight of water soluble content of the hydrogel crosslinked polymer is increased by 10,000 [Da] to 500,000 [Da]; and (4) the particulate hydrogel crosslinked polymer obtained by the step of (ii) has a weight average particle diameter (D50) of 350 μm to 2000 μm, and logarithmic standard deviation (σζ) of particle size distribution of 0.2 to 1.0.

In a case where the hydrogel crosslinked polymer is subjected to the gel grinding so that (4) is met, the particulate hydrogel crosslinked polymer is dried by a through-flow belt drier, the particulate hydrogel crosslinked polymer to be supplied into the through-flow belt drier has resin solid content of 10 wt % to 80 wt %, and the through-flow belt drier sends hot air of 150° C. to 250° C. at a velocity of 0.8 [m/s] to 2.5 [m/s] in a direction vertical (up-and-down direction) to the particulate hydrogel crosslinked polymer.

[2] A method for producing water absorbent polyacrylic acid (salt) resin powder, including the steps of: (i) polymerizing an acrylic acid (salt) monomer aqueous solution; (ii) during or after the step of (i), performing gel grinding of a hydrogel crosslinked polymer obtained by the polymerization, wherein the hydrogel crosslinked polymer has resin solid content of 10 wt % to 80 wt %, and the gel grinding is carried out with gel grinding energy (GGE) of 18 [J/g] to 60 [J/g]; (iii) drying at 150° C. to 250° C. a particulate hydrogel crosslinked polymer obtained by the gel grinding; and (iv) carrying out a surface treatment to the particulate hydrogel crosslinked polymer thus dried.

[3] A method for producing water absorbent polyacrylic acid (salt) resin powder, including the steps of: (i) polymerizing an acrylic acid (salt) monomer aqueous solution; (ii) during or after the step of (i), performing gel grinding of a hydrogel crosslinked polymer obtained by the polymerization, wherein the hydrogel crosslinked polymer has resin solid content of 10 wt % to 80 wt %, and the gel grinding is carried out with gel grinding energy (2) (GGE (2)) of 9 [J/g] to 40 [J/g]; (iii) drying at 150° C. to 250° C. a particulate hydrogel crosslinked polymer obtained by the gel grinding; and (iv) carrying out a surface treatment to the particulate hydrogel crosslinked polymer thus dried.

[4] A method for producing water absorbent polyacrylic acid (salt) resin powder, including the steps of: (i) polymerizing an acrylic acid (salt) monomer aqueous solution; (ii) during or after the step of (i), performing gel grinding of a hydrogel crosslinked polymer obtained by the polymerization, wherein the hydrogel crosslinked polymer has resin solid content of 10 wt % to 80 wt %, so that weight average molecular weight of water soluble content of the hydrogel crosslinked polymer is increased by 10,000 [Da] to 500,000 [Da]; (iii) drying at 150° C. to 250° C. a particulate hydrogel crosslinked polymer obtained by the gel grinding; and (iv) carrying out a surface treatment to the particulate hydrogel crosslinked polymer thus dried.

[5] The method as set forth in any one of [2] to [4], wherein the particulate hydrogel crosslinked polymer obtained by the step of (ii) has resin solid content of 10 wt % to 80 wt %.

[6] The method as set forth in any one of [2] to [5], wherein a drier used in the step of (iii) is a through-flow belt drier configured to send hot air at a velocity of 0.8 [m/s] to 2.5 [m/s] in a direction vertical to the particulate hydrogel crosslinked polymer.

[7] A method for producing water absorbent polyacrylic acid (salt) resin powder, including the steps of: (i) polymerizing an acrylic acid (salt) monomer aqueous solution; (ii) during or after the step of (i), performing gel grinding of a hydrogel crosslinked polymer obtained by the polymerization so as to obtain a particulate hydrogel crosslinked polymer having a weight average particle diameter (D50) of 350 μm to 2000 μm and logarithmic standard deviation (σζ) of particle size distribution of 0.2 to 1.0; (iii) drying the particulate hydrogel crosslinked polymer by hot air of 150° C. to 250° C. at a velocity of 0.8 [m/s] to 2.5 [m/s] in a direction vertical to the particulate hydrogel crosslinked polymer by use of a through-flow belt drier, the particulate hydrogel crosslinked polymer to be supplied into the through-flow belt drier having resin solid content of 10 wt % to 80 wt %; and (iv) carrying out a surface treatment to the particulate hydrogel crosslinked polymer thus dried.

[8] The method as set forth in any one of [4] to [7], wherein the step of (ii) is such that the hydrogel crosslinked polymer is subjected to gel grinding with gel grinding energy (GGE) of 18 [J/g] to 60 [J/g].

[9] The method as set forth in any one of [1] to [8], wherein the step of (i) performs kneader polymerization or belt polymerization.

[10] The method as set forth in any one of [1] to [9], wherein the step of (ii) is carried out with respect to: (a) a hydrogel crosslinked polymer having gel CRC of 10 [g/g] to 35 [g/g]; (b) a hydrogel crosslinked polymer having gel Ext of 0.1 wt % to 10 wt %; or (c) a hydrogel crosslinked polymer having gel CRC of 10 [g/g] to 35 [g/g] and gel Ext of 0.1 wt % to 10 wt %.

[11] The method as set forth in any one of [1] to [10], wherein the step of (ii) is carried out with respect to a hydrogel crosslinked polymer having resin solid content of 40 wt % to 80 wt %.

[12] The method as set forth in any one of [1] to [11], wherein the step of (ii) is carried out with respect to: (d) a hydrogel crosslinked polymer having a monomer polymerization ratio of not less than 90 mol %; (e) a hydrogel crosslinked polymer having a neutralization ratio of 45 mol % to 90 mol %; or (f) a hydrogel crosslinked polymer having a monomer polymerization ratio of not less than 90 mol % and a neutralization ratio of 45 mol % to 90 mol %.

[13] The method as set forth in any one of [1] to [12], wherein the step of (ii) is carried out with respect to a hydrogel crosslinked polymer having a gel temperature of 40° C. to 120° C.

[14] The method as set forth in any one of [1] to [13], wherein the step of (ii) employs a screw extruder including a casing having an edge where a porous die is provided.

[15] The method as set forth in any one of [1] to [14], wherein the step of (ii) is carried out so that gel Ext of the hydrogel crosslinked polymer is increased by not more than 5 wt %.

[16] The method as set forth in any one of [1] to [15], wherein in the step of (ii), 0 to 4 part(s) by weight of water is added to 100 parts by weight of the hydrogel crosslinked polymer.

[17] The method as set forth in any one of [1] to [16], wherein the particulate hydrogel crosslinked polymer thus obtained in the step of (ii) has at least one property of: (g) gel Ext of 0.1 wt % to 10 wt %; (h) gel CRC of 10 [g/g] to 35 [g/g]; and (i) resin solid content of 10 wt % to 80 wt %.

[18] The method as set forth in any one of [1] to [17], wherein the particulate hydrogel crosslinked polymer to be supplied into a through-flow belt drier in the step of (iii) has a temperature of 60° C. to 110° C.

[19] The method as set forth in any one of [1] to [18], further including a classifying step, the classifying step providing classified water absorbent resin particles having a weight average particle diameter (D50) of 250 μm to 500 μm and logarithmic standard deviation (σζ) of particle size distribution of 0.25 to 0.50.

[20] The method as set forth in any one of [1] to [19], wherein the surface treatment includes a surface crosslinking step of performing surface crosslinking to the particulate hydrogel crosslinked polymer thus dried, and a step of adding, to the particulate hydrogel crosslinked polymer thus dried, at least one of (i) polyvalent metal salt, (ii) a cationic polymer and (iii) inorganic fine particles, the step of adding being carried out concurrently or non-concurrently with the surface crosslinking step.

[21] Water absorbent polyacrylic acid (salt) resin having: 95 wt % or more of particles whose diameter is not less than 150 μm and less than 850 μm; logarithmic standard deviation (σζ) of particle size distribution of 0.25 to 0.50; absorption against pressure (AAP) of 20 [g/g] or more; a water absorbing rate (FSR) of 0.30 [g/g/s] or more; and an internal cell ratio of 0.1% to 2.5%, which is calculated by the following expression.

(Internal cell ratio)[%]={(real density)−(apparent density)}/(real density)×100

[22] The water absorbent polyacrylic acid (salt) resin as set forth in [21], further containing at least one of (i) polyvalent metal salt, (ii) a cationic polymer and (iii) inorganic fine particles.

EXAMPLES

The description below deals with the present invention with reference to Examples. The present invention is, however, not construed limitedly to the Examples. The physical properties mentioned in the claims of the present invention and in the Examples were determined under the conditions of room temperature (20 to 25° C.) and a humidity of 50 RH % by an EDANA method and the measurement methods below unless otherwise stated. The electric devices mentioned in the Examples and Comparative Examples were operated at 200 V or 100 V with use of a 60-Hz power supply. The description below may, for convenience, use the letter "L" to mean "liter" and the sign "wt %" to mean "percent by weight".

(a) CRC and Gel CRC

The Examples measured CRC (Centrifuge Retention Capacity) in accordance with ERT 441.2-02. Specifically, the Examples weighed out 0.200 g of a water absorbent resin, placed the water absorbent resin uniformly in a bag (60×60 mm) made of unwoven cloth, heat-sealed the bag, and then immersed the bag in 1000 mL of a 0.9 wt % sodium chloride aqueous solution having a temperature adjusted to 25±3° C. The Examples, 30 minutes later, took out the bag, drained the water absorbent resin by using a centrifugal device (centrifugal device produced by KOKUSAN Corporation, model: H-122) under the conditions of 250 G and 3 minutes, and then measured the weight W1 [g] of the bag. The Examples further carried out a similar operation involving no water absorbent resin, measured the weight W2 [g] of a corresponding bag for that operation, and calculated CRC (Centrifuge Retention Capacity) by the expression (4) below.

[Mathematical Expression 4]

$$\text{CRC } [g/g] = \{(W1-W2)/(\text{weight of water absorbent resin})\}-1 \qquad \text{Expression 4}$$

To measure gel CRC, the Examples carried out an operation identical to the above operation except for use of 0.4 g of hydrogel and a free swelling time of 24 hours. The Examples further measured the resin solid content of the hydrogel through a separate operation to determine the weight of a water absorbent resin in the above 0.4 g of hydrogel, and calculated gel CRC in correspondence with the expression (5) below. The Examples made this measurement 5 times for each sample, and employed the average value calculated from the five measurements.

[Mathematical Expression 5]

$$\text{Gel CRC } [g/g] = \{(mwi - mb) - msi \times (Wn/100)\} / \{msi \times (Wn/100)\} \quad \text{Expression 5}$$

In the above expression, $msi$ represents the weight [g] of a hydrogel before measurement;

$mb$ represents the weight [g] of Blank (unwoven cloth only) after free swell and draining;

$mwi$ represents the weight [g] of the hydrogel after free swell and draining; and $Wn$ represents the solid content [wt %] of the hydrogel.

(b) Ext and Gel Ext

The Examples measured Ext (water-soluble content) in accordance with ERT 470.2-02. Specifically, the Examples placed 1.000 g of a water absorbent resin and 200 ml of a 0.90 wt % sodium chloride aqueous solution in a plastic vessel (capacity: 250 mL) having a lid and, stirred the mixture with a cylindrical stirrer (length: 3.5 cm, diameter: 6 mm) at 400 rpm for 16 hours, and extracted water soluble content from the water absorbent resin. The Examples filtered the extract with a filter paper (produced by Advantec Toyo Kaisha, Ltd., product name: JIS P 3801, No. 2, thickness: 0.26 mm, retaining particle diameter: 5 μm), and used 50.0 g of the filtrate as a measurement liquid.

The Examples then titrated the measurement liquid with a 0.1N—NaOH aqueous solution until the measurement liquid reached a pH of 10, further titrated the measurement liquid with a 0.1N—HCl aqueous solution until the measurement liquid reached a pH of 2.7, and then determined titers ([NaOH] mL and [HCl] mL) at that stage. The Examples also carried out a similar operation with respect to only a 0.90 wt % sodium chloride aqueous solution to determine blank titers ([bNaOH] mL and [bHCl] mL). The Examples calculated Ext (water soluble content) of a water absorbent resin of the present invention by the expression (6) below on the basis of (i) the average molecular weight of the monomer of the water absorbent resin and (ii) the titers calculated through the above operation.

[Mathematical Expression 6]

$$\text{Ext [wt \%]} = 0.1 \times (\text{average molecular weight of monomer}) \times 200 \times 100 \times ([HCl] - [bHCl])/1000/1.000/50.0 \quad \text{Expression 6}$$

To calculate gel Ext, the Examples used 5.0 g of hydrogel cut with scissors into a shape having sides each with a length of approximately 1 mm to 5 mm, and carried out an operation identical to the above operation except for a stirring time of 24 hours. The Examples further measured the resin solid content of the hydrogel in a separate operation to determine the weight of the water absorbent resin of the above 5.0 g of hydrogel, and calculated gel Ext by the expression (7) below.

[Mathematical Expression 7]

$$\text{Gel Ext [wt \%]} = \{(V_{HCl.s} - V_{HCl.b}) \times C_{HCl} \times Mw \times F_{dil} \times 100\}/ms \times (Wn/100) \times 1000 \quad \text{Expression 7}$$

In the above expression, $V_{HCl.s}$ represents the amount [ml] of HCl necessary to reduce the pH from 10 to 2.7 of a filtrate including a dissolved polymer;

$V_{HCl.b}$ represents the amount [ml] of HCl necessary to reduce the pH from 10 to 2.7 of Blank (0.9 wt % sodium chloride aqueous solution);

$C_{HCl}$ represents the concentration [mol/l] of an HCl solution;

$Mw$ represents the average molecular weight [g/mol] of a monomer unit in acrylic acid (salt) polymer (for example, Mw is 88.1 [g/mol] in the case of a neutralization rate of 73 mol %);

$F_{dil}$ represents the dilution of a filtrate including a dissolved polymer;

$ms$ represents the weight [g] of a hydrogel before the measurement; and $Wn$ represents the solid content [wt %] of the hydrogel.

(c) Weight Average Molecular Weight of Water Soluble Content

The weight average molecular weight of the water soluble content is expressed as a value obtained by a GPC measurement of the weight average molecular weight of a polymer dissolved through the above operation of measuring Ext and gel Ext. The following describes that GPC measurement.

The Examples used, for GPC, TDA 302 (registered trademark) produced by Viscotech Co., Ltd. This device includes a size exclusion chromatography, a refractive index detector, a light scattering detector, and a capillary viscometer. The Examples used the measurement devices and measurement conditions listed below.

Pump-autosampler: GPC max produced by Viscotech Co., Ltd.

Guard column: SHODEX GF-7B

Column: two TOSOH GMPWXLs connected in series

Detector: TDA 302 produced by Viscotech Co., Ltd. (temperature inside the system was kept at 30° C.)

Solvent: aqueous solution including 60 mM of sodium dihydrogen phosphate dihydrate and 20 mM of disodium hydrogenphosphate dodecahydrate Flow rate: 0.5 ml/min Injection amount: 100 μl The Examples used, for device calibration, polyoxyethylene glycol (weight average molecular weight (Mw): 22396, differential refractive index (dn/dc)=0.132, solvent refractive index of 1.33) as a reference sample.

In the case where the measurement target substance was a water absorbent resin prepared by polymerizing a monomer containing 99 or more mol % acrylic acid (salt), the Examples set the differential refractive index (dn/dc) of a polymer as an analysis target to 0.12 to carry out measurements. In the case where the measurement target substance was a copolymerized water absorbent resin having a 1 or more mol % content of a monomer other than acrylic acid (salt), the Examples measured a differential refractive index (dn/dc) unique to that polymer and observed when the polymer was in a solvent, and carried out measurements with use of that numerical value. The Examples collected and analyzed data on the refractive index, light scatter intensity, and viscosity with use of the Viscotek OmniSEC 3.1 (registered trademark) software. The Examples calculated the weight average molecular weight (Mw) on the basis of data obtained from the refractive index and light scatter intensity.

(d) Weight Average Particle Diameter (D50) and Logarithmic Standard Deviation (σζ) of Particle Size Distribution The Examples measured the weight average particle diameter (D50) and the logarithmic standard deviation (σζ) of a particle size distribution for a water absorbent resin in accordance with a measurement method described in European Patent No. 0349240. The Examples measured the weight average particle diameter (D50) and the logarithmic standard deviation (σζ) of a particle size distribution for a hydrogel by a method below.

Specifically, the Examples added, to 500 g of a 20 wt % sodium chloride aqueous solution containing 0.08 wt % of Emal 20C (hereinafter referred to as "Emal aqueous solution") (surface active agent, produced by Kao Corporation), 20 g of hydrogel (solid content: a wt %) with a temperature of 20° C. to 25° C. to prepare a dispersion solution, and stirred the dispersion solution with a stirrer chip (length: 50 mm, diameter: 7 mm) at 300 rpm for 60 minutes in a columnar polypropylene vessel (height: 21 cm, diameter: 8 cm) having a capacity of approximately 1.14 L.

The Examples, after finishing the stirring, placed the above dispersion solution on a central portion of JIS standard sieves (diameter: 21 cm, mesh sizes of the sieves: 8 mm/4 mm/2 mm/1 mm/0.60 mm/0.30 mm/0.15 mm/0.075 mm) disposed on a turntable. The Examples washed all the hydrogel with use of 100 g of the Emal aqueous solution so that the hydrogel would appear on the sieves, and then uniformly poured 6000 g of the Emal aqueous solution from above at the height of 30 cm with use of a shower (with 72 holes, fluid volume: 6.0 [L/min]) while manually rotating the sieves at 20 rpm so that the water-pouring range (50 cm$^2$) would cover the entire sieves, and thus classified the hydrogel. The Examples drained the classified hydrogel on a first-stage sieve for approximately 2 minutes, and weighed the classified hydrogel. The Examples carried out a similar operation with respect to sieves on second and subsequent sieves for classification, and weighed the hydrogel remaining on each sieve after draining it.

The Examples calculated a ratio (wt %) of the hydrogel remaining on each sieve on the basis of its weight by the expression (8) below. The Examples used, after the draining, sieves having the mesh sizes defined by the expression (9) below, and plotted the particle size distribution of the hydrogel on a logarithmic probability paper. The Examples used, as the weight average particle diameter (D50) of the hydrogel, a particle diameter corresponding to 50 wt % which is calculated by adding up the ratios of the hydrogels remaining on the respective sieves on the plot. The Examples further determined, from the plot, particle diameters respectively corresponding to 84.1 wt % (designated by X1) and 15.9 wt % (designated by X2) to determine the logarithmic standard deviation (σζ) by the expression (10) below. A smaller value of σζ indicates a narrower particle size distribution.

[Mathematical Expression 8]

$$x\ [\%]=(w/W)\times 100 \qquad \text{Expression 8}$$

[Mathematical Expression 9]

$$R(\alpha)\ [mm]=(20/w)^{1/3}\times r \qquad \text{Expression 9}$$

In the above expressions,

X represents the weight [%] of a hydrogel remaining on each sieve after draining and classification;

w represents the weight [g] of an individual hydrogel remaining on each sieve after draining and classification;

W represents the total weight [g] of hydrogel remaining on the sieves after draining and classification;

R (α) represents the mesh size [mm] of a sieve which mesh size is as converted to correspond to a case of a hydrogel with a solid content of α wt %; and r represents the mesh size [mm] of a sieve through which is classified a hydrogel that has swollen in a 20 wt % sodium chloride aqueous solution.

[Mathematical Expression 10]

$$\sigma\zeta=0.5\times\ln(X2/X1) \qquad \text{Expression 10}$$

X1 represents a particle diameter in the case where R=84.1%, and X2 represents a particle diameter in the case where R=15.9%.

(e) Apparent Density

The Examples removed moisture from the water absorbent resin, and measured (dry measurement of the volume of a water absorbent resin having a predetermined weight), with use of a dry densimeter, an apparent density that takes into consideration cells (internal cells) present inside the resin.

Specifically, the Examples weighed out 6.0 g of the water absorbent resin, placed it in an aluminum cup having a bottom surface with a diameter of approximately 5 cm, and then dried the water absorbent resin in a no-air flow drier at 180° C. The Examples left the water absorbent resin for 3 hours or longer until its moisture content was not greater than 1 wt %, and thus sufficiently dried the water absorbent resin. The Examples, after the drying, measured the apparent density (unit: [g/cm$^3$]) of 5.00 g of the water absorbent resin with use of a dry automatic densimeter (AccuPycII 1340TC-10CC, produced by Shimazu Corporation, carrier gas: helium). The Examples repeated that measurement until the measured values were the same continuously for 5 or more times.

(f) Real Density

Figure 3:
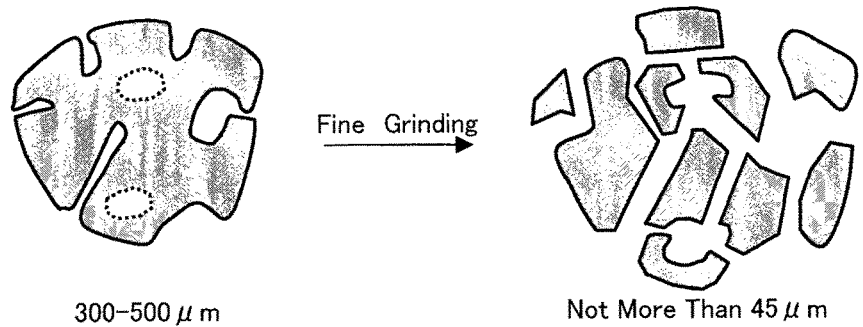
FIG. 3 is a cross-sectional view schematically illustrating how to finely grind to less than 45 µm water absorbent resin powder (for example, containing particles in particle diameter of 850 µm to 150 µm by not less than 95 wt %) in order to perform real density measurement in the present invention.

Internal cells (closed cells) present inside a water absorbent resin each normally have a diameter of 1 μm to 300 μm. Such a water absorbent resin is ground preferentially at portions close to closed cells. In the case where a water absorbent resin has been ground to have a particle diameter of 45 μm or less, the resulting water absorbent resin has almost no closed cells (see FIG. 3). The present invention thus evaluated, as a real density, a dry density of a water absorbent resin that had been ground to have a particle diameter of 45 μm or less.

Specifically, the Examples placed 15.0 g of the water absorbent resin and 400 g of columnar ceramic balls (each with a diameter of 13 mm and a length of 13 mm) in a ball mill pot (produced by Teraoka Corporation, type No. 90/internal size, diameter: 80 mm, height: 75 mm; external size, diameter: 90 mm, height: 110 mm), and operated the ball mill pot at 60 Hz for 2 hours to prepare a water absorbent resin that would pass through a JIS standard sieve having a mesh size of 45 μm (that is, a water absorbent resin having a particle diameter of 45 μm or less). The Examples dried 6.0 g of that water absorbent resin with a particle diameter of 45 μm or less in a manner similar to the manner described under [Apparent Density] above, that is, at 180° C. for 3 hours or longer, and then measured the dry density of the water absorbent resin. The value thus measured was designated as the "real density" of the present invention.

(g) Internal Cell Rate

The Examples calculated the internal cell rate of the water absorbent resin by the expression (11) below on the basis of (i) the apparent density (designated by ρ1 [g/cm$^3$]) measured by the method described under [Apparent Density] above and (ii) the real density (designated by ρ2 [g/cm$^3$]) measured by the method described under [Real Density] above.

[Mathematical Expression 11]

$$\text{Internal cell rate }[\%]=(\rho 2-\rho 1)/\rho 2\times 100 \qquad \text{Expression 11}$$

Production Example 1

The present Production Example prepared, as a device for producing water absorbent polyacrylic acid (salt) resin powder, a continuous production device for carrying out a polymerization step, a gel grinding step, a drying step, a grinding step, a classifying step, a surface crosslinking step, a cooling step, a granulating step, and a transporting step for linking the above individual steps. The continuous production device had a production capacity of approximately 3500 [kg/hr]. The above steps may each include a single system or two or more systems. In the case where the above steps each include two or more systems, the production capacity is shown as the total of the respective production amounts of the individual systems. The present Production Example used this continuous production device to continuously produce water absorbent polyacrylic acid (salt) resin powder.

The present Production Example prepared a monomer aqueous solution (1) containing (i) 193.3 parts by weight of acrylic acid, (ii) 64.4 parts by weight of a 48 wt % sodium hydroxide aqueous solution, (iii) 1.26 parts by weight of polyethyleneglycol diacrylate (average number n=9), (iv) 52 parts by weight of a 0.1 wt % pentasodium ethylenediamine tetra(methylene phosphonate) aqueous solution, and (v) 134 parts by weight of deionized water.

The present Production Example next continuously fed, with use of a constant rate pump, the above monomer aqueous solution (1) with a temperature adjusted to 40° C., and then further continuously fed 97.1 parts by weight of a 48 wt % sodium hydroxide aqueous solution for line mixing. The temperature of the monomer aqueous solution (1) was at this stage raised to 85° C. due to heat of neutralization.

Further, the present Production Example next continuously fed 8.05 parts by weight of a 4 wt % sodium persulfate aqueous solution for line mixing, and then continuously fed the resulting mixture to a continuous polymerization device, equipped with a planar polymerization belt provided with a dam at each end, so that the fed mixture would have a thickness of approximately 7.5 mm. The continuous polymerization device carried out polymerization continuously (polymerization period: 3 minutes) to prepare a hydrogel (1) in the shape of a belt. The belt-shaped hydrogel (1) had CRC of 28.0 [g/g], resin solid content of 53.0 wt %, water soluble content of 4.0 wt %, and weight average molecular weight of the water soluble content of 218,377 [Da].

Comparative Example 1

The present Comparative Example continuously produced water absorbent polyacrylic acid (salt) resin powder subsequently to Production Example 1.

Specifically, the present Comparative Example continuously cut, with a cutting length of approximately 300 mm, the belt-shaped hydrogel (1), prepared in Production Example 1, at equal intervals along the width direction with respect to the direction in which the polymerization belt moved.

The present Comparative Example fed the hydrogel (1) with the cutting length of approximately 300 mm to a screw extruder to grind the gel. The screw extruder was a meat chopper that (i) included, at an end, a porous die having a diameter of 340 mm, a porous diameter of 22 mm, 105 pores, a hole area rate of 52%, and a thickness of 20 mm and that (ii) had a screw shaft with a diameter of 152 mm. The present Comparative Example, in the state where the meat chopper was set so that the number of revolutions of the screw shaft was 96 rpm, fed 132800 [g/min] of the hydrogel (1) simultaneously with 855.8 [g/min] of 70° C. hot water and 3333 [g/min] of water vapor. The present Comparative Example, at this stage, had gel grinding energy (GGE) of 17.9 [J/g] and gel grinding energy (2) (GGE (2)) of 8.7 [J/g]. The meat chopper had a current value of 89.6 A during the gel grinding. The hydrogel (1) had a temperature of 90° C. before the gel grinding, whereas after the gel grinding, a comparative ground gel, that is, a comparative particulate hydrogel (1), had a temperature raised to 110° C.

The comparative particulate hydrogel (1) prepared through the above gel grinding step had CRC of 28.2 [g/g], resin solid content of 49.4 wt %, water soluble content of 4.3 wt %, weight average molecular weight of the water soluble content of 225,674 [Da], a weight average particle diameter (D50) of 1041 μm, and logarithmic standard deviation (σζ) of particle size distribution of 1.74. Table 1 shows the conditions applied to the gel grinding step. Table 2 shows physical properties of the comparative particulate hydrogel (1).

The present Comparative Example next distributed (at this stage, the comparative particulate hydrogel (1) had a temperature of 80° C.) the comparative particulate hydrogel (1) on a through-flow belt within 1 minute from the end of the gel grinding to dry the comparative particulate hydrogel (1) at 185° C. for 30 minutes. This prepared 246 parts by weight of a comparative dried polymer (1) (that is, the total amount of output during the drying step). The through-flow belt had a moving rate of 1 [m/min]. The hot air had an average wind velocity of 1.0 [m/s] with respect to the direction perpendicular to the direction in which the through-flow belt moved. The present Comparative Example measured the wind velocity of the hot air with use of constant-temperature thermal anemometer Anemomaster 6162 produced by KANOMAX JAPAN incorporated.

The present Comparative Example next continuously fed all the comparative dried polymer (1), prepared through the drying step and having a temperature of approximately 60° C., to a three-stage roll mill to grind it (that is, a grinding step), and then classified the ground comparative dried polymer (1) with use of JIS standard sieves having respective mesh sizes of 710 μm and 175 μm. This prepared comparative water absorbent resin particles (1) each having an irregularly broken shape. The comparative water absorbent resin particles (1) had a weight average particle diameter (D50) of 350 μm, logarithmic standard deviation (σζ) of particle size distribution of 0.33, CRC of 31.6 [g/g], and water soluble content of 6.8 wt %, and included 150 μm passing particles (that is, the proportion of particles that would pass through a sieve having a mesh size of 150 μm) at 0.6 wt %.

The present Comparative Example next (i) uniformly mixed, with 100 parts by weight of the comparative water absorbent resin particles (1), a (covalent bonding) surface crosslinking agent solution containing 0.3 parts by weight of 1,4-butandiol, 0.6 parts by weight of propylene glycol, and 3.0 parts by weight of deionized water, and (ii) heat-treated the resulting mixture at 208° C. for approximately 40 minutes so that the resulting comparative water absorbent resin powder (1) would have CRC ranging from 26.6 [g/g] to 27.4 [g/g]. The present Comparative Example then cooled the resulting comparative water absorbent resin powder (1) and uniformly mixed with it a (ionic bonding) surface crosslinking agent solution containing 1.17 parts by weight of a 27.5 wt % aluminum sulfate aqueous solution (8 wt % based on aluminum oxide), 0.196 parts by weight of a 60 wt % sodium lactate aqueous solution, and 0.029 parts by weight of propylene glycol.

The present Comparative Example next crushed the resulting mixture (that is, the granulating step) until it would pass through a JIS standard sieve having a mesh size of 710

μm. This prepared comparative water absorbent resin powder (1). Table 3 shows physical properties of the comparative water absorbent resin powder (1).

Example 1

The present Example carried out, with respect to the belt-shaped hydrogel (1) prepared in Production Example 1, an operation identical to that of Comparative Example 1 except that the gel was ground under the conditions that (i) the cutting length was 200 mm, (ii) no hot water or water vapor was fed, and (iii) the number of revolutions of the screw shaft of the meat chopper for the gel grinding was changed to 115 rpm. This operation prepared (i) ground gel, that is, particulate hydrogel (1), (ii) water absorbent resin particles (1), and (iii) water absorbent resin powder (1). Example 1 had gel grinding energy (GGE) of 27.8 [J/g] and gel grinding energy (2) (GGE (2)) of 15.5 [J/g]. The meat chopper had a current value of 104.7 A during the gel grinding. The hydrogel (1) had a temperature of 90° C. before the gel grinding, whereas after the gel grinding, the particulate hydrogel (1) had a temperature lowered to 85° C. The particulate hydrogel (1) had a temperature of 75° C. when it was introduced to a drier.

The particulate hydrogel (1) prepared as above had CRC of 28.3 [g/g], resin solid content of 50.8 wt %, water soluble content of 4.4 wt %, weight average molecular weight of the water soluble content of 253,596 [Da], a weight average particle diameter (D50) of 750 μm, and logarithmic standard deviation (σζ) of particle size distribution of 0.79. Table 1 shows the conditions applied to the gel grinding step. Table 2 shows physical properties of the particulate hydrogel (1).

The water absorbent resin particles (1) had a weight average particle diameter (D50) of 340 μm, logarithmic standard deviation (σζ) of particle size distribution of 0.32, CRC of 32.0 [g/g], and water soluble content of 6.9 wt %, and included 150 μm passing particles (that is, the proportion of particles that would pass through a sieve having a mesh size of 150 μm) at 0.7 wt %. Table 3 shows physical properties of the water absorbent resin powder (1).

Example 2

The present Example carried out, with respect to the belt-shaped hydrogel (1) prepared in Production Example 1, an operation identical to that of Comparative Example 1 except that the gel was ground under the conditions that (i) the cutting length was 200 mm, (ii) no hot water or water vapor was fed, and (iii) the number of revolutions of the screw shaft of the meat chopper was changed to 134 rpm. This operation prepared (i) particulate hydrogel (2), (ii) water absorbent resin particles (2), and (iii) water absorbent resin powder (2). Example 2 had gel grinding energy (GGE) of 28.2 [J/g] and gel grinding energy (2) (GGE (2)) of 15.8 [J/g]. The meat chopper had a current value of 105.6 A during the gel grinding. The hydrogel (2) had a temperature of 90° C. before the gel grinding, whereas after the gel grinding, the particulate hydrogel (2) had a temperature lowered to 86° C. The particulate hydrogel (2) had a temperature of 76° C. when it was introduced to a drier.

The particulate hydrogel (2) prepared as above had CRC of 28.3 [g/g], resin solid content of 51.8 wt %, water soluble content of 4.4 wt %, weight average molecular weight of the water soluble content of 258,606 [Da], a weight average particle diameter (D50) of 676 μm, and logarithmic standard deviation (σζ) of particle size distribution of 0.87. Table 1 shows the conditions applied to the gel grinding step. Table 2 shows physical properties of the particulate hydrogel (2).

The water absorbent resin particles (2) had a weight average particle diameter (D50) of 331 μm, logarithmic standard deviation (σζ) of particle size distribution of 0.32, CRC of 31.9 [g/g], and water soluble content of 6.9 wt %, and included 150 μm passing particles (that is, the proportion of particles that would pass through a sieve having a mesh size of 150 μm) at 0.6 wt %. Table 3 shows physical properties of the water absorbent resin powder (2).

Example 3

The present Example carried out, with respect to the belt-shaped hydrogel (1) prepared in Production Example 1, an operation identical to that of Comparative Example 1 except that the gel was ground under the conditions that (i) the cutting length was 200 mm, (ii) no hot water or water vapor was fed, and (iii) the number of revolutions of the screw shaft of the meat chopper was changed to 153 rpm. This operation prepared (i) particulate hydrogel (3), (ii) water absorbent resin particles (3), and (iii) water absorbent resin powder (3). Example 3 had gel grinding energy (GGE) of 31.9 [J/g] and gel grinding energy (2) (GGE (2)) of 19.2 [J/g]. The meat chopper had a current value of 115.8 A during the gel grinding. The hydrogel (1) had a temperature of 90° C. before the gel grinding, whereas after the gel grinding, the particulate hydrogel (3) had a temperature lowered to 87° C. The particulate hydrogel (3) had a temperature of 77° C. when it was introduced to a drier.

The particulate hydrogel (3) prepared as above had CRC of 28.3 [g/g], resin solid content of 51.2 wt %, water soluble content of 4.7 wt %, weight average molecular weight of the water soluble content of 267,785 [Da], a weight average particle diameter (D50) of 705 μm, and logarithmic standard deviation (σζ) of particle size distribution of 0.85. Table 1 shows the conditions applied to the gel grinding step. Table 2 shows physical properties of the particulate hydrogel (3).

The water absorbent resin particles (3) had a weight average particle diameter (D50) of 356 μm, logarithmic standard deviation (σζ) of particle size distribution of 0.34, CRC of 31.5 [g/g], and water soluble content of 6.4 wt %, and included 150 μm passing particles (that is, the proportion of particles that would pass through a sieve having a mesh size of 150 μm) at 0.6 wt %. Table 3 shows physical properties of the water absorbent resin powder (3).

Example 4

The present Example carried out, with respect to the belt-shaped hydrogel (1) prepared in Production Example 1, an operation identical to that of Comparative Example 1 except that the gel was ground under the condition that no hot water or water vapor was fed. This operation prepared (i) particulate hydrogel (4), (ii) water absorbent resin particles (4), and (iii) water absorbent resin powder (4). Example 4 had gel grinding energy (GGE) of 23.5 [J/g] and gel grinding energy (2) (GGE (2)) of 13.2 [J/g]. The meat chopper had a current value of 106.0 A during the gel grinding. The hydrogel (1) had a temperature of 90° C. before the gel grinding, whereas after the gel grinding, the particulate hydrogel (4) had a temperature lowered to 87° C. The particulate hydrogel (4) had a temperature of 77° C. when it was introduced to a drier.

The particulate hydrogel (4) prepared as above had CRC of 28.3 [g/g], resin solid content of 52.2 wt %, water soluble content of 4.7 wt %, weight average molecular weight of the water soluble content of 263,313 [Da], a weight average particle diameter (D50) of 892 μm, and logarithmic standard deviation (σζ) of particle size distribution of 0.98. Table 1 shows the conditions applied to the gel grinding step. Table 2 shows physical properties of the particulate hydrogel (4).

The water absorbent resin particles (4) had a weight average particle diameter (D50) of 351 μm, logarithmic standard deviation (σζ) of particle size distribution of 0.33, CRC of 31.6 [g/g], and water soluble content of 6.4 wt %, and included 150 μm passing particles (that is, the proportion of particles that would pass through a sieve having a mesh size of 150 μm) at 0.5 wt %. Table 3 shows physical properties of the water absorbent resin powder (4).

Example 5

The present Example fed the comparative particulate hydrogel (1), prepared in Comparative Example 1, to another screw extruder for another gel grinding operation. The screw extruder was a meat chopper that (i) included, at an end, a porous die having a diameter of 68 mm, a porous diameter of 11 mm, and a thickness of 8 mm and that (ii) had a screw shaft with a diameter of 21.0 mm. The present Example, in the state where the meat chopper was set so that the number of revolutions of the screw shaft was 96 rpm, fed the comparative particulate hydrogel (1) at 360 [g/min] to prepare particulate hydrogel (5). Example 5 fed no hot water or water vapor during the another gel grinding operation. The comparative particulate hydrogel (1) had a temperature of 105° C. before the another gel grinding operation, whereas after the another gel grinding operation, the particulate hydrogel (5) had a temperature lowered to 95° C. The particulate hydrogel (5) had a temperature of 85° C. when it was introduced to a drier. Example 5 had gel grinding energy (GGE) of 34.3 [J/g] and gel grinding energy (2) (GGE (2)) of 18.3 [J/g].

The particulate hydrogel (5) prepared through the another gel grinding operation had CRC of 28.5 [g/g], resin solid content of 49.1 wt %, water soluble content of 4.4 wt %, weight average molecular weight of the water soluble content of 269,885 [Da], a weight average particle diameter (D50) of 772 μm, and logarithmic standard deviation (σζ) of particle size distribution of 0.91. Table 1 shows the conditions applied to the gel grinding step. Table 2 shows physical properties of the particulate hydrogel (5).

The present Example next carried out, with respect to the particulate hydrogel (5) prepared as above, an operation (including such steps as drying, grinding, classifying, and surface crosslinking) similar to that of Comparative Example 1 to prepare water absorbent resin particles (5) and water absorbent resin powder (5).

The water absorbent resin particles (5) prepared through the above operation had a weight average particle diameter (D50) of 360 μm, logarithmic standard deviation (σζ) of particle size distribution of 0.33, CRC of 31.7 [g/g], and water soluble content of 7.3 wt %, and included 150 μm passing particles (that is, the proportion of particles that would pass through a sieve having a mesh size of 150 μm) at 0.6 wt %. Table 3 shows physical properties of the water absorbent resin powder (5).

Example 6

The present Example fed the comparative particulate hydrogel (1), prepared in Comparative Example 1, to another screw extruder for another gel grinding operation. The screw extruder was a meat chopper that (i) included, at an end, a porous die having a diameter of 68 mm, a porous diameter of 7.5 mm, and a thickness of 8 mm and that (ii) had a screw shaft with a diameter of 21.0 mm. The present Example, in the state where the meat chopper was set so that the number of revolutions of the screw shaft was 172 rpm, fed the comparative particulate hydrogel (1) at 360 [g/min] to prepare particulate hydrogel (6). Example 6 fed no hot water or water vapor during the another gel grinding operation. The comparative particulate hydrogel (6) had a temperature of 105° C. before the another gel grinding operation, whereas after the another gel grinding operation, the particulate hydrogel (6) had a temperature lowered to 96° C. The particulate hydrogel (6) had a temperature of 86° C. when it was introduced to a drier. Example 6 had gel grinding energy (GGE) of 39.8 [J/g] and gel grinding energy (2) (GGE (2)) of 23.8 [J/g].

The particulate hydrogel (6) prepared through the another gel grinding operation had CRC of 29.1 [g/g], resin solid content of 49.8 wt %, water soluble content of 5.4 wt %, weight average molecular weight of the water soluble content of 326,424 [Da], a weight average particle diameter (D50) of 367 μm, and logarithmic standard deviation (σζ) of particle size distribution of 0.71. Table 1 shows the conditions applied to the gel grinding step. Table 2 shows physical properties of the particulate hydrogel (6).

The present Example next carried out, with respect to the particulate hydrogel (6) prepared as above, an operation (including such steps as drying, grinding, classifying, and surface crosslinking) similar to that of Comparative Example 1 to prepare water absorbent resin particles (6) and water absorbent resin powder (6).

The water absorbent resin particles (6) prepared through the above operation had a weight average particle diameter (D50) of 390 μm, logarithmic standard deviation (σζ) of particle size distribution of 0.36, CRC of 32.5 [g/g], and water soluble content of 8.6 wt %, and included 150 μm passing particles (that is, the proportion of particles that would pass through a sieve having a mesh size of 150 μm) at 0.5 wt %. Table 3 shows physical properties of the water absorbent resin powder (6).

Example 7

The present Example fed the comparative particulate hydrogel (1), prepared in Comparative Example 1, to another screw extruder for another gel grinding operation. The screw extruder was a meat chopper that (i) included, at an end, a porous die having a diameter of 68 mm, a porous diameter of 7.5 mm, and a thickness of 8 mm and that (ii) had a screw shaft with a diameter of 21.0 mm. Example 7 repeated gel grinding while changing the porous diameter from 7.5 mm sequentially to 6.2 mm, 4.7 mm, and 3.2 mm The present Example, in the state where the meat chopper was set so that the number of revolutions of the screw shaft was 172 rpm, fed the comparative particulate hydrogel (1) at 360 [g/min] to prepare particulate hydrogel (7). Example 7 fed no hot water or water vapor during the second and subsequent gel grinding operations. Example 7 had gel grinding energy (GGE) of 72.5 [J/g] and gel grinding energy (2) (GGE (2)) of 36.1 [J/g].

The particulate hydrogel (7) prepared through the another gel grinding operation had CRC of 29.5 [g/g], resin solid content of 50.3 wt %, water soluble content of 6.3 wt %, weight average molecular weight of the water soluble content of 553,670 [Da], a weight average particle diameter (D50) of 1990 μm, and logarithmic standard deviation (σζ) of particle size distribution of 0.94. Table 1 shows the conditions applied to the gel grinding step. Table 2 shows physical properties of the particulate hydrogel (7).

The present Example next carried out, with respect to the particulate hydrogel (7) prepared as above, an operation (including such steps as drying, grinding, classifying, and surface crosslinking) similar to that of Comparative Example 1 to prepare water absorbent resin particles (7) and water absorbent resin powder (7).

The water absorbent resin particles (7) prepared through the above operation had a weight average particle diameter (D50) of 336 μm, logarithmic standard deviation (σζ) of particle size distribution of 0.34, CRC of 32.2 [g/g], and water soluble content of 10.7 wt %, and included 150 μm passing particles (that is, the proportion of particles that would pass through a sieve having a mesh size of 150 μm) at 0.7 wt %. Table 3 shows physical properties of the water absorbent resin powder (7).

Production Example 2

The present Production Example carried out an operation identical to that of Production Example 1 except that a composition of a monomer aqueous solution was changed as below. Namely, the present Production Example prepared a belt-shaped hydrogel (2) by carrying out an operation identical to that of Production Example 1 except that the present Production Example prepared a monomer aqueous solution (2) containing (i) 193.3 parts by weight of acrylic acid, (ii) 163.03 parts by weight of a 48 wt % sodium hydroxide aqueous solution, (iii) 0.659 parts by weight of polyethyleneglycol diacrylate (average number n=9), (iv) 52 parts by weight of a 0.1 wt % pentasodium ethylenediaminetetra (methylenephosphonate) aqueous solution, and (v) 134 parts by weight of deionized water. The belt-shaped hydrogel (2) had CRC of 33.2 [g/g], resin solid content of 53.0 wt %, water soluble content of 8.0 wt %, and weight average molecular weight of the water soluble content of 468,684 [Da].

Comparative Example 2

The present Comparative Example prepared a comparative particulate hydrogel (2') by carrying out, with respect to the belt-shaped hydrogel (2), gel grinding identical to that of Comparative Example 1. Thereafter, the present Comparative Example fed the comparative particulate hydrogel (2') to another screw extruder to carry out another gel grinding with respect to the comparative particulate hydrogel (2'). The another screw extruder was a meat chopper that (i) included, at an end, a porous die having a diameter of 68 mm, a porous diameter of 3.2 mm, and a thickness of 8 mm that (ii) had a screw shaft with a diameter of 20.8 mm. The present Comparative Example, in the state where the meat chopper was set so that the number of revolutions of the screw shaft was 172 rpm, fed 500 [g/min] of the comparative particulate hydrogel (2') to prepare comparative particulate hydrogel (2). Note that the present Comparative Example fed neither water vapor nor hot water during the another gel grinding. The present Comparative Example had gel grinding energy (GGE) of 66.2 [J/g] and gel grinding energy (2) (GGE (2)) of 50.2 [J/g].

The comparative particulate hydrogel (2) prepared through the another gel grinding had CRC of 35.1 [g/g], resin solid content of 52.8 wt %, water soluble content of 15.2 wt %, and weight average molecular weight of the water soluble content of 1,091,000 [Da], a weight average particle diameter (D50) of 484 μm, and logarithmic standard deviation (σζ) of particle size distribution of 1.25. Table 1 shows the conditions applied to the gel grinding step. Table 2 shows physical properties of the comparative particulate hydrogel (2).

The present Comparative Example next carried out, with respect to the comparative particulate hydrogel (2) prepared as above, an operation (including such steps as drying, grinding, classifying, and surface crosslinking) similar to that of Comparative Example 1 to prepare comparative water absorbent resin particles (2) and comparative water absorbent resin powder (2).

The comparative water absorbent resin particles (2) prepared through the above operation had a weight average particle diameter (D50) of 392 μm, logarithmic standard deviation (σζ) of particle size distribution of 0.36, CRC of 38.3 [g/g], water soluble content of 19.7 wt %, and included 150 μm passing particles (that is, the proportion of particles that would pass through a sieve having a mesh size of 150 μm) at 0.6 wt %. Note that Table 3 shows physical properties of the comparative water absorbent resin powder (2).

Production Example 3

The present Production Example produced water absorbent resin powder in conformity with Example 1, Example 2, and Comparative Example 1 of Japanese Patent Application Publication, Tokukai, No. 2004-339502 A. Namely, the present Production Example fed, to a dispersing machine, 5.83 [g/s] of a 48.5 wt % sodium hydroxide aqueous solution, 7.24 [g/s] of acrylic acid, 0.0287 [g/s] of a 30 wt % polyethyleneglycol diacrylate aqueous solution (average molecular weight: 487) as an internal crosslinking agent, 3.32 [g/s] of deionized water, and 0.0893 [g/s] of an aqueous solution (A) (a solution prepared by dissolving, in 97.4 parts by weight of a 20 wt % acrylic acid aqueous solution, 0.989 parts by weight of 1-hydroxy-cyclohexyl-phenylketone and 1.08 parts by weight of a 45 wt % pentasodium diethylenetriamine pentaacetic acid aqueous solution), so as to prepare a monomer aqueous solution (3). Note that the acrylic acid, the deionized water, the internal crosslinking agent, and the aqueous solution (A) were uniformed by a stirring machine and then fed to the dispersing machine. The monomer aqueous solution (3) prepared as above was stable at a temperature of approximately 95° C.

Next, the present Production Example stirred the monomer aqueous solution (3) by use of a static mixer in which an element was provided, the element having been obtained by adding, to a pipe having a pipe diameter of 6 mm, a 1.5-fold twist having a length of 18.6 mm and a diameter of 6 mm. Then, the present Production Example added a 2 wt % sodium persulfate aqueous solution as a polymerization initiator approximately 3 cm downstream from an end part of the element at a flow rate of 0.151 [g/s]. Thereafter, the present Production Example carried out polymerization by continuously feeding the resulting solution to a belt polymerization device provided with an endless belt (i) having a length of 3.8 m and a width of 60 cm and (ii) coated with fluorine. This prepared a belt-shaped hydrogel (3). Note that according to the belt polymerization device, a UV lamp was provided in an upper part of the belt, a bottom surface and a vicinity of the belt polymerization device were heated to approximately 100° C. and warmed, and a suction pipe for collecting evaporated water was further provided at a central part of the polymerization device. Note also that after the addition of the polymerization initiator, a pipe line had a length of 30 cm to an inlet of the polymerization device. The belt-shaped hydrogel (3) prepared as above had CRC of 32.5

[g/g], resin solid content of 58.0 wt %, water soluble content of 5.2 wt %, and weight average molecular weight of the water soluble content of 551,353 [Da].

Comparative Example 3

The present Comparative Example continuously produced water absorbent polyacrylic acid (salt) resin powder subsequently to Production Example 3.

Specifically, the present Comparative Example continuously fed, to a screw extruder, the belt-shaped hydrogel (3) prepared in Production Example 3 and having a temperature of approximately 50° C., and simultaneously ground the belt-shaped hydrogel (3) while injecting water vapor into the screw extruder via a water feed opening. The screw extruder used in the present Comparative Example was a screw extruder obtained by providing a meat chopper illustrated in FIG. 1 of Japanese Patent Application Publication, Tokukai, No. 2000-63527 A with a water feeding opening. When discharged from the meat chopper, comparative particulate hydrogel (3) prepared through the gel grinding operation generated steam and was free-flowing with a high flowability. Note that the hydrogel (3) which had not been subjected to gel grinding had a temperature of approximately 50° C. and the comparative particulate hydrogel (3) which had been subjected to gel grinding had a higher temperature of 55° C. Further, the comparative particulate hydrogel (3) had a temperature of 45° C. while being introduced into a drier. Comparative Example 3 had gel grinding energy (GGE) of 15.3 [J/g] and gel grinding energy (2) (GGE (2)) of 7.2 [J/g].

The comparative particulate hydrogel (3) had CRC of 32.4 [g/g], resin solid content of 56.5 wt %, water soluble content of 5.5 wt %, and weight average molecular weight of the water soluble content of 555,210 [Da], a weight average particle diameter (D50) of 2125 μm, and logarithmic standard deviation (σζ) of particle size distribution of 2.22. Table 1 shows the conditions applied to the gel grinding step. Table 2 shows physical properties of the comparative particulate hydrogel (3).

The present Comparative Example next dried the comparative particulate hydrogel (3) with a hot-air drier at 180° C. for 35 minutes. Then, the present Comparative Example ground the comparative particulate hydrogel (3) (carried out the grinding step) by use of a roll mill. Thereafter, the present Comparative Example further classified the ground comparative particulate hydrogel (3). This prepared comparative water absorbent resin particles (3) each having an irregularly broken shape. The hot air from the hot-air drier had an average wind velocity of 1.0 [m/s] in a direction perpendicular to a plane on which the particulate hydrogel was placed. Note that the present Comparative Example measured the wind velocity of the hot air with use of constant-temperature thermal anemometer Anemomaster 6162 produced by KANOMAX JAPAN incorporated. The comparative water absorbent resin particles (3) had a weight average particle diameter (D50) of 351 μm, logarithmic standard deviation (σζ) of particle size distribution of 0.34, CRC of 37.0 [g/g], and water soluble content of 12.0 wt %, and included 150 μm passing particles (that is, the proportion of particles that would pass through a sieve having a mesh size 150 μm) at 3.1 wt %.

The present Comparative Example next (i) uniformly mixed, with 100 parts by weight of the comparative water absorbent resin particles (3), a (covalent bonding) surface crosslinking agent solution containing 0.3 parts by weight of 1,4-butanediol, 0.6 parts by weight of propylene glycol, and 3.0 parts by weight of deionized water, and (ii) heat-treated the resulting mixture at 208° C. for approximately 40 minutes so that the resulting comparative water absorbent resin powder (3) would have CRC ranging from 26.6 [g/g] to 27.4 [g/g]. The present Comparative Example then cooled the resulting comparative water absorbent resin powder (3) and uniformly mixed with it a (ionic bonding) surface crosslinking agent solution containing 1.17 parts by weight of a 27.5 wt % aluminum sulfate aqueous solution (8 wt % based on aluminum oxide), 0.196 parts by weight of a 60 wt % sodium lactate aqueous solution, and 0.029 parts by weight of propylene glycol.

The present Comparative Example next crushed the resulting mixture (that is, the granulating step) until it would pass through a JIS standard sieve having a mesh size of 710 μm. This prepared comparative water absorbent resin powder (3). Table 3 shows physical properties of the comparative water absorbent resin powder (3).

Comparative Example 4

The present Comparative Example carried out, with respect to the belt-shaped hydrogel (3) prepared in Production Example 3, an operation identical to that of Comparative Example 3 except that water vapor was replaced with hot water having a temperature of 80° C. This operation prepared comparative particulate hydrogel (4), comparative water absorbent resin particles (4), and comparative water absorbent resin powder (4). Note that the hydrogel (3) which had not been subjected to gel grinding had a temperature of approximately 50° C. and the comparative particulate hydrogel (4) which had been subjected to gel grinding had a higher temperature of 52° C. Further, the comparative particulate hydrogel (4) had a temperature of 42° C. while being introduced into a drier. Comparative Example 4 had gel grinding energy (GGE) of 16.4 [J/g] and gel grinding energy (2) (GGE (2)) of 8.4 [J/g].

The comparative particulate hydrogel (4) prepared as above had CRC of 32.5 [g/g], resin solid content of 55.0 wt %, water soluble content of 5.5 wt %, and weight average molecular weight of the water soluble content of 556,205 [Da], weight average particle diameter (D50) of 2304 μm, and logarithmic standard deviation (σζ) of particle size distribution of 2.39. Table 1 shows the conditions applied to the gel grinding step. Table 2 shows physical properties of the comparative particulate hydrogel (4).

The comparative water absorbent resin particles (4) had a weight average particle diameter (D50) of 350 μm, logarithmic standard deviation (σζ) of particle size distribution of 0.34, CRC of 37.0 [g/g], and water soluble content of 12.0 wt %, and included 150 μm passing particles (that is, the proportion of particles that would pass through a sieve having a mesh size 150 μm) at 2.7 wt %. Note that Table 3 shows physical properties of the comparative water absorbent resin powder (4).

Comparative Example 5

The present Comparative Example carried out, with respect to the belt-shaped hydrogel (3) prepared in Production Example 3, an operation identical to that of Comparative Example 3 except that the present Comparative Example carried out gel grinding without injecting anything into the screw extruder via the water feeding opening. This operation prepared comparative particulate hydrogel (5), comparative water absorbent resin particles (5), and comparative water absorbent resin powder (5). Note that the comparative particulate hydrogel (5) discharged from the meat chopper was not completely in a line. Note also that the hydrogel (3) which had not been subjected to gel grinding had a temperature of approximately 50° C. and the comparative particulate hydrogel (5) which had been subjected to gel grinding had a lower temperature of 45° C. Further, the comparative particulate hydrogel (5) had a temperature of 40° C. while being introduced into a drier. Comparative Example 5 had gel grinding energy (GGE) of 62.3 [J/g] and gel grinding energy (2) (GGE (2)) of 54.1 [J/g].

The comparative particulate hydrogel (5) prepared as above had CRC of 33.1 [g/g], resin solid content of 58.0 wt %, water soluble content of 13.1 wt %, and weight average molecular weight of the water soluble content of 1,087,542 [Da], a weight average particle diameter (D50) of 1690 μm, and logarithmic standard deviation (σζ) of particle size distribution of 1.53. Table 1 shows the conditions applied to the gel grinding step. Table 2 shows physical properties of the comparative particulate hydrogel (5).

The comparative water absorbent resin particles (5) had a weight average particle diameter (D50) of 347 μm, logarithmic standard deviation (σζ) of particle size distribution of 0.34, CRC of 36.0 [g/g], and water soluble content of 21.0 wt %, and included 150 μm passing particles (that is, the proportion of particles that would pass through a sieve having a mesh size 150 μm) at 3.5 wt %. Note that Table 3 shows physical properties of the comparative water absorbent resin powder (5).

Comparative Example 6

The present Comparative Example 6 selected, from the comparative particulate hydrogel (1) prepared in Comparative Example 1, the comparative particulate hydrogel (1) having a particle diameter of approximately 2 mm, and regarded the selected comparative particulate hydrogel (1) as comparative particulate hydrogel (6). Note that the comparative particulate hydrogel (6) had a temperature of 80° C. while being introduced into a drier.

The comparative particulate hydrogel (6) had CRC of 28.0 [g/g], resin solid content of 49.2 wt %, water soluble content of 4.3 wt %, and weight average molecular weight of the water soluble content of 220,518 [Da], a weight average particle diameter (D50) of 2046 μm, and logarithmic standard deviation (σζ) of particle size distribution of 0.91. Table 1 shows the conditions applied to the gel grinding step. Table 2 shows physical properties of the comparative particulate hydrogel (6).

The present Comparative Example next carried out, with respect to the comparative particulate hydrogel (6), an operation (including such steps as drying, grinding, and classifying) similar to that of Comparative Example 1 to prepare comparative water absorbent resin particles (6) each having an irregularly broken shape. The comparative water absorbent resin particles (6) had a weight average particle diameter (D50) of 398 μm, logarithmic standard deviation (σζ) of particle size distribution of 0.36, CRC of 32.5 [g/g], and water soluble content of 6.8 wt %, and included 150 μm passing particles (that is, the proportion of particles that would pass through a sieve having a mesh size of 150 μm) at 0.6 wt %.

The present Comparative Example next (i) uniformly mixed, with 100 parts by weight of the comparative water absorbent resin particles (6), a (covalent bonding) surface crosslinking agent solution containing 0.3 parts by weight of 1,4-butandiol, 0.6 parts by weight of propylene glycol, and 3.0 parts by weight of deionized water, and (ii) heat-treated the resulting mixture at 208° C. for approximately 40 minutes so that the resulting comparative water absorbent resin powder (6) would have CRC ranging from 26.6 [g/g] to 27.4 [g/g]. The present Comparative Example then cooled the resulting comparative water absorbent resin powder (6) and uniformly mixed with it a (ionic bonding) surface crosslinking agent solution containing 1.17 parts by weight of a 27.5 wt % aluminum sulfate aqueous solution (8 wt % based on aluminum oxide), 0.196 parts by weight of a 60 wt % sodium lactate aqueous solution, and 0.029 parts by weight of propylene glycol.

The present Comparative Example next crushed the resulting mixture (that is, the granulating step) until it would pass through a JIS standard sieve having a mesh size of 710 μm. This prepared comparative water absorbent resin powder (6). Table 3 shows physical properties of the comparative water absorbent resin powder (6).

Example 8

The present Example next distributed (at this stage, the particulate hydrogel (1) had a temperature of 80° C.) the particulate hydrogel (1), prepared in Example 1, on a through-flow belt within 1 minute from the end of the gel grinding to dry the particulate hydrogel (1) at 185° C. for 30 minutes. This prepared a dried polymer (8). The through-flow belt had a moving rate of 1 [m/min]. The hot air had an average wind velocity of 0.5 [m/s] in a direction perpendicular to a direction in which the through-flow belt moved. Note that the present Example measured the wind velocity of the hot air with use of constant-temperature thermal anemometer Anemomaster 6162 produced by KANOMAX JAPAN incorporated.

The present Example next continuously fed the dried polymer (8), prepared through the drying step, to a three-stage roll mill to grind it (that is, the grinding step), and then classified the ground dried polymer (8) with use of JIS standard sieves having respective mesh sizes of 710 μm and 175 μm. This prepared water absorbent resin particles (8) each having an irregularly broken shape. The water absorbent resin particles (8) had a weight average particle diameter (D50) of 350 μm, logarithmic standard deviation (σζ) of particle size distribution of 0.33, CRC of 28.9 [g/g], and water soluble content of 6.4 wt %, and included 150 μm passing particles (that is, the proportion of particles that would pass through a sieve having a mesh size of 150 μm) at 0.7 wt %.

The present Example next carried out, with respect to the water absorbent resin particles (8), a surface crosslinking treatment and granulation identical to those carried out with respect to the comparative water absorbent resin particles (6) of Comparative Example 6. This prepared water absorbent resin powder (8). Table 3 shows physical properties of the water absorbent resin powder (8).

Example 9

The present Example next distributed (at this stage, the particulate hydrogel (1) had a temperature of 80° C.) the particulate hydrogel (1), prepared in Example 1, on a through-flow belt within 1 minute from the end of the gel grinding to dry the particulate hydrogel (1) at 185° C. for 30 minutes. This prepared a dried polymer (9). The through-flow belt had a moving rate of 1 [m/min]. The hot air had an average wind velocity of 3.0 [m/s] in a direction perpendicular to a direction in which the through-flow belt moved. Note that the present Example measured the wind velocity of the hot air with use of constant-temperature thermal anemometer Anemomaster 6162 produced by KANOMAX JAPAN incorporated.

The present Example next continuously fed the dried polymer (9), prepared through the drying step, to a three-stage roll mill to grind it (that is, the grinding step), and then classified the ground dried polymer (9) with use of JIS standard sieves having respective mesh sizes of 710 μm and 175 μm. This prepared water absorbent resin particles (9) each having an irregularly broken shape. The water absorbent resin particles (9) had a weight average particle diameter (D50) of 330 μm, logarithmic standard deviation (σζ) of particle size distribution of 0.35, CRC of 33.8 [g/g], and water soluble content of 7.9 wt %, and included 150 μm passing particles (that is, the proportion of particles that would pass through a sieve having a mesh size of 150 μm) at 1.5 wt %.

The present Example next carried out, with respect to the water absorbent resin particles (9), a surface crosslinking treatment and granulation identical to those carried out with respect to the comparative water absorbent resin particles (6) of Comparative Example 6. This prepared water absorbent resin powder (9). Table 3 shows physical properties of the water absorbent resin powder (9).

Comparative Example 7

The present Comparative Example next distributed (at this stage, the particulate hydrogel (1) had a temperature of 80° C.) the particulate hydrogel (1), prepared in Example 1, on a through-flow belt within 1 minute from the end of the gel grinding to dry the particulate hydrogel (1) at 130° C. for 30 minutes. This prepared a comparative dried polymer (7). The through-flow belt had a moving rate of 1 [m/min]. The hot air had an average wind velocity of 1.0 [m/s] in a direction perpendicular to a direction in which the through-flow belt moved. Note that the present Example measured the wind velocity of the hot air with use of constant-temperature thermal anemometer Anemomaster 6162 produced by KANOMAX JAPAN incorporated.

The present Comparative Example next continuously fed the comparative dried polymer (7), prepared through the drying step, to a three-stage roll mill to grind it (that is, the grinding step), and then classified the ground comparative dried polymer (7) with use of JIS standard sieves having respective mesh sizes of 710 μm and 175 μm. This prepared comparative water absorbent resin particles (7) each having an irregularly broken shape. The comparative water absorbent resin particles (7) had a weight average particle diameter (D50) of 370 μm, logarithmic standard deviation (σζ) of particle size distribution of 0.34, CRC of 27.8 [g/g], and water soluble content of 6.4 wt %, and included 150 μm passing particles (that is, the proportion of particles that would pass through a sieve having a mesh size of 150 μm) at 0.7 wt %.

The present Example next carried out, with respect to the comparative water absorbent resin particles (7), a surface crosslinking treatment and granulation identical to those carried out with respect to the comparative water absorbent resin particles (6) of Comparative Example 6. This prepared comparative water absorbent resin powder (7). Table 3 shows physical properties of the comparative water absorbent resin powder (7).

Comparative Example 8

The present Comparative Example next distributed (at this stage, the particulate hydrogel (1) had a temperature of 80° C.) the particulate hydrogel (1), prepared in Example 1, on a through-flow belt within 1 minute from the end of the gel grinding to dry the particulate hydrogel (1) at 260° C. for 30 minutes. This prepared a comparative dried polymer (8). The through-flow belt had a moving rate of 1 [m/min]. The hot air had an average wind velocity of 1.0 [m/s] in a direction perpendicular to a direction in which the through-flow belt moved. Note that the present Comparative Example measured the wind velocity of the hot air with use of constant-temperature thermal anemometer Anemomaster 6162 produced by KANOMAX JAPAN incorporated.

The present Comparative Example next continuously fed the comparative dried polymer (8), prepared through the drying step, to a three-stage roll mill to grind it (that is, the grinding step), and then classified the ground comparative dried polymer (8) with use of JIS standard sieves having respective mesh sizes of 710 μm and 175 μm. This prepared comparative water absorbent resin particles (8) each having an irregularly broken shape. The comparative water absorbent resin particles (8) had a weight average particle diameter (D50) of 390 μm, logarithmic standard deviation (σζ) of particle size distribution of 0.36, CRC of 32.0 [g/g], and water soluble content of 9.1 wt %, and included 150 μm passing particles (that is, the proportion of particles that would pass through a sieve having a mesh size of 150 μm) at 0.9 wt %.

The present Comparative Example next carried out, with respect to the comparative water absorbent resin particles (8), a surface crosslinking treatment and granulation identical to those carried out with respect to the comparative water absorbent resin particles (6) of Comparative Example 6. This prepared comparative water absorbent resin powder (8). Table 3 shows physical properties of the comparative water absorbent resin powder (8).

Production Example 4

As in the case of Production Example 1, the present Production Example used a continuous production device to continuously produce water absorbent polyacrylic acid (salt) resin powder. Specifically, the present Production Example prepared a monomer aqueous solution (1) containing (i) 193.3 parts by weight of acrylic acid, (ii) 64.4 parts by weight of a 48 wt % sodium hydroxide aqueous solution, (iii) 1.26 parts by weight of polyethyleneglycol diacrylate (average number n=9), (iv) 52 parts by weight of a 0.1 wt % pentasodium ethylenediamine tetra(methylene phosphonate) aqueous solution, and (v) 134 parts by weight of deionized water.

The present Production Example next continuously fed, with use of a constant rate pump, the above monomer aqueous solution (1) with a temperature adjusted to 42° C., and then further continuously fed 97.1 parts by weight of a 48 wt % sodium hydroxide aqueous solution for line mixing. Note that the temperature of the monomer aqueous solution (1) was at this stage raised to 87° C. due to heat of neutralization.

Further, the present Production Example next continuously fed 8.05 parts by weight of a 4 wt % sodium persulfate aqueous solution for line mixing, and then continuously fed the resulting mixture to a continuous polymerization device, equipped with a planar polymerization belt provided with a dam at each end, so that the fed mixture would have a thickness of approximately 7.5 mm. The continuous polymerization device carried out polymerization continuously (polymerization period: 3 minutes) to prepare a belt-shaped hydrogel (4). The belt-shaped hydrogel (4) had CRC of 27.7

[g/g], resin solid content of 53.3 wt %, water soluble content of 3.8 wt %, and weight average molecular weight of the water soluble content of 221,156 [Da].

Comparative Example 9

Subsequently to Production Example 4, the present Comparative Example carried out an operation identical to that of Comparative Example 1, and continuously produced water absorbent polyacrylic acid (salt) resin powder. Table 1 shows the conditions applied to the gel grinding step. Table shows physical properties of comparative particulate hydrogel (9). Table 3 shows physical properties of comparative water absorbent resin powder (9) thus prepared.

Comparative Examples 10 and 11

Comparative Examples 10 and 11 measured physical properties of water absorbent resin powder extracted from commercial disposable diapers described in Comparative Examples 17 and 18 of an unpublished prior application No. PCT/JP2010/073254 (International Application Date: Dec. 24, 2010).

Specifically, Comparative Example 10 measured an internal cell rate, CRC (absorbency without pressure), FSR (a water absorbing rate), and absorption against pressure (AAP) of water absorbent resin extracted from a disposable diaper (produced by Unicharm Corporation: product name: "Mamy Poko (Registered Trademark)" purchased in Indonesia in July, 2010 (referred to as comparative water absorbent resin powder (10)), and Comparative Example 11 measured an internal cell rate, CRC (absorbency without pressure), FSR (a water absorbing rate), and absorption against pressure (AAP) of water absorbent resin extracted from a disposable diaper (produced by dm: product name: "babylove aktiv plus" purchased in Germany in June, 2010 (referred to as comparative water absorbent resin powder (11)). Table 3 shows results of the measurements.

Example 10

The present Example carried out an operation identical to that of Example 3 except that the present Example replaced the (covalent bonding) surface crosslinking agent solution of Example 3 with a solution containing 0.5 parts by weight of ethylene carbonate and 3.0 parts by weight of deionized water. This prepared water absorbent resin powder (10). Table 3 shows physical properties of the water absorbent resin powder (10) thus prepared.

TABLE 1

| | GGE [1/g] | GGE (2) [1/g] | Ext. MW up[1] in gel grinding step [Da] | Gel Ext. up[2] in gel grinding step [wt %] |
|---|---|---|---|---|
| Comp. Ex. 1 | 17.9 | 8.7 | 7,297 | 0.3 |
| Ex. 1 | 27.8 | 15.5 | 35,219 | 0.4 |
| Ex. 2 | 28.2 | 15.8 | 40,229 | 0.4 |
| Ex. 3 | 31.9 | 19.2 | 49,408 | 0.7 |
| Ex. 4 | 23.5 | 13.2 | 44,936 | 0.7 |
| Ex. 5 | 34.3 | 18.3 | 51,508 | 0.4 |
| Ex. 6 | 39.8 | 23.8 | 108,047 | 1.4 |
| Ex. 7 | 72.5 | 36.1 | 335,293 | 2.3 |
| Comp. Ex. 2 | 66.2 | 50.2 | 622,316 | 7.2 |
| Comp. Ex. 3 | 15.3 | 7.2 | 3,857 | 0.3 |
| Comp. Ex. 4 | 16.4 | 8.4 | 4,852 | 0.3 |
| Comp. Ex. 5 | 62.3 | 54.1 | 536,189 | 7.9 |
| Comp. Ex. 6 | — | — | 2,141 | 0.3 |
| Comp. Ex. 9 | 17.2 | 8.1 | 6,503 | 0.2 |

[1]Amount of weight average molecular weight of water soluble content to increase [Da]
[2]Amount of gel Ext (water soluble content) to increase [wt %]

TABLE 2

| | | CRC [g/g] | Resin solid content [wt %] | Water soluble content [wt %] | Ext. MW [Da] | D50 of particulate hydrogel[3] [μm] | σζ of particulate hydrogel[4] |
|---|---|---|---|---|---|---|---|
| Comp. Ex. 1 | Comp. particulate hydrogel (1) | 28.2 | 49.4 | 4.3 | 225,674 | 1041 | 1.74 |
| Ex. 1 | Particulate hydrogel (1) | 28.3 | 50.8 | 4.4 | 253,596 | 750 | 0.79 |
| Ex. 2 | Particulate hydrogel (2) | 28.3 | 51.8 | 4.4 | 258,606 | 676 | 0.87 |
| Ex. 3 | Particulate hydrogel (3) | 28.3 | 51.2 | 4.7 | 267,785 | 705 | 0.85 |
| Ex. 4 | Particulate hydrogel (4) | 28.3 | 52.2 | 4.7 | 263,313 | 892 | 0.98 |
| Ex. 5 | Particulate hydrogel (5) | 28.5 | 49.1 | 4.4 | 269,885 | 772 | 0.91 |
| Ex. 6 | Particulate hydrogel (6) | 29.1 | 49.8 | 5.4 | 326,424 | 367 | 0.71 |
| Ex. 7 | Particulate hydrogel (7) | 29.5 | 50.3 | 6.3 | 553,670 | 1990 | 0.94 |
| Comp. Ex. 2 | Comp. particulate hydrogel (2) | 35.1 | 52.8 | 15.2 | 1,091,000 | 484 | 1.25 |
| Comp. Ex. 3 | Comp. particulate hydrogel (3) | 32.4 | 56.5 | 5.5 | 555,210 | 2125 | 2.22 |
| Comp. Ex. 4 | Comp. particulate hydrogel (4) | 32.5 | 55.0 | 5.5 | 556,205 | 2304 | 2.39 |
| Comp. Ex. 5 | Comp. particulate hydrogel (5) | 33.1 | 58.0 | 13.1 | 1,087,542 | 1690 | 1.53 |
| Comp. Ex. 6 | Comp. particulate hydrogel (6) | 28.0 | 49.2 | 4.3 | 220,518 | 2046 | 0.91 |
| Comp. Ex. 9 | Comp. particulate hydrogel (9) | 27.9 | 50.1 | 4.0 | 227,659 | 1080 | 1.81 |

[3]Weight average particle diameter of particulate hydrogel [μm]
[4]Logarithmic standard deviation of particle size distribution of particulate hydrogel

TABLE 3

|  |  | CRC [g/g] | AAP [g/g] | SFC [5)] | FSR [g/g/s] | Internal Cell Rate [%] |
|---|---|---|---|---|---|---|
| Comp. Ex. 1 | Comp. particulate resin powder (1) | 27.4 | 23.1 | 69 | 0.29 | 2.4 |
| Ex. 1 | Particulate resin powder (1) | 27.1 | 23.5 | 90 | 0.36 | 1.8 |
| Ex. 2 | Particulate resin powder (2) | 27.0 | 23.8 | 99 | 0.37 | 1.1 |
| Ex. 3 | Particulate resin powder (3) | 26.7 | 24.1 | 116 | 0.38 | 0.8 |
| Ex. 4 | Particulate resin powder (4) | 27.0 | 23.3 | 80 | 0.32 | 2.3 |
| Ex. 5 | Particulate resin powder (5) | 26.8 | — | 98 | 0.35 | — |
| Ex. 6 | Particulate resin powder (6) | 27.0 | — | 100 | 0.38 | — |
| Ex. 7 | Particulate resin powder (7) | 27.3 | — | 100 | 0.38 | — |
| Comp. Ex. 2 | Comp. particulate resin powder (2) | 27.1 | — | 30 | 0.29 | — |
| Comp. Ex. 3 | Comp. particulate resin powder (3) | 27.0 | — | 47 | 0.23 | — |
| Comp. Ex. 4 | Comp. particulate resin powder (4) | 27.1 | — | 49 | 0.22 | — |
| Comp. Ex. 5 | Comp. particulate resin powder (5) | 27.0 | — | 40 | 0.25 | — |
| Comp. Ex. 6 | Comp. particulate resin powder (6) | 27.0 | 22.9 | 67 | 0.27 | 1.8 |
| Ex. 8 | Particulate resin powder (8) | 27.1 | 19.1 | 56 | 0.33 | 1.5 |
| Ex. 9 | Particulate resin powder (9) | 27.1 | — | 60 | 0.40 | — |
| Comp. Ex. 7 | Comp. particulate resin powder (7) | 27.0 | — | 51 | 0.32 | — |
| Comp. Ex. 8 | Comp. particulate resin powder (8) | 26.9 | — | 65 | 0.21 | — |
| Comp. Ex. 9 | Comp. particulate resin powder (9) | 27.4 | 22.8 | 69 | 0.31 | 2.6 |
| Comp. Ex. 10 | Comp. particulate resin powder (10) | 35.0 | 11.1 | 0 | 0.48 | 1.2 |
| Comp. Ex. 11 | Comp. particulate resin powder (11) | 31.8 | 22.0 | 11 | 0.24 | 0.6 |
| Ex. 10 | Particulate resin powder (10) | 26.9 | 24.0 | 110 | 0.38 | 0.8 |

5) [$\times 10^{-7} \cdot cm^3 \cdot s \cdot g^{-1}$]

Note that the prepared water absorbent resin powder was particulate (of fine particles) as in the case of the absorbent resin particles which had not been subjected to surface crosslinking, and a particle size of the prepared water absorbent resin powder which had been subjected to surface crosslinking was also substantially identical to or slightly greater than that of the absorbent resin particles which had not been subjected to surface crosslinking (not shown in the Tables).

CONCLUSION

As shown in Examples and Comparative Examples (described earlier), and Tables 1 through 3, water absorbent resin powder in which a water absorbing rate (FSR) and permeability potential (SFC) are both attained can be produced by at least one of the gel grindings (1) through (4) of the present invention, i.e., (i) by carrying out gel grinding with respect to hydrogel with gel grinding energy (GGE) of 18 [J/g] to 60 [J/g] or with gel grinding energy (2) (GGE (2)) of 9 [J/g] to 40 [J/g], and thereafter drying the hydrogel and carrying out a surface treatment with respect to the hydrogel thus dried, (ii) by increasing weight average molecular weight of water soluble content of hydrogel by 10,000 [Da] to 500,000 [Da], and thereafter drying the hydrogel and carrying out a surface treatment with respect to the hydrogel thus dried, or (iii) carrying out gel grinding with respect to hydrogel so that particulate hydrogel has a weight average particle diameter (D50) of 350 μm to 2000 μm, logarithmic standard deviation (σζ) of particle size distribution of 0.2 to 1.0, and resin solid content of 10 wt % to 80 wt % and thereafter, under a specific condition, drying the particulate hydrogel and carrying out a surface treatment with respect to the particulate hydrogel thus dried. Note that it may be preferable to carry out evaluation by use of gel grinding energy (2) (GGE (2)) since gel grinding which is carried out a plurality of times in the gel grinding step (e.g., the case of Example 7) increases idling energy.

As described earlier, according to the production method in accordance with the present invention, permeability potential (SFC/more preferable in case of water absorbent resin having a smaller surface area) and a water absorbing rate (FSR/more preferable in case of water absorbent resin having a larger surface area) can be both attained. It has been difficult to attain both the permeability potential and the water absorbing rate, which depend greatly on a surface area of water absorbent resin and conflict with each other. In particular, the production method of the present invention makes it possible to attain both a high water absorbing rate such that FSR is not less than 0.30 [g/g/s] and high permeability potential such that SFC is not less than 70 [$\times 10^{-7} \cdot cm^3 \cdot s \cdot g^{-1}$]. The present invention can be suitably used for a method for producing such water absorbent resin having high SFC and high FSR, which is suitable for, for example, sanitary supplies.

For example, Patent Literatures 1 through 50 described earlier have been known for improvement in, for example, a water absorbing rate and permeability potential of water absorbent resin. In contrast, the present invention found that at least one of the specific gel grindings (1) through (4) allows improvement in water absorbing rate (e.g., FSR) and permeability potential (e.g., SFC) and attainment of both the water absorbing rate and the permeability potential.

INDUSTRIAL APPLICABILITY

Water absorbent resin powder produced by the production method of the present invention is useful for sanitary goods such as disposable diapers, sanitary napkins, and medical blood absorbers. The water absorbent resin powder is also applicable to a pet urine absorbing agent, an urine gelling agent for portable toilets, a freshness preserving agent for vegetables and fruits etc., a drip absorbing agent for meat, and fish and shellfish, a cold insulator, disposable pocket warmers, a gelling agent for battery, a water retaining agent for plants, soil, etc., a water condensation preventing agent, a water stop agent, a packing agent, artificial snow, etc.

REFERENCE SIGNS LIST

11: casing
12: base
13: screw
14: feed opening
15: hopper
16: extrusion opening
17: porous die
18: rotational blade
19: ring
20: backflow preventing member
20a: stripe projection (backflow preventing member)
21: motor
22: linear projection

The invention claimed is:

1. A method for producing water absorbent polyacrylic acid (salt) resin powder, comprising the steps of:
   (i) polymerizing an acrylic acid (salt) monomer aqueous solution;
   (ii) during or after the step of (i), performing gel grinding on a hydrogel crosslinked polymer which is obtained by the polymerization and which has a neutralization ratio of 45 mol % to 90 mol %, the step of (ii) being carried out on the condition that steps (1) and (2) are met:
      (1) the gel grinding being carried out with a gel grinding energy (GGE) of 18[J/g] to 60[J/g];
      (2) a weight average molecular weight of a water soluble content of the hydrogel crosslinked polymer being increased by 10,000[Da] to 500,000[Da]; and optionally
      (3) the particulate hydrogel crosslinked polymer obtained by this step (ii) having a weight average particle diameter (D50) of 350 μm to 2000 μm, and a logarithmic standard deviation (σζ) of a particle size distribution of 0.2 to 1.0, wherein in a case of the hydrogel crosslinked polymer being subjected to the gel grinding with the above condition (3) being satisfied, the particulate hydrogel crosslinked polymer to be supplied into a through-flow belt drier has a resin solid content of 10 wt % to 80 wt %, and the through-flow belt drier sends to the particulate hydrogel crosslinked polymer hot air of 150° C. to 250° C. at a velocity of 0.8[m/s] to 2.5[m/s] in a vertical direction (up-and-down direction); and wherein the hydrogel crosslinked polymer has a resin solid content of 10 wt % to 80 wt %; and
   (iii) drying a particulate hydrogel crosslinked polymer obtained by the gel grinding, wherein the drying is performed at 150° C. to 250° C. by use of a drier; and
   (iv) carrying out a surface treatment to the dried particulate hydrogel crosslinked polymer.

2. The method as set forth in claim 1, wherein the particulate hydrogel crosslinked polymer obtained by the step of (ii) has resin solid content of 10 wt % to 80 wt %.

3. The method as set forth in claim 1, in the case where the gel pulverization of the step (ii) has been carried out by any one of (1) to (3), a drier used in the step of (iii) is a through-flow belt drier configured to send hot air at a velocity of 0.8[m/s] to 2.5[m/s] in a direction vertical to the particulate hydrogel crosslinked polymer.

4. The method as set forth in claim 1, wherein the step of (i) performs kneader polymerization or belt polymerization.

5. The method as set forth in claim 1, wherein the step of (ii) is carried out with respect to:
   (a) a hydrogel crosslinked polymer having gel CRC of 10[g/g] to 35[g/g];
   (b) a hydrogel crosslinked polymer having gel Ext of 0.1 wt % to 10 wt %; or
   (c) a hydrogel crosslinked polymer having gel CRC of 10[g/g] to 35[g/g] and gel Ext of 0.1 wt % to 10 wt %.

6. The method as set forth in claim 1, wherein the step of (ii) is carried out with respect to a hydrogel crosslinked polymer having resin solid content of 40 wt % to 80 wt %.

7. The method as set forth in claim 1, wherein the step of (ii) is carried out with respect to:
   (d) a hydrogel crosslinked polymer having a monomer polymerization ratio of not less than 90 mol %; or
   (e) a hydrogel crosslinked polymer having a monomer polymerization ratio of not less than 90 mol % and a neutralization ratio of 45 mol % to 90 mol %.

8. The method as set forth in claim 1, wherein the step of (ii) is carried out with respect to a hydrogel crosslinked polymer having a gel temperature of 40° C. to 120° C.

9. The method as set forth in claim 1, wherein the step of (ii) employs a screw extruder including a casing having an edge where a porous die is provided.

10. The method as set forth in claim 1, wherein the step of (ii) is carried out so that gel Ext of the hydrogel crosslinked polymer is increased by not more than 5 wt %.

11. The method as set forth in claim 1, wherein in the step of (ii), 0 to 4 part(s) by weight of water is added to 100 parts by weight of the hydrogel crosslinked polymer.

12. The method as set forth in claim 1, wherein the particulate hydrogel crosslinked polymer thus obtained in the step of (ii) has at least one property of:
   (g) gel Ext of 0.1 wt % to 10 wt %;
   (h) gel CRC of 10[g/g] to 35[g/g]; and
   (i) resin solid content of 10 wt % to 80 wt %.

13. The method as set forth in claim 1, wherein the particulate hydrogel crosslinked polymer to be supplied into a through-flow belt drier in the step of (iii) has a temperature of 60° C. to 110° C.

14. The method as set forth in claim 1, further comprising a classifying step,
   the classifying step providing classified water absorbent resin particles having a weight average particle diameter (D50) of 250 μm to 500 μm and logarithmic standard deviation (σζ) of particle size distribution of 0.25 to 0.50.

15. The method as set forth in claim 1, wherein the surface treatment includes a surface crosslinking step of performing surface crosslinking to the particulate hydrogel crosslinked polymer thus dried, and a step of adding, to the particulate hydrogel crosslinked polymer thus dried, at least one of (i) polyvalent metal salt, (ii) a cationic polymer and (iii) inorganic fine particles, the step of adding being carried out concurrently or non-concurrently with the surface crosslinking step.

* * * * *